(12) United States Patent
    Ikai

(10) Patent No.: US 11,405,655 B2
(45) Date of Patent: Aug. 2, 2022

(54) IMAGE DECODING DEVICE AND IMAGE ENCODING DEVICE

(71) Applicants: SHARP KABUSHIKI KAISHA, Sakai (JP); FG Innovation Company Limited, Tuen Mun (HK)

(72) Inventor: Tomohiro Ikai, Sakai (JP)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 17/096,198

(22) Filed: Nov. 12, 2020

(65) Prior Publication Data

US 2021/0076076 A1    Mar. 11, 2021

Related U.S. Application Data

(63) Continuation of application No. 16/301,226, filed as application No. PCT/JP2017/015786 on Apr. 19, 2017, now Pat. No. 10,887,626.

(30) Foreign Application Priority Data

May 13, 2016 (JP) .................................. 2016-097497

(51) Int. Cl.
    *H04N 19/96*    (2014.01)
    *H04N 19/174*   (2014.01)
    (Continued)

(52) U.S. Cl.
    CPC ........... *H04N 19/96* (2014.11); *H04N 19/174* (2014.11); *H04N 19/176* (2014.11); *H04N 19/45* (2014.11); *H04N 19/60* (2014.11)

(58) Field of Classification Search
    None
    See application file for complete search history.

(56) References Cited

U.S. PATENT DOCUMENTS 9,948,933 B2 *  4/2018  Zhang .................. H04N 19/102
10,887,626 B2 * 1/2021  Ikai ......................... H04N 19/45
(Continued)

FOREIGN PATENT DOCUMENTS

WO    2016/123091 A1    8/2016

OTHER PUBLICATIONS

Chen et al., "Algorithm Description of Joint Exploration Test Model 2," Joint Video Exploration Team (JVET) of ITU-T SG16 WP3 and ISO/IEC JTC 1/SC29/WG11, 2nd Meeting, San Diego, CA, USA, Feb. 20-26, 2016, Document No. JVET-B1001_v3, Mar. 25, 2016 (Year: 2016).*

(Continued)

*Primary Examiner* — Reza Aghevli
(74) *Attorney, Agent, or Firm* — ScienBizip, P.C.

(57) ABSTRACT

The present invention avoids waste caused by performing both a Secondary Transform and an Adaptive Multiple Core Transform. Provided is a device including: a core transform unit (1521) that can perform an Adaptive Multiple Core Transform on a Coding Tree Unit; and a Secondary Transform unit (1522) that can perform, before the Adaptive Multiple Core Transform, a Secondary Transform on at least any one of sub-blocks included in the Coding Tree Unit. The device omits any of the Adaptive Multiple Core Transform and the Secondary Transform in accordance with at least any of a flag associated with the Adaptive Multiple Core Transform and a flag associated with the Secondary Transform, or in accordance with a size of the Coding Tree Unit.

2 Claims, 53 Drawing Sheets

(51) Int. Cl.
*H04N 19/176* (2014.01)
*H04N 19/60* (2014.01)
*H04N 19/44* (2014.01)

(56) References Cited

U.S. PATENT DOCUMENTS

| | | | | |
|---|---|---|---|---|
| 2013/0003858 A1* | 1/2013 | Sze | .................. | H04N 19/91 375/240.18 |
| 2014/0307801 A1* | 10/2014 | Ikai | .................. | H04N 19/14 375/240.18 |
| 2015/0264364 A1* | 9/2015 | Zhang | .................. | H04N 19/12 375/240.18 |
| 2016/0219290 A1* | 7/2016 | Zhao | .................. | H04N 19/12 |
| 2017/0094313 A1* | 3/2017 | Zhao | .................. | H04N 19/176 |
| 2017/0094314 A1* | 3/2017 | Zhao | .................. | H04N 19/124 |
| 2017/0127058 A1* | 5/2017 | Misra | .................. | H04N 19/44 |
| 2017/0150156 A1* | 5/2017 | Zhang | .................. | H04N 19/61 |
| 2017/0150176 A1* | 5/2017 | Zhang | .................. | H04N 19/42 |
| 2017/0150183 A1* | 5/2017 | Zhang | .................. | H04N 19/649 |
| 2017/0150185 A1* | 5/2017 | Sze | .................. | H04N 19/46 |
| 2017/0150186 A1* | 5/2017 | Zhang | .................. | H04N 19/625 |
| 2018/0205972 A1* | 7/2018 | Piao | .................. | H04N 19/105 |
| 2018/0332289 A1* | 11/2018 | Huang | .................. | H04N 19/96 |
| 2019/0222843 A1* | 7/2019 | Lee | .................. | H04N 19/176 |
| 2019/0246142 A1* | 8/2019 | Zhao | .................. | H04N 19/132 |
| 2019/0281298 A1* | 9/2019 | Ohkawa | .................. | H04N 19/176 |
| 2019/0306522 A1* | 10/2019 | Said | .................. | H04N 19/176 |
| 2020/0213626 A1* | 7/2020 | Ikai | .................. | H04N 19/60 |

OTHER PUBLICATIONS

Saxena et al., On secondary transforms for Intra_BL residue, Joint Collaborative Team on Video Coding (JCT-VC) of ITU-T SG16 WP3 and ISO/IEC JTC 1/SC29/G11, 13th Meeting, Incheon, Korea, Apr. 18-26, 2013, Document No. JCTVC-M0033, Apr. 22, 2013 (Year: 2013).*

Nguyen et al., "Transfoirm Coding Techniques in HEVC," IEEE Journal of Sleeted Topics in Signal Processing, vol. 7, No. 6, Dec. 2013, pp. 978-989. (Year: 2013).*

Elena Alshina et al., "Description of Exploration Experiments on Coding Tools", JVET-B1011 v2, Joint Video Exploration Team (JVET) of ITU-T SG16 WP3 and ISO/IEC JTC1/SC29/WG11, 2nd Meeting: San Diego, USA, Feb. 20-26, 2016.

Ankur Saxena et al., "On secondary transforms for Intra_BL residue", JCTVC-M0033, Joint Collaborative Team on Video Coding(JCT-VC) of ITU-T SG16 WP3 and ISO/IEC JTC1/SC29/WG11, 13th Meeting: Incheon, KR, Apr. 18-26, 2013.

Jianle Chen et al., "Algorithm Description of Joint Exploration Test Model 2", JVET-B1001 v3, Joint Video Exploration Team (JVET) of ITU-T SG16 WP3 and ISO/IEC JTC1/SC29/WG11, 2nd Meeting: San Diego, USA, Feb. 20-26, 2016.

International Telecommunication Union, "Series H: Audiovisual and Multimedia Systems. Infrastructure of audiovisual services—Coding of moving video", Reference software for ITU-T H.265 high efficiency video coding, ITU-T H.265.2 Oct. 2014.

Takeshi Tsukuba et al., "EE2.7-related: On secondary transform when primary transform is skipped", JVET-C0045-r1, Joint Video Exploration Team (JVET) of ITU-T SG16 WP3 and ISO/IEC JTC1/SC29/WG11, 3rd Meeting: Geneva, CH, May 26-Jun. 1, 2016.

Jianle Chen et al., "Algorithm description of Joint Exploration Test Model 2 (JEM2)", JVET-B1001-v3, Joint Video Exploration Team (JVET) of ITU-T SG16 WP3 and ISO/IEC JTC1/SC29/WG11, N16066, 2nd Meeting: San Diego, USA, Feb. 20-26, 2016.

Office Action issued on U.S. Appl. No. 16/301,226 dated Apr. 22, 2020.

Notice of Allowance issued on U.S. Appl. No. 16/301,226 dated Aug. 13, 2020.

* cited by examiner

FIG. 3A
PICTURE LAYER

| PH | S₁ | S₂ | ......... | S_NS |

→ PICT

FIG. 3B
SLICE LAYER

| SH | CTU₁ | CTU₂ | ......... | CTU_NC |

→ S

FIG. 3C
CODING TREE UNIT (CTU) LAYER

| CTUH | | CTUF |
| SAO | ... | ... |

→ CTU, → CT

FIG. 3D
CODING TREE LAYER

| SP (=1) | CT1 | CT2 | CT3 | CT4 |

→ CT

| SP (=0) | CU |

→ CT

FIG. 3E
DECODED UNIT (CU) LAYER

| SKIP | Pred_type | PUI | | | TTI | | | |
| | | PUI₁ | ... | PUI_NP | CBP_TU | SP_TU | TUI₁ | ... | TUI_NT |

→ CU

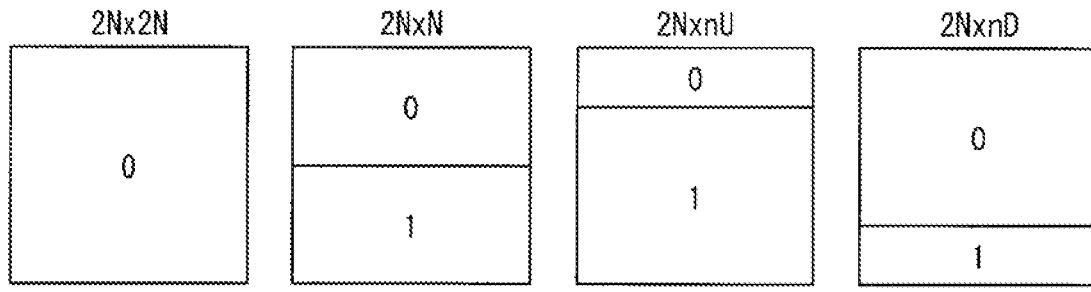
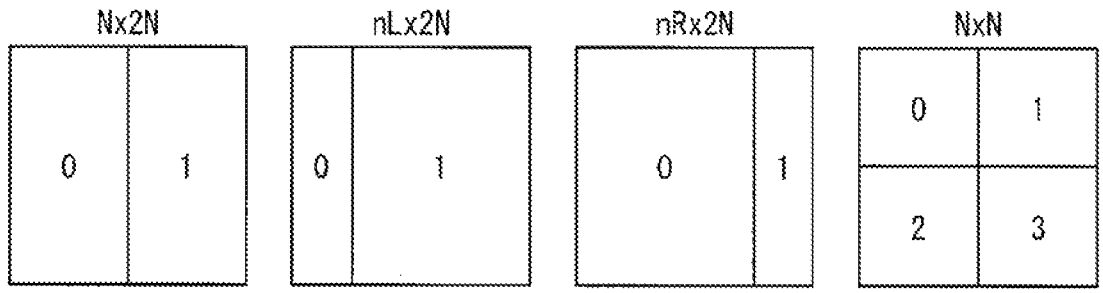

| coding_tree_unit( ) { | Descriptor | |
|---|---|---|
|   xCtb = ( CtbAddrInRs % PicWidthInCtbsY )<<CtbLog2SizeY | | |
|   yCtb = ( CtbAddrInRs / PicWidthInCtbsY )<<CtbLog2SizeY | | |
|   if( slice_sao_luma_flag || slice_sao_chroma_flag ) | | |
|     sao( xCtb >> CtbLog2SizeY, yCtb >> CtbLog2SizeY ) | | |
|   coding_quadtree( xCtb, yCtb, CtbLog2SizeY, 0 ) | | ←SYN1400 |
| } | | |

| coding_quadtree( x0, y0, log2CbSize, cqtDepth ) { | Descriptor | |
|---|---|---|
|   if( x0 + ( 1<<log2CbSize ) <= pic_width_in_luma_samples &&<br>    y0 + ( 1<<log2CbSize ) <= pic_height_in_luma_samples &&<br>    log2CbSize > MinCbLog2SizeY ) | | ←SYN1411 |
|     split_cu_flag[ x0 ][ y0 ] | ae(v) | ←SYN1421 |
|   if( split_cu_flag[ x0 ][ y0 ] ) { | | |
|     x1 = x0 + ( 1<<( log2CbSize − 1 ) ) | | |
|     y1 = y0 + ( 1<<( log2CbSize − 1 ) ) | | |
|     coding_quadtree( x0, y0, log2CbSize − 1, cqtDepth + 1 ) | | ←SYN1441A |
|     if( x1 < pic_width_in_luma_samples ) | | |
|       coding_quadtree( x1, y0, log2CbSize − 1, cqtDepth + 1 ) | | ←SYN1441B |
|     if( y1 < pic_height_in_luma_samples ) | | |
|       coding_quadtree( x0, y1, log2CbSize − 1, cqtDepth + 1 ) | | ←SYN1441C |
|     if( x1 < pic_width_in_luma_samples && y1 < pic_height_in_luma_samples ) | | |
|       coding_quadtree( x1, y1, log2CbSize − 1, cqtDepth + 1 ) | | ←SYN1441D |
|   } else | | |
|     coding_unit( x0, y0, log2CbSize ) | | ←SYN1500 |
| } | | |

FIG. 9

| | Descriptor | |
|---|---|---|
| coding_unit( x0, y0, log2CbSize ) { | | |
|   if( transquant_bypass_enabled_flag ) | | ←SYN1505 |
|     cu_transquant_bypass_flag | ae(v) | |
|   if( slice_type!=I ) | | |
|     cu_skip_flag[ x0 ][ y0 ] | ae(v) | ←SYN1511 |
|   nCbS = ( 1<<log2CbSize ) | | |
|   if( cu_skip_flag[ x0 ][ y0 ] ) | | ←SYN1512 |
|     prediction_unit( x0, y0, nCbS, nCbS ) | | |
|   else { | | |
|     if( slice_type!=I ) | | |
|       pred_mode_flag | ae(v) | ←SYN1611 |
|     if( CuPredMode[ x0 ][ y0 ]!=MODE_INTRA \|\| log2CbSize==MinCbLog2SizeY ) | | |
|       part_mode | ae(v) | ←SYN1621 |
|     if( CuPredMode[ x0 ][ y0 ]==MODE_INTRA ) { | | |
|   ... | | |
|     } else { | | |
|       if( PartMode==PART_2Nx2N ) | | |
|         prediction_unit( x0, y0, nCbS, nCbS ) | | ←SYN1631A |
|       else if( PartMode==PART_2NxN ) { | | |
|         prediction_unit( x0, y0, nCbS, nCbS / 2 ) | | ←SYN1631B |
|         prediction_unit( x0, y0 + ( nCbS / 2 ), nCbS, nCbS / 2 ) | | ←SYN1631C |
|       } else if( PartMode==PART_Nx2N ) { | | |
|         prediction_unit( x0, y0, nCbS / 2, nCbS ) | | ←SYN1631D |
|         prediction_unit( x0 + ( nCbS / 2 ), y0, nCbS / 2, nCbS ) | | ←SYN1631E |
|       } else { /* PART_NxN */ | | |
|         prediction_unit( x0, y0, nCbS / 2, nCbS / 2 ) | | ←SYN1631F |
|         prediction_unit( x0 + ( nCbS / 2 ), y0, nCbS / 2, nCbS / 2 ) | | ←SYN1631G |
|         prediction_unit( x0, y0 + ( nCbS / 2 ), nCbS / 2, nCbS / 2 ) | | ←SYN1631H |
|         prediction_unit( x0 + ( nCbS / 2 ), y0 + ( nCbS / 2 ), nCbS / 2, nCbS / 2 ) | | ←SYN1631I |
|       } | | |
|     } | | |
|     rqt_root_cbf | | ←SYN1513 |
|     if( rqt_root_cbf ) { | | ←SYN1514 |
|       transform_tree( x0, y0, x0, y0, log2CbSize, 0, 0 ) | | |
|     } | | |
|   } | | |
| } | | |

FIG. 10

| | |
|---|---|
| prediction_unit( x0, y0, nPbW, nPbH ) { | Descriptor |
|   if( cu_skip_flag[ x0 ][ y0 ] ) { | |
|     if( MaxNumMergeCand > 1 ) | |
|       merge_idx[ x0 ][ y0 ] | ae(v) |
|   } else { /* MODE_INTER */ | |
|     merge_flag[ x0 ][ y0 ] | ae(v) |
|     if( merge_flag[ x0 ][ y0 ] ) { | |
|       if( MaxNumMergeCand > 1 ) | |
|         merge_idx[ x0 ][ y0 ] | ae(v) |
|     } else { | |
|       if( slice_type==B ) | |
|         inter_pred_idc[ x0 ][ y0 ] | ae(v) |
|       if( inter_pred_idc[ x0 ][ y0 ] != PRED_L1 ) { | |
|         if( num_ref_idx_l0_active_minus1 > 0 ) | |
|           ref_idx_l0[ x0 ][ y0 ] | ae(v) |
|         mvd_coding( x0, y0, 0 ) | |
|         mvp_l0_flag[ x0 ][ y0 ] | ae(v) |
|       } | |
|       if( inter_pred_idc[ x0 ][ y0 ] != PRED_L0 ) { | |
|         if( num_ref_idx_l1_active_minus1 > 0 ) | |
|           ref_idx_l1[ x0 ][ y0 ] | ae(v) |
|         if( mvd_l1_zero_flag && inter_pred_idc[ x0 ][ y0 ] == PRED_BI ) { | |
|           MvdL1[ x0 ][ y0 ][ 0 ] = 0 | |
|           MvdL1[ x0 ][ y0 ][ 1 ] = 0 | |
|         } else | |
|           mvd_coding( x0, y0, 1 ) | |
|         mvp_l1_flag[ x0 ][ y0 ] | ae(v) |
|       } | |
|     } | |
|   } | |
| } | |

FIG. 11

| | Descriptor | |
|---|---|---|
| transform_tree( x0, y0, xBase, yBase, log2TrafoSize, trafoDepth, blkIdx ) { | | ←SYN1700 |
|   if( log2TrafoSize <= MaxTbLog2SizeY && <br>     log2TrafoSize > MinTbLog2SizeY && <br>     trafoDepth < MaxTrafoDepth && !( IntraSplitFlag && ( trafoDepth == 0 ))) | | ←SYN1721 |
|     split_transform_flag[ x0 ][ y0 ][ trafoDepth ] | ae(v) | ←SYN1731 |
|     cbf_cb[ x0 ][ y0 ][ trafoDepth ] | ae(v) | |
|     cbf_cr[ x0 ][ y0 ][ trafoDepth ] | ae(v) | |
|   } | | |
|   if( split_transform_flag[ x0 ][ y0 ][ trafoDepth ] ) { | | |
|     x1 = x0 + ( 1 << ( log2TrafoSize − 1 ) ) | | |
|     y1 = y0 + ( 1 << ( log2TrafoSize − 1 ) ) | | |
|     if (trafoDepth == 0) | | ←SYN1754 |
|     amt_flag [ x0 ][ y0 ][ trafoDepth ] | ae(v) | ←SYN1755 |
| | | |
|     transform_tree( x0, y0, x0, y0, log2TrafoSize − 1, trafoDepth + 1, 0 ) | | ⎫ |
|     transform_tree( x1, y0, x0, y0, log2TrafoSize − 1, trafoDepth + 1, 1 ) | | ⎬SYN1756 |
|     transform_tree( x0, y1, x0, y0, log2TrafoSize − 1, trafoDepth + 1, 2 ) | | ⎭ |
|     transform_tree( x1, y1, x0, y0, log2TrafoSize − 1, trafoDepth + 1, 3 ) | | |
|   } else { | | |
|     if( CuPredMode[ x0 ][ y0 ] == MODE_INTRA || trafoDepth != 0 || <br>       cbf_cb[ x0 ][ y0 ][ trafoDepth ] || cbf_cr[ x0 ][ y0 ][ trafoDepth ] ) | | |
|     cbf_luma[ x0 ][ y0 ][ trafoDepth ] | ae(v) | ←SYN1751 |
|     if (cbf_luma[ x0 ][ y0 ][ trafoDepth ] && trafoDepth == 0) | | |
|     amt_flag [ x0 ][ y0 ][ trafoDepth ] | ae(v) | ←SYN1753 |
|     transform_unit( x0, y0, xBase, yBase, log2TrafoSize, trafoDepth, blkIdx ) | | ←SYN1760 |
| | | |
| | | |
|   } | | |
| } | | |

FIG. 12

| transform_unit( x0, y0, xBase, yBase, log2TrafoSize, trafoDepth, blkIdx ) { | Descriptor | ←SYN1760 |
|---|---|---|
| log2TrafoSizeC = Max( 2, log2TrafoSize − ( ChromaArrayType == 3 ? 0 : 1 ) ) | | |
| cbfDepthC = trafoDepth − ( ChromaArrayType != 3 && log2TrafoSize == 2 ? 1 : 0 ) | | |
| xC = ( ChromaArrayType != 3 && log2TrafoSize == 2 ) ? xBase : x0 | | |
| yC = ( ChromaArrayType != 3 && log2TrafoSize == 2 ) ? yBase : y0 | | |
| cbfLuma = cbf_luma[ x0 ][ y0 ][ trafoDepth ] | | |
| cbfChroma = <br>  cbf_cb[ xC ][ yC ][ cbfDepthC ] || <br>  cbf_cr[ xC ][ yC ][ cbfDepthC ] ) | | |
| if( cbfLuma || cbfChroma ) { | | ←SYN1781 |
|   delta_qp( ) | | |
|   chroma_qp_offset( ) | | |
|   if( cbfLuma ) | | ←SYN1781 |
|     residual_coding( x0, y0, log2TrafoSize, 0 ) | | ←SYN1800 |
|   if( blkIdx == 3 ) { | | |
|     if( cbf_cb[ xBase ][ yBase ][ trafoDepth − 1 ] ) | | |
|       residual_coding( xBase, yBase, log2TrafoSize, 1 ) | | ←SYN1800 |
|     if( cbf_cr[ xBase ][ yBase ][ trafoDepth − 1 ] ) | | |
|       residual_coding( xBase, yBase + tIdx, log2TrafoSize, 2 ) | | ←SYN1800 |
|   } | | |
|   if (amt_flag != 0 && numCoeff > coreSIGNUM) | | |
|     amt_idx [ x0 ][ y0 ][ trafoDepth ] | ae(v) | ←SYN1811, SYN1812 |
|   } | | |
| } | | |

FIG. 13

FIG. 15A coreTrSet

| coreTrSetIdx | Name | amt_trans_idx=0 | amt_trans_idx=1 |
|---|---|---|---|
| 0 | TrSetIntra0 | DST7 | DCT8 |
| 1 | TrSetIntra1 | DST7 | DST1 |
| 2 | TrSetIntra2 | DST7 | DCT5 |
| 3 | TrSetInter | DCT8 | DST7 |

FIG. 15B

| coreTrIdx | TRANSFORM BASE |
|---|---|
| 0 | DCT2 |
| 1 | DCT5 |
| 2 | DCT8 |
| 3 | DST1 |
| 4 | DST7 |

| Intra Pred Mode | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| Horizontal | 2 | 1 | 0 | 1 | 0 | 1 | 0 | 1 | 0 | 0 | 0 | 0 | 0 | 1 | 0 | 1 | 0 | 1 |
| Vertical | 2 | 1 | 0 | 1 | 0 | 1 | 0 | 1 | 2 | 2 | 2 | 2 | 2 | 1 | 0 | 1 | 0 | 1 |
| Intra Pred Mode | 18 | 19 | 20 | 21 | 22 | 23 | 24 | 25 | 26 | 27 | 28 | 29 | 30 | 31 | 32 | 33 | 34 | |
| Horizontal | 0 | 1 | 0 | 1 | 0 | 1 | 2 | 2 | 2 | 2 | 2 | 1 | 0 | 1 | 0 | 1 | 0 | |
| Vertical | 0 | 1 | 0 | 1 | 0 | 1 | 0 | 0 | 0 | 0 | 0 | 1 | 0 | 1 | 0 | 1 | 0 | |

FIG. 16

| | Descriptor | |
|---|---|---|
| coding_unit( x0, y0, log2CbSize ) { | | |
|   if( transquant_bypass_enabled_flag ) | | ←SYN1505 |
|     cu_transquant_bypass_flag | ae(v) | |
|   if( slice_type != I ) | | |
|     cu_skip_flag[ x0 ][ y0 ] | ae(v) | ←SYN1511 |
|   nCbS = ( 1 << log2CbSize ) | | |
|   if( cu_skip_flag[ x0 ][ y0 ] ) | | ←SYN1512 |
|     prediction_unit( x0, y0, nCbS, nCbS ) | | |
|   else { | | |
|     if( slice_type != I ) | | |
|       pred_mode_flag | ae(v) | ←SYN1611 |
|     else { | | |
|       if( CuPredMode[ x0 ][ y0 ] != MODE_INTRA \|\| log2CbSize == MinCbLog2SizeY ) | | |
|         part_mode | ae(v) | ←SYN1621 |
|     if( CuPredMode[ x0 ][ y0 ] == MODE_INTRA ) { | | |
|       ... | | |
|     } else { | | |
|       if( PartMode == PART_2Nx2N ) | | |
|         prediction_unit( x0, y0, nCbS, nCbS ) | | |
|       else if( PartMode == PART_2NxN ) { | | |
|         prediction_unit( x0, y0, nCbS, nCbS / 2 ) | | |
|         prediction_unit( x0, y0 + ( nCbS / 2 ), nCbS, nCbS / 2 ) | | |
|       } else if( PartMode == PART_Nx2N ) { | | |
|         prediction_unit( x0, y0, nCbS / 2, nCbS ) | | |
|         prediction_unit( x0 + ( nCbS / 2 ), y0, nCbS / 2, nCbS ) | | |
|       } else { /* PART_NxN */ | | |
|         prediction_unit( x0, y0, nCbS / 2, nCbS / 2 ) | | |
|         prediction_unit( x0 + ( nCbS / 2 ), y0, nCbS / 2, nCbS / 2 ) | | |
|         prediction_unit( x0, y0 + ( nCbS / 2 ), nCbS / 2, nCbS / 2 ) | | |
|         prediction_unit( x0 + ( nCbS / 2 ), y0 + ( nCbS / 2 ), nCbS / 2, nCbS / 2 ) | | |
|       } | | |
|     } | | |
|     if( !pcm_flag[ x0 ][ y0 ] ) { | | |
|       if( CuPredMode[ x0 ][ y0 ] != MODE_INTRA && !( PartMode == PART_2Nx2N && merge_flag[ x0 ][ y0 ] ) ) | | |
|         rqt_root_cbf | ae(v) | ←SYN1513 |
|       if( rqt_root_cbf ) { | | |
|         MaxTrafoDepth = ( CuPredMode[ x0 ][ y0 ] == MODE_INTRA ? ( max_transform_hierarchy_depth_intra + IntraSplitFlag ) : max_transform_hierarchy_depth_inter ) | | |
|         transform_tree( x0, y0, x0, y0, log2CbSize, 0, 0 ) | | ←SYN1700 |
|         if( cbf_cu && PredMode == PRED_INTRA) | | |
|           sec_idx [ x0 ][ y0 ][ trafoDepth ] | ae(v) | |
|       } | | |
|     } | | |
|   } | | |
| } | | |

FIG. 21

| | Descriptor | |
|---|---|---|
| transform_tree( x0, y0, xBase, yBase, log2TrafoSize, trafoDepth, blkIdx ) { | | ←SYN1700 |
|   if( log2TrafoSize <= MaxTbLog2SizeY && <br>     log2TrafoSize > MinTbLog2SizeY && <br>     trafoDepth < MaxTrafoDepth && !( IntraSplitFlag && ( trafoDepth == 0 <br> ) ) ) | | ←SYN1721 |
|     split_transform_flag[ x0 ][ y0 ][ trafoDepth ] | ae(v) | ←SYN1731 |
|     cbf_cb[ x0 ][ y0 ][ trafoDepth ] | ae(v) | |
|     cbf_cr[ x0 ][ y0 ][ trafoDepth ] | ae(v) | |
|   } | | |
|   if( split_transform_flag[ x0 ][ y0 ][ trafoDepth ] ) { | | |
|     x1 = x0 + ( 1 << ( log2TrafoSize − 1 ) ) | | |
|     y1 = y0 + ( 1 << ( log2TrafoSize − 1 ) ) | | |
|     if (trafoDepth == 0 && predMode == PRED_INTRA) | | ←SYN1754a |
|       sec_idx [ x0 ][ y0 ][ trafoDepth ] | ae(v) | ←SYN1755a |
|     transform_tree( x0, y0, x0, y0, log2TrafoSize − 1, trafoDepth + 1, 0 ) | | |
|     transform_tree( x1, y0, x0, y0, log2TrafoSize − 1, trafoDepth + 1, 1 ) | | ⎫ |
|     transform_tree( x0, y1, x0, y0, log2TrafoSize − 1, trafoDepth + 1, 2 ) | | ⎬SYN1756 |
|     transform_tree( x1, y1, x0, y0, log2TrafoSize − 1, trafoDepth + 1, 3 ) | | ⎭ |
|   } else { | | |
|     if( CuPredMode[ x0 ][ y0 ] == MODE_INTRA || trafoDepth != 0 || <br>       cbf_cb[ x0 ][ y0 ][ trafoDepth ] || cbf_cr[ x0 ][ y0 ][ trafoDepth ] ) | | |
|     cbf_luma[ x0 ][ y0 ][ trafoDepth ] | ae(v) | ←SYN1752a |
|     if (cbf_luma[ x0 ][ y0 ][ trafoDepth ] && trafoDepth == 0 && predMode == <br> PRED_INTRA) | | |
|       sec_idx [ x0 ][ y0 ][ trafoDepth ] | ae(v) | ←SYN1753a |
|     transform_unit( x0, y0, xBase, yBase, log2TrafoSize, trafoDepth, blkIdx ) | | |
|   } | | |
| } | | |

| transform_unit( x0, y0, xBase, yBase, log2TrafoSize, trafoDepth, blkIdx ) { | Descriptor | |
|---|---|---|
| log2TrafoSizeC = Max( 2, log2TrafoSize − ( ChromaArrayType = = 3 ? 0 : 1 ) ) | | ←SYN1760 |
| cbfDepthC = trafoDepth − ( ChromaArrayType != 3 && log2TrafoSize = = 2 ? 1 : 0 ) | | |
| xC = ( ChromaArrayType != 3 && log2TrafoSize = = 2 ) ? xBase : x0 | | |
| yC = ( ChromaArrayType != 3 && log2TrafoSize = = 2 ) ? yBase : y0 | | |
| cbfLuma = cbf_luma[ x0 ][ y0 ][ trafoDepth ] | | |
| cbfChroma = <br>   cbf_cb[ xC ][ yC ][ cbfDepthC ] \|\| <br>   cbf_cr[ xC ][ yC ][ cbfDepthC ] ) | | |
| if( cbfLuma \|\| cbfChroma ) { | | ←SYN1781 |
|   xP = ( x0 >> MinCbLog2SizeY ) << MinCbLog2SizeY | | |
|   yP = ( y0 >> MinCbLog2SizeY ) << MinCbLog2SizeY | | |
|   nCbS = 1 << MinCbLog2SizeY | | |
|   delta_qp( ) | | |
|   chroma_qp_offset( ) | | |
|   if( cbfLuma ) | | |
|     residual_coding( x0, y0, log2TrafoSize, 0 ) | | ←SYN1800 |
|   if( blkIdx = = 3 ) { | | |
|     if( cbf_cb[ xBase ][ yBase ][ trafoDepth − 1 ] ) | | |
|       residual_coding( xBase, yBase, log2TrafoSize, 1 ) | | ←SYN1800 |
|     if( cbf_cr[ xBase ][ yBase ][ trafoDepth − 1 ] ) | | |
|       residual_coding( xBase, yBase + tIdx, log2TrafoSize, 2 ) | | ←SYN1800 |
|   } | | |
|   if (amt_flag != 0 && numCoeff > coreSIGNUM) | | |
|     amt_idx | ae(v) | ←SYN1812a |
|   if (PredMode = = MODE_INTRA && numCoeff > secSIGNUM) | | |
|     sec_idx | ae(v) | ←SYN1811a |
| } | | |
| } | | |

FIG. 26B

```
TU RESIDUE FLAG DECODING
IF (TU RESIDUE FLAG > 0){
   QUANTIZATION RESIDUE DECODING
   if (amt_flag && numCoeff > coreSIGNUM)
   amt_idx DECODER
   if (PredMode = = MODE_INTRA && numCoeff > secSIGNUM)
   Sec_idx DECODER
}
```

| | Descriptor | |
|---|---|---|
| transform_tree( x0, y0, xBase, yBase, log2TrafoSize, trafoDepth, blkIdx ) { | | ←SYN1700 |
| if( log2TrafoSize <= MaxTbLog2SizeY && log2TrafoSize > MinTbLog2SizeY && trafoDepth < MaxTrafoDepth && !( IntraSplitFlag && ( trafoDepth == 0 ))) | | ←SYN1721 |
| split_transform_flag[ x0 ][ y0 ][ trafoDepth ] | ae(v) | ←SYN1731 |
| cbf_cb[ x0 ][ y0 ][ trafoDepth ] | ae(v) | |
| cbf_cr[ x0 ][ y0 ][ trafoDepth ] | ae(v) | |
| } | | |
| if( split_transform_flag[ x0 ][ y0 ][ trafoDepth ] ) { | | |
| x1 = x0 + ( 1 << ( log2TrafoSize − 1 )) | | |
| y1 = y0 + ( 1 << ( log2TrafoSize − 1 )) | | |
| if (trafoDepth == 0 && PredMode == PRED_INTRA) | | |
| sec_idx[ x0 ][ y0 ][ trafoDepth ] | ae(v) | ←SYN1755b |
| if (trafoDepth == 0) | | |
| amt_flag[ x0 ][ y0 ][ trafoDepth ] | ae(v) | ←SYN1755c |
| transform_tree( x0, y0, x0, y0, log2TrafoSize − 1, trafoDepth + 1, 0 ) | | |
| transform_tree( x1, y0, x0, y0, log2TrafoSize − 1, trafoDepth + 1, 1 ) | | |
| transform_tree( x0, y1, x0, y0, log2TrafoSize − 1, trafoDepth + 1, 2 ) | | |
| transform_tree( x1, y1, x0, y0, log2TrafoSize − 1, trafoDepth + 1, 3 ) | | |
| } else { | | |
| if( CuPredMode[ x0 ][ y0 ] == MODE_INTRA || trafoDepth != 0 || cbf_cb[ x0 ][ y0 ][ trafoDepth ] || cbf_cr[ x0 ][ y0 ][ trafoDepth ] ) | | |
| cbf_luma[ x0 ][ y0 ][ trafoDepth ] | ae(v) | ←SYN1751 |
| if(cbf_luma[ x0 ][ y0 ][ trafoDepth ] && trafoDepth == 0 && PredMode == PRED_INTRA) | | |
| sec_idx[ x0 ][ y0 ][ trafoDepth ] | ae(v) | ←SYN1753b |
| if(cbf_luma[ x0 ][ y0 ][ trafoDepth ] && trafoDepth == 0) | | |
| amt_flag[ x0 ][ y0 ][ trafoDepth ] | ae(v) | ←SYN1753c |
| transform_unit( x0, y0, xBase, yBase, log2TrafoSize, trafoDepth, blkIdx ) | | ←SYN1760 |
| } | | |
| } | | |

| | Descriptor | |
|---|---|---|
| transform_unit( x0, y0, xBase, yBase, log2TrafoSize, trafoDepth, blkIdx ) { | | ←SYN1760 |
|   log2TrafoSizeC = Max( 2, log2TrafoSize - ( ChromaArrayType == 3 ? 0 : 1 ) ) | | |
|   cbfDepthC = trafoDepth - ( ChromaArrayType != 3 && log2TrafoSize == 2 ? 1 : 0 ) | | |
|   xC = ( ChromaArrayType != 3 && log2TrafoSize == 2 ) ? xBase : x0 | | |
|   yC = ( ChromaArrayType != 3 && log2TrafoSize == 2 ) ? yBase : y0 | | |
|   cbfLuma = cbf_luma[ x0 ][ y0 ][ trafoDepth ] | | |
|   cbfChroma = <br>    cbf_cb[ xC ][ yC ][ cbfDepthC ] \|<br>    cbf_cr[ xC ][ yC ][ cbfDepthC ] ) | | |
|   if( cbfLuma \|\| cbfChroma ) { | | ←SYN1781 |
|     xP = ( x0 >> MinCbLog2SizeY ) << MinCbLog2SizeY | | |
|     yP = ( y0 >> MinCbLog2SizeY ) << MinCbLog2SizeY | | |
|     nCbS = 1 << MinCbLog2SizeY | | |
|     delta_qp( ) | | |
|     chroma_qp_offset( ) | | |
|     if( cbfLuma ) | | ←SYN1781 |
|       residual_coding( x0, y0, log2TrafoSize, 0 ) | | ←SYN1800 |
|     if( blkIdx == 3 ) { | | |
|       if( cbf_cb[ xBase ][ yBase ][ trafoDepth - 1 ] ) | | |
|         residual_coding( xBase, yBase, log2TrafoSize, 1 ) | | ←SYN1800 |
|       if( cbf_cr[ xBase ][ yBase ][ trafoDepth - 1 ] ) | | |
|         residual_coding( xBase, yBase + tIdx, log2TrafoSize, 2 ) | | ←SYN1800 |
|     } | | |
|     if (amt_flag != 0 && numCoeff > coreSIGNUM && (sec_idx == 0 \|\| (log2TrafoSize != 2) ) | | ←SYN1800 |
|       amt_idx[ x0 ][ y0 ][ trafoDepth ] | ae(v) | ←SYN1812b |
|   } | | |
| } | | |

FIG. 30B

```
if (amt_flag && numCoeff > coreSIGNUM)
  if (sec_idx == 0 || log2TrafoSize != 2)
    amt_idx DECODER
  else // (sec_idx != 0 && log2TrafoSize == 2)
    {amt_idx DECODING SKIP}
```

FIG. 32A

| transform_tree( x0, y0, xBase, yBase, log2TrafoSize, trafoDepth, blkIdx ) { | Descriptor | ←SYN1700 |
|---|---|---|
| if( log2TrafoSize <= MaxTbLog2SizeY && log2TrafoSize > MinTbLog2SizeY && trafoDepth < MaxTrafoDepth && !( IntraSplitFlag && ( trafoDepth == 0 ))) | | |
| split_transform_flag[ x0 ][ y0 ][ trafoDepth ] | ae(v) | |
| cbf_cb[ x0 ][ y0 ][ trafoDepth ] | ae(v) | |
| cbf_cr[ x0 ][ y0 ][ trafoDepth ] | ae(v) | |
| } | | |
| if( split_transform_flag[ x0 ][ y0 ][ trafoDepth ] ) { | | |
| x1 = x0 + ( 1 << ( log2TrafoSize − 1 ) ) | | |
| y1 = y0 + ( 1 << ( log2TrafoSize − 1 ) ) | | |
| if (trafoDepth == 0 && PredMode == PRED_INTRA) | | |
| sec_idx[ x0 ][ y0 ][ trafoDepth ] | ae(v) | ←SYN1755d |
| if (trafoDepth == 0 && (sec_idx == 0 \|\| log2TrafoSize > 3) ) | | |
| amt_flag[ x0 ][ y0 ][ trafoDepth ] | ae(v) | ←SYN1755e |
| transform_tree( x0, y0, x0, y0, log2TrafoSize − 1, trafoDepth + 1, 0 ) | | |
| transform_tree( x1, y0, x0, y0, log2TrafoSize − 1, trafoDepth + 1, 1 ) | | |
| transform_tree( x0, y1, x0, y0, log2TrafoSize − 1, trafoDepth + 1, 2 ) | | |
| transform_tree( x1, y1, x0, y0, log2TrafoSize − 1, trafoDepth + 1, 3 ) | | |
| } else { | | |
| if( CuPredMode[ x0 ][ y0 ] == MODE_INTRA \|\| trafoDepth != 0 \|\| cbf_cb[ x0 ][ y0 ][ trafoDepth ] \|\| cbf_cr[ x0 ][ y0 ][ trafoDepth ] ) | | |
| cbf_luma[ x0 ][ y0 ][ trafoDepth ] | ae(v) | |
| if (cbf_luma[ x0 ][ y0 ][ trafoDepth ] && trafoDepth == 0 && PredMode == PRED_INTRA) | | |
| sec_idx[ x0 ][ y0 ][ trafoDepth ] | ae(v) | ←SYN1753d |
| if (cbf_luma[ x0 ][ y0 ][ trafoDepth ] && trafoDepth == 0 && (sec_idx == 0 \|\| log2TrafoSize != 2) ) | | |
| amt_flag[ x0 ][ y0 ][ trafoDepth ] | ae(v) | ←SYN1753e |
| transform_unit( x0, y0, xBase, yBase, log2TrafoSize, trafoDepth, blkIdx ) | | |
| } | | |
| } | | |

FIG. 32B

```
if (cbf_luma && trafoDepth == 0 && (sec_idx == 0 || log2TrafoSize != 2) )
   amt_flag DECODER
else // (sec_idx != 0 && log2TrafoSize == 2)
   (amt_flag DECODING SKIP)
```

FIG. 33A

| transform_tree( x0, y0, xBase, yBase, log2TrafoSize, trafoDepth, blkIdx ) { | Descriptor | |
|---|---|---|
| if( log2TrafoSize <= MaxTbLog2SizeY && log2TrafoSize > MinTbLog2SizeY && trafoDepth < MaxTrafoDepth && !( IntraSplitFlag && ( trafoDepth == 0 ))) | | ← SYN1700 |
| split_transform_flag[ x0 ][ y0 ][ trafoDepth ] | ae(v) | |
| cbf_cb[ x0 ][ y0 ][ trafoDepth ] | ae(v) | |
| cbf_cr[ x0 ][ y0 ][ trafoDepth ] | ae(v) | |
| } | | |
| if( split_transform_flag[ x0 ][ y0 ][ trafoDepth ] ) { | | |
| x1 = x0 + ( 1 << ( log2TrafoSize − 1 ) ) | | |
| y1 = y0 + ( 1 << ( log2TrafoSize − 1 ) ) | | |
| if (trafoDepth == 0) | | |
| amt_flag[ x0 ][ y0 ][ trafoDepth ] | ae(v) | ← SYN1755f |
| transform_tree( x0, y0, x0, y0, log2TrafoSize − 1, trafoDepth + 1, 0 ) | | |
| transform_tree( x1, y0, x0, y0, log2TrafoSize − 1, trafoDepth + 1, 1 ) | | |
| transform_tree( x0, y1, x0, y0, log2TrafoSize − 1, trafoDepth + 1, 2 ) | | |
| transform_tree( x1, y1, x0, y0, log2TrafoSize − 1, trafoDepth + 1, 3 ) | | |
| } else { | | |
| if( CuPredMode[ x0 ][ y0 ] == MODE_INTRA \|\| trafoDepth != 0 \|\| cbf_cb[ x0 ][ y0 ][ trafoDepth ] \|\| cbf_cr[ x0 ][ y0 ][ trafoDepth ] ) | | |
| cbf_luma[ x0 ][ y0 ][ trafoDepth ] | ae(v) | |
| if (cbf_luma[ x0 ][ y0 ][ trafoDepth ] && trafoDepth == 0) | | |
| amt_flag [ x0 ][ y0 ][ trafoDepth ] | ae(v) | ← SYN1753f |
| transform_unit( x0, y0, xBase, yBase, log2TrafoSize, trafoDepth, blkIdx ) | | |
| } | | |
| } | | |

FIG. 33B

| |
|---|
| if (cbf_luma && trafoDepth == 0) |
|   amt_flag DECODER |

FIG. 34A

| | Descriptor | |
|---|---|---|
| transform_unit( x0, y0, xBase, yBase, log2TrafoSize, trafoDepth, blkIdx ) { | | ←SYN1760 |
|   log2TrafoSizeC = Max( 2, log2TrafoSize - ( ChromaArrayType == 3 ? 0 : 1 ) ) | | |
|   cbfDepthC = trafoDepth - ( ChromaArrayType != 3 && log2TrafoSize == 2 ? 1 : 0 ) | | |
|   xC = ( ChromaArrayType != 3 && log2TrafoSize == 2 ) ? xBase : x0 | | |
|   yC = ( ChromaArrayType != 3 && log2TrafoSize == 2 ) ? yBase : y0 | | |
|   cbfLuma = cbf_luma[ x0 ][ y0 ][ trafoDepth ] | | |
|   cbfChroma = <br>     cbf_cb[ xC ][ yC ][ cbfDepthC ] \|\| <br>     cbf_cr[ xC ][ yC ][ cbfDepthC ] ) | | |
|   if( cbfLuma \|\| cbfChroma ) { | | |
|     xP = ( x0 >> MinCbLog2SizeY ) << MinCbLog2SizeY | | |
|     yP = ( y0 >> MinCbLog2SizeY ) << MinCbLog2SizeY | | |
|     nCbS = 1 << MinCbLog2SizeY | | |
|     delta_qp( ) | | |
|     chroma_qp_offset( ) | | |
|     if( cbfLuma ) | | |
|       residual_coding( x0, y0, log2TrafoSize, 0 ) | | |
|     if( blkIdx == 3 ) { | | |
|       if( cbf_cb[ xBase ][ yBase ][ trafoDepth - 1 ] ) | | |
|         residual_coding( xBase, yBase, log2TrafoSize, 1 ) | | |
|       if( cbf_cr[ xBase ][ yBase ][ trafoDepth - 1 ] ) | | |
|         residual_coding( xBase, yBase + tIdx, log2TrafoSize, 2 ) | | |
|     } | | |
|     if (predMode == PRED_INTRA && numCoeff > coreSIGNUM ) | | |
|       sec_idx [ x0 ][ y0 ][ trafoDepth ] | ae(v) | ←SYN1811c |
|     if (amt_flag != 0 && numCoeff > coreSIGNUM && (sec_idx == 0 \|\| (log2TrafoSize != 2) ) | | |
|       amt_idx [ x0 ][ y0 ][ trafoDepth ] | ae(v) | ←SYN1812c |
|   } | | |
| } | | |

FIG. 34B

```
if (amt_flag && numCoeff > coreSIGNUM)
  if (sec_idx == 0 || log2TrafoSize != 2)
    amt_idx DECODER
  else // (sec_idx != 0 && log2TrafoSize == 2)
    (amt_idx DECODING SKIP)
```

FIG. 38A

| transform_unit( x0, y0, xBase, yBase, log2TrafoSize, trafoDepth, blkIdx ) { | Descriptor |
|---|---|
| log2TrafoSizeC = Max( 2, log2TrafoSize - ( ChromaArrayType == 3 ? 0 : 1 ) ) | |
| cbfDepthC = trafoDepth - ( ChromaArrayType != 3 && log2TrafoSize == 2 ? 1 : 0 ) | |
| xC = ( ChromaArrayType != 3 && log2TrafoSize == 2 ) ? xBase : x0 | |
| yC = ( ChromaArrayType != 3 && log2TrafoSize == 2 ) ? yBase : y0 | |
| cbfLuma = cbf_luma[ x0 ][ y0 ][ trafoDepth ] | |
| cbfChroma = <br>    cbf_cb[ xC ][ yC ][ cbfDepthC ] \|\| <br>    cbf_cr[ xC ][ yC ][ cbfDepthC ] ) | |
| if( cbfLuma \|\| cbfChroma ) { | |
|   xP = ( x0 >> MinCbLog2SizeY ) << MinCbLog2SizeY | |
|   yP = ( y0 >> MinCbLog2SizeY ) << MinCbLog2SizeY | |
|   nCbS = 1 << MinCbLog2SizeY | |
|   delta_qp( ) | |
|   chroma_qp_offset( ) | |
|   if( cbfLuma ) | |
|     residual_coding( x0, y0, log2TrafoSize, 0 ) | |
|   if( blkIdx == 3 ) { | |
|     if( cbf_cb[ xBase ][ yBase ][ trafoDepth - 1 ] ) | |
|       residual_coding( xBase, yBase, log2TrafoSize, 1 ) | |
|     if( cbf_cr[ xBase ][ yBase ][ trafoDepth - 1 ] ) | |
|       residual_coding( xBase, yBase + tIdx, log2TrafoSize, 2 ) | |
|   } | |
|   if (predMode == PRED_INTRA && numCoeff > coreSIGNUM) | |
|     sec_idx[ x0 ][ y0 ][ trafoDepth ] | ae(v) ←SYN1811d |
|   if(amt_flag != 0 && numCoeff > coreSIGNUM && sec_idx == 0 \|\| log2TrafoSize != 2) | |
|     amt_idx[ x0 ][ y0 ][ trafoDepth ] | ae(v) ←SYN1812d |
| } | |
| } | |

FIG. 38B

```
if (PredMode == PRED_INTRA && numCoeff > secSIGNUM)
  Sec_idx DECODER
if (amt_flag && numCoeff > coreSIGNUM)
  if (sec_idx == 0 || log2TrafoSize != 2)
    amt_idx DECODING
  else // (sec_idx !=0 && log2TrafoSize == 2)
  (amt_idx DECODING SKIP)
```

FIG. 40A

| | Descriptor |
|---|---|
| transform_unit( x0, y0, xBase, yBase, log2TrafoSize, trafoDepth, blkIdx ) { | |
| log2TrafoSizeC = Max( 2, log2TrafoSize − ( ChromaArrayType == 3 ? 0 : 1 ) ) | |
| cbfDepthC = trafoDepth − ( ChromaArrayType != 3 && log2TrafoSize == 2 ? 1 : 0 ) | |
| xC = ( ChromaArrayType != 3 && log2TrafoSize == 2 ) ? xBase : x0 | |
| yC = ( ChromaArrayType != 3 && log2TrafoSize == 2 ) ? yBase : y0 | |
| cbfLuma = cbf_luma[ x0 ][ y0 ][ trafoDepth ] | |
| cbfChroma = <br>   cbf_cb[ xC ][ yC ][ cbfDepthC ] \|\| <br>   cbf_cr[ xC ][ yC ][ cbfDepthC ] | |
| if( cbfLuma \|\| cbfChroma ) { | |
|   xP = ( x0 >> MinCbLog2SizeY ) << MinCbLog2SizeY | |
|   yP = ( y0 >> MinCbLog2SizeY ) << MinCbLog2SizeY | |
|   nCbS = 1 << MinCbLog2SizeY | |
|   delta_qp( ) | |
|   chroma_qp_offset( ) | |
|   if( cbfLuma ) | |
|     residual_coding( x0, y0, log2TrafoSize, 0 ) | |
|   if( blkIdx == 3 ) { | |
|     if( cbf_cb[ xBase ][ yBase ][ trafoDepth − 1 ] ) | |
|       residual_coding( xBase, yBase, log2TrafoSize, 1 ) | |
|     if( cbf_cr[ xBase ][ yBase ][ trafoDepth − 1 ] ) | |
|       residual_coding( xBase, yBase + tIdx, log2TrafoSize, 2 ) | |
|   } | |
|   if (amt_flag != 0 && numCoeff > coreSIGNUM ) | |
|     amt_idx [ x0 ][ y0 ][ trafoDepth ] | ae(v) ←SYN1812e |
|   if (predMode == PRED_INTRA && numCoeff > coreSIGNUM && (amt_flag == 0 \|\| log2TrafoSize != 2 ) ) | |
|     sec_idx [ x0 ][ y0 ][ trafoDepth ] | ae(v) ←SYN1811e |
| } | |
| } | |

FIG. 40B

```
if (amt_flag && numCoeff > coreSIGNUM)
  amt_idx DECODER
if (PredMode == PRED_INTRA && numCoeff > secSIGNUM)
  if (amt_flag == 0 || log2TrafoSize != 2))
    Sec_idx DECODING
  else // (amt_flag != 0 && log2TrafoSize == 2)
    (Sec_idx DECODING SKIP)
```

FIG. 42A

| transform_tree( x0, y0, xBase, yBase, log2TrafoSize, trafoDepth, blkIdx ) { | Descriptor | |
|---|---|---|
| if( log2TrafoSize <= MaxTbLog2SizeY && log2TrafoSize > MinTbLog2SizeY && trafoDepth < MaxTrafoDepth && !( IntraSplitFlag && ( trafoDepth = = 0 ))) | | |
|   split_transform_flag[ x0 ][ y0 ][ trafoDepth ] | ae(v) | |
|     cbf_cb[ x0 ][ y0 ][ trafoDepth ] | ae(v) | |
|     cbf_cr[ x0 ][ y0 ][ trafoDepth ] | ae(v) | |
| } | | |
| if( split_transform_flag[ x0 ][ y0 ][ trafoDepth ] ) { | | |
|   x1 = x0 + ( 1 << ( log2TrafoSize − 1 ) ) | | |
|   y1 = y0 + ( 1 << ( log2TrafoSize − 1 ) ) | | |
|   if (trafoDepth = = 0) | | |
|     amt_flag[ x0 ][ y0 ][ trafoDepth ] | ae(v) | ←SYN1755g |
|   transform_tree( x0, y0, x0, y0, log2TrafoSize − 1, trafoDepth + 1, 0 ) | | |
|   transform_tree( x1, y0, x0, y0, log2TrafoSize − 1, trafoDepth + 1, 1 ) | | |
|   transform_tree( x0, y1, x0, y0, log2TrafoSize − 1, trafoDepth + 1, 2 ) | | |
|   transform_tree( x1, y1, x0, y0, log2TrafoSize − 1, trafoDepth + 1, 3 ) | | |
| } else { | | |
|   if( CuPredMode[ x0 ][ y0 ] = = MODE_INTRA \|\| trafoDepth != 0 \|\| cbf_cb[ x0 ][ y0 ][ trafoDepth ] \|\| cbf_cr[ x0 ][ y0 ][ trafoDepth ] ) | | |
|     cbf_luma[ x0 ][ y0 ][ trafoDepth ] | ae(v) | |
|     if (cbf_luma[ x0 ][ y0 ][ trafoDepth ] && trafoDepth = = 0) | | |
|       amt_flag [ x0 ][ y0 ][ trafoDepth ] | ae(v) | ←SYN1753g |
|   transform_unit( x0, y0, xBase, yBase, log2TrafoSize, trafoDepth, blkIdx ) | | |
|   } | | |
| } | | |

FIG. 42B

| if (cbf_luma && trafoDepth = = 0) |
|---|
|   amt_flg DECODING |

FIG. 43A

| | Descriptor |
|---|---|
| transform_unit( x0, y0, xBase, yBase, log2TrafoSize, trafoDepth, blkIdx ) { | |
|   log2TrafoSizeC = Max( 2, log2TrafoSize - ( ChromaArrayType == 3 ? 0 : 1 ) ) | |
|   cbfDepthC = trafoDepth - ( ChromaArrayType != 3 && log2TrafoSize == 2 ? 1 : 0 ) | |
|   xC = ( ChromaArrayType != 3 && log2TrafoSize == 2 ) ? xBase : x0 | |
|   yC = ( ChromaArrayType != 3 && log2TrafoSize == 2 ) ? yBase : y0 | |
|   cbfLuma = cbf_luma[ x0 ][ y0 ][ trafoDepth ] | |
|   cbfChroma = <br>    cbf_cb[ xC ][ yC ][ cbfDepthC ] \|\| <br>    cbf_cr[ xC ][ yC ][ cbfDepthC ] ) | |
|   if( cbfLuma \|\| cbfChroma ) { | |
|     xP = ( x0 >> MinCbLog2SizeY ) << MinCbLog2SizeY | |
|     yP = ( y0 >> MinCbLog2SizeY ) << MinCbLog2SizeY | |
|     nCbS = 1 << MinCbLog2SizeY | |
|     delta_qp( ) | |
|     chroma_qp_offset( ) | |
|     if( cbfLuma ) | |
|       residual_coding( x0, y0, log2TrafoSize, 0 ) | |
|     if( blkIdx == 3 ) { | |
|       if( cbf_cb[ xBase ][ yBase ][ trafoDepth - 1 ] ) | |
|         residual_coding( xBase, yBase, log2TrafoSize, 1 ) | |
|       if( cbf_cr[ xBase ][ yBase ][ trafoDepth - 1 ] ) | |
|         residual_coding( xBase, yBase + tIdx, log2TrafoSize, 2 ) | |
|     } | |
|     if (predMode == PRED_INTRA && numCoeff > coreSIGNUM && log2TrafoSize != 2) | |
|       sec_idx [ x0 ][ y0 ][ trafoDepth ] | ae(v) ←SYN1811f |
|     if (amt_flag != 0 && numCoeff > coreSIGNUM ) | |
|       amt_idx [ x0 ][ y0 ][ trafoDepth ] | ae(v) ←SYN1812f |
|   } | |
| } | |

FIG. 43B

```
if (PredMode == PRED_INTRA && numCoeff > secSIGNUM)
  if (log2TrafoSize != 2)
    Sec_idx DECODING
  else // (log2TrafoSize == 2)
    (Sec_idx DECODING SKIP)
```

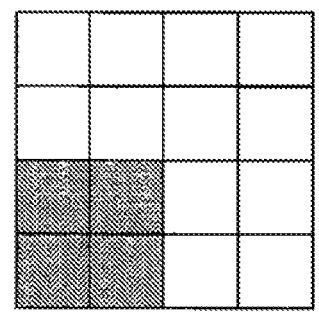
FIG. 44A  4 × 4 BLOCKS
FIG. 44B  8 × 8 BLOCKS
FIG. 44C  16 × 16 BLOCKS

4 × 4 BLOCKS

8 × 8 BLOCKS

16 × 16 BLOCKS

4 × 4 SECONDARY TRANSFORM        CORE TRANSFORM

4 × 4 BLOCKS

8 × 8 BLOCKS

16 × 16 BLOCKS

HORIZONTAL
PREDICTION
BOUNDARY if (max(xS, yS) < 2 || yS == 0)
SUB-BLOCK TRANSFORM
PROCESSING

VERTICAL
PREDICTION
BOUNDARY if (max(xS, yS) < 2 || xS == 0)
SUB-BLOCK TRANSFORM
PROCESSING NONE of the ABOVE if (xS + yS < 3)
SUB-BLOCK TRANSFORM
PROCESSING

4 × 4 SECONDARY TRANSFORM ← → CORE TRANSFORM

8 × 8 CORE TRANSFORM × 1

4 × 4 CORE TRANSFORM × 4

FIG. 54A

| Intra Pred Mode | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 |
|---|---|---|---|---|---|---|---|---|---|---|---|---|---|---|---|---|---|---|---|---|---|---|---|---|---|---|---|---|---|---|---|---|---|---|
| secTrSetIdxTbl | 0 | 0 | 1 | 2 | 1 | 2 | 1 | 2 | 3 | 4 | 3 | 4 | 3 | 4 | 5 | 5 | 5 | 5 | 6 | 6 | 6 | 7 | 7 | 8 | 9 | 8 | 9 | 8 | 9 | 10 | 11 | 10 | 11 | 10 |
| Intra Pred Mode | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 | 60 | 61 | 62 | 63 | 64 | 65 | 66 | 67(LM) |
| secTrSetIdxTbl | 11 | 10 | 11 | 10 | 11 | 10 | 9 | 8 | 9 | 8 | 7 | 7 | 7 | 6 | 6 | 5 | 5 | 5 | 5 | 5 | 4 | 4 | 3 | 4 | 3 | 4 | 3 | 2 | 1 | 2 | 1 | 2 | 1 | 0 |

FIG. 54B

| sec_idx | Name |
|---|---|
| 0 | SECONDARY TRANSFORM OFF |
| 1 (sec_trans_idx = 0) | SECONDARY TRANSFORM 0 |
| 2 (sec_trans_idx = 1) | SECONDARY TRANSFORM 1 |
| 3 (sec_trans_idx = 2) | SECONDARY TRANSFORM 2 |
| 4 (sec_trans_idx = 3) | SECONDARY TRANSFORM 3 |

IMAGE DECODING DEVICE AND IMAGE ENCODING DEVICE

TECHNICAL FIELD

The present invention relates to an image decoding device capable of decoding coded data representing an image and also relates to an image encoding device capable of coding an image and thus generating coded data.

BACKGROUND ART

For the purposes of transmitting or recording videos efficiently, video encoding devices are used for generating coded data by coding videos and video decoding devices are used for generating decoded images by decoding the coded data.

Some specific video coding schemes include, for instance, the H.264/MPEG-4.AVC and the scheme proposed by its successor, HEVC (High-Efficiency Video Coding) (see Non Patent Literature 1).

In such video coding schemes, each video is constituted of images (pictures), each image is split into slices, each slice is split into Coding Units, and each Coding Unit is constituted of a prediction unit (PU) and a transform unit (TU). Each video is managed with such a hierarchical structure, and the coding/decoding of the video is commonly performed on a block-by-block basis.

In such a video coding scheme, a predictive image is commonly generated based on a locally decoded image obtained by coding/decoding an input image. Then, a predictive residue (also referred to as a "difference image" or a "residue image") is obtained by subtracting the predictive image from the input image (original image), and the predictive image thus obtained is coded. Some exemplar methods of generating the predictive images are an inter-image prediction (inter-prediction) method and an intra-image prediction (intra-prediction) method.

Non Patent Literature 1 describes a known technique where the above-described Coding Unit and the above-described transform unit are implemented by use of a quadtree segmentation method. The technique allows a selection of block sizes with a higher degree of freedom, and thus achieve a good balance between the code amount and the accuracy.

CITATION LIST

Non Patent Literature

Non Patent Literature 1: ITU-T Rec. H.265 (V2), published on Oct. 29, 2014

SUMMARY OF INVENTION

Technical Problem

Conventional techniques such as the one described above still have room for more efficient restoration of the predictive residue for TUs.

The present invention addresses the above-mentioned problem and for that purpose, provides an image decoding device and an image encoding device capable of restoring efficiently the predictive residue for TUs.

Solution to Problem

To solve the above-mentioned problem, an image decoding device provided according to an aspect of the present invention is an image decoding device configured to decode a picture by splitting the picture into a Coding Tree Unit, the device including: a first transform unit configured to be capable of applying a first transform to the Coding Tree Unit; and a second transform unit configured to be capable of applying, before the first transform, a second transform to at least any one of sub-blocks included in the Coding Tree Unit, wherein the transform by any of the first transform unit and the second transform unit is omitted in accordance with at least any of a first flag associated with the first transform and a second flag associated with the second transform, or in accordance with a size of the Coding Tree Unit.

In addition, an image decoding device provided according to an aspect of the present invention is an image decoding device configured to decode a picture by splitting the picture into a Coding Tree Unit, the device including: a first transform unit that can apply a first transform to the Coding Tree Unit; and a second transform unit that can apply, before the first transform, a second transform to at least any one of sub-blocks included in the Coding Tree Unit, wherein the second transform unit can apply the second transform to a first region including a lower-frequency side sub-block in the Coding Tree Unit and to a second region configured to include a boundary-adjacent sub-block which is adjacent to the first region and adjacent to a boundary of the Coding Tree Unit, the second region configured to include no sub-block adjacent to the boundary-adjacent sub-block from the opposite side of the boundary.

In addition, an image encoding device provided according to an aspect of the present invention is an image encoding device configured to encode a picture by splitting the picture into a Coding Tree Unit, the device including: a first transform unit configured to be capable of applying a first transform to the Coding Tree Unit; and a second transform unit configured to be capable of applying, after the first transform, a second transform to at least any one of sub-blocks included in the Coding Tree Unit, wherein the transform by any of the first transform unit and the second transform unit is omitted in accordance with at least any of a first flag associated with the first transform and a second flag associated with the second transform, or in accordance with a size of the Coding Tree Unit.

Advantageous Effects of Invention

An aspect of the present invention has an effect that allows more efficient and effective restoration of the predictive residue for TUs.

BRIEF DESCRIPTION OF DRAWINGS

FIGS. 3A to 3E are charts illustrating data organization of coded data generated by a video encoding device according to an embodiment of the present invention and decoded by the video decoding device according to an embodiment of the present invention. FIGS. 3A to 3D illustrate a picture layer, a slice layer, a Coding Tree Unit layer, a Coding Tree layer, and a Coding Unit layer (CU layer), respectively.

FIGS. 4A to 4H are charts illustrating various patterns of PU split types. FIGS. 4A to 4H illustrate partition configurations of cases where the PU split types are 2N×2N, 2N×N, 2N×nU, 2N×nD, N×2N, nL×2N, nR×2N, and N×N, respectively.

FIG. 9 illustrates an exemplar configuration of a syntax table of CT information according to an embodiment of the present invention.

FIG. 10 illustrates an exemplar configuration of a syntax table of CU information, PT information PTI, and TT information TTI according to an embodiment of the present invention.

FIG. 11 illustrates an exemplar configuration of a syntax table of PU information PUI according to an embodiment of the present invention.

FIG. 12 illustrates an exemplar configuration of a syntax table of TT information TTI according to an embodiment of the present invention.

FIG. 13 illustrates an exemplar configuration of a syntax table of TU information TUI according to an embodiment of the present invention.

FIGS. 15A and 15B illustrate an exemplar configuration of a transform set table according to an embodiment of the present invention.

FIG. 16 illustrates an exemplar configuration of a table for defining transform subsets to be selected based on an intra-prediction mode.

FIG. 21 illustrates an exemplar configuration of a syntax table of CU information, PT information PTI, and TT information TTI according to an embodiment of the present invention.

FIG. 24 illustrates an exemplar configuration of a syntax table of TT information TTI according to an embodiment of the present invention.

FIG. 26A illustrates an exemplar configuration of a syntax table of TU information TUI according to an embodiment of the present invention, and FIG. 26B is a pseudocode description of decoded portions of an amt_idx and a sec_idx.

FIG. 29 illustrates an exemplar configuration of a syntax table of TT information TTI for decoding the amt_idx at a TU level according to an embodiment of the present invention.

FIG. 30A illustrates an exemplar configuration of a syntax table of TU information TUI according to an embodiment of the present invention, and FIG. 30B is a pseudocode description of a decoded portion of the amt_idx.

FIG. 32A illustrates an exemplar configuration of a syntax table of TT information TTI according to an embodiment of the present invention, and FIG. 32B is a pseudocode description of a decoded portion of an amt_flag.

FIG. 33A illustrates an exemplar configuration of a syntax table of TT information TTI according to an embodiment of the present invention, and FIG. 33B is a pseudocode description of a decoded portion of an amt_flag.

FIG. 34A illustrates an exemplar configuration of a syntax table of TU information TUI according to an embodiment of the present invention, and FIG. 34B is a pseudocode description of a decoded portion of the amt_idx.

FIG. 38A illustrates an exemplar configuration of a syntax table of TU information TUI according to an embodiment of the present invention, and FIG. 38B is a pseudocode description of decoded portions of the sec_idx and the amt_idx.

FIG. 40A illustrates an exemplar configuration of a syntax table of TU information TUI according to an embodiment of the present invention, and FIG. 40B is a pseudocode description of the amt_idx and the sec_idx.

FIG. 42A illustrates an exemplar configuration of a syntax table of TT information TTI according to an embodiment of the present invention, and FIG. 42B is a pseudocode description of a decoded portion of the sec_idx.

FIG. 43A illustrates an exemplar configuration of a syntax table of TU information TUI according to an embodiment of the present invention, and FIG. 43B is a pseudocode description of a decoded portion of the sec_idx.

FIGS. 44A to 44C are charts describing a sub-block to which the Secondary Transform unit applies the Secondary Transform according to an embodiment of the present invention.

FIG. 49A illustrates the transmission device equipped with the video encoding device, and FIG. 49B illustrates the reception device equipped with the video decoding device.

FIG. 50A illustrates the recording device equipped with the video encoding device, and FIG. 50B illustrates the playback device equipped with the video decoding device.

FIG. 54A is a Secondary Transform set index secTrSetIdx, and FIG. 54B is a Secondary Transform set table SecTrSet.

DESCRIPTION OF EMBODIMENTS

Embodiment 1

Figure 1:
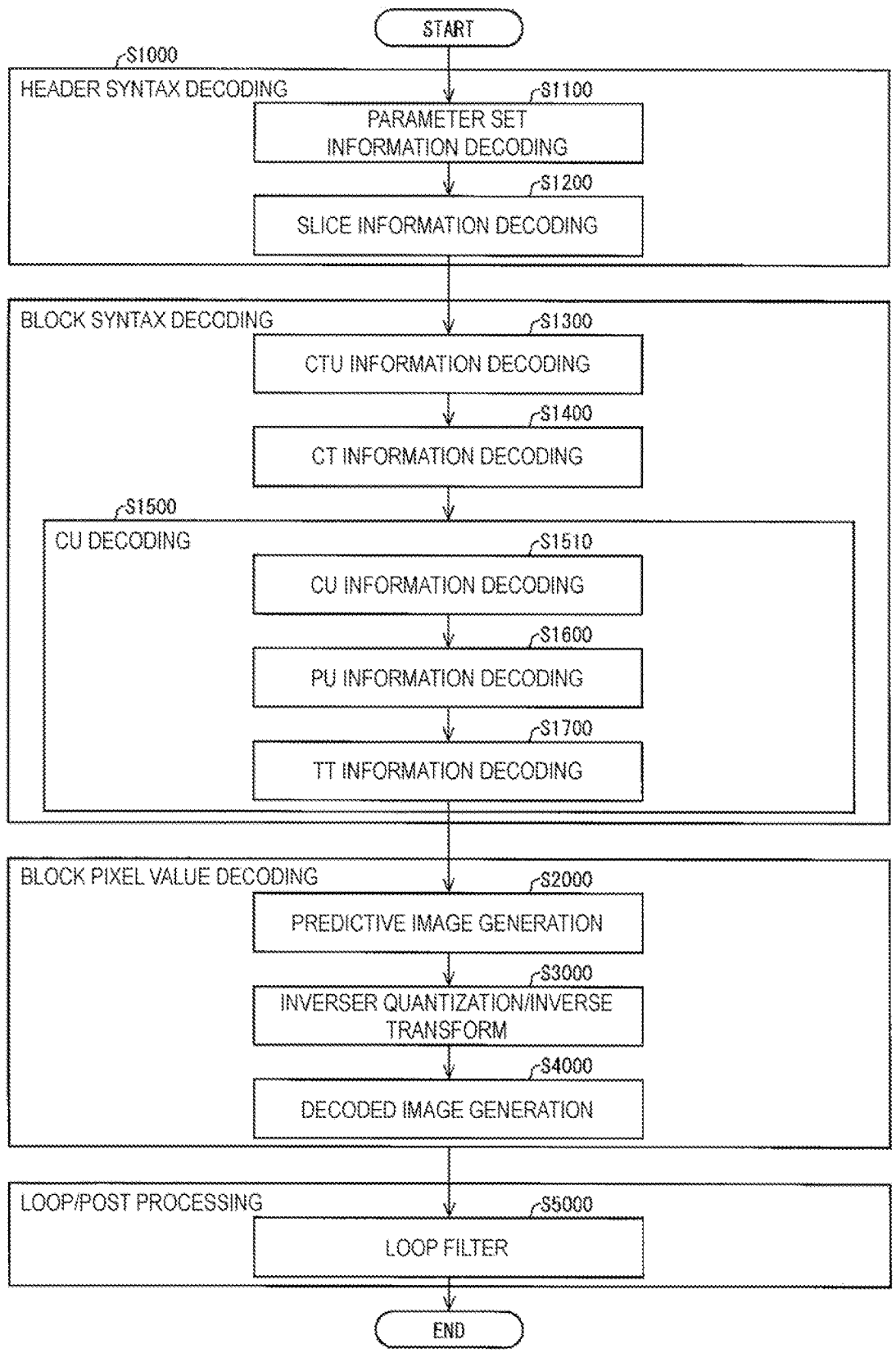
FIG. 1 is a functional block diagram illustrating an exemplar configuration describing a CU information decoder and a decoding module, both included in a video decoding device according to an embodiment of the present invention.

An embodiment of the present invention will be described below with reference to FIG. 1 to FIGS. 43A and 43B. First, an overview of a video decoding device (image decoding device) 1 and an overview of a video encoding device (image encoding device) 2 will be described with reference to FIG. 2. FIG. 2 is a functional block diagram illustrating a schematic configuration of the video decoding device 1.

A technology employed in the HEVC (High-Efficiency Video Coding) is implemented in the video decoding device 1 and the video encoding device 2 illustrated in FIG. 2. The video encoding device 2 generates coded data #1 by entropy coding the syntax values prescribed, in such a video coding scheme, to be transmitted from an encoder to a decoder.

The Context-based Adaptive Binary Arithmetic Coding (CABAC) is a known entropy coding scheme.

The CABAC performs a coding/decoding that is adapted to the context. The context mentioned above means the situation (context) of the coding/decoding, and is used for recording the probability of the relevant syntax. The CABAC performs a binary coded processing on a syntax that may take multiple values, the binary data obtained by this binary coded processing are adaptively coded arithmetically in accordance with the probability. Specifically, from multiple buffers having probabilities of a binary value (0 or 1), a buffer is selected in accordance with the context, and the probability recorded in the selected buffer is used for the arithmetic coding. In addition, probabilities suitable for various contexts can be maintained by updating the buffers' probabilities based on the decoding/coding binary values.

The video decoding device 1 receives an input of the coded data #1 obtained as a result of the coding of a video performed by the video encoding device 2. The video decoding device 1 decodes the input coded data #1, and outputs a video #2 to the outside. Before a detailed description of the video decoding device 1, a configuration of the coded data #1 will be described below.

(Configuration of Coded Data)

An exemplar coded data #1 generated by the video encoding device 2 and decoded by the video decoding device 1 will be described below with reference to FIGS. 3A to 3E. The coded data #1 includes, for instance, a sequence and multiple pictures included in the sequence.

FIGS. 3A to 3E illustrate a hierarchical structure in the coded data #1 with a picture layer on top of it. FIGS. 3A to 3E illustrate, respectively, a picture layer defining a picture PICT, a slice layer defining a slice S, a Coding Tree Unit layer defining a Coding Tree Unit (Coding Tree Unit) CTU, a Coding Tree layer defining a Coding Tree (Coding Tree, CT), and a CU layer defining a Coding Unit (Coding Unit, CU) included in a Coding Tree CT.

<Picture Layer>

The picture layer defines an aggregate of data to be referred to by the video decoding device 1 for decoding a picture PICT to be processed. As illustrated in FIG. 3A, the picture PICT includes a picture header PH, and slices $S_1$ to $S_{NS}$ (NS is the total number of slices included in the picture PICT).

In the following description, the subscripts of the symbols may be omitted in a case where it is not necessary to discriminate the slice $S_1$ to $S_{NS}$ from one another. The same principle will be applied to other data with subscriptions included in the coded data #1 to be described below.

The picture header PH includes a group of coding parameters that are to be referred to by the video decoding device 1 for determining the decoding method to be employed for the target picture. The picture header PH is referred also to as a Picture Parameter Set (PPS).

<Slice Layer>

The slice layer defines an aggregate of data to be referred to by the video decoding device 1 for decoding a slice S to be processed. As illustrated in FIG. 3B, the slice S includes a slice header SH, and Coding Tree Units $CTU_1$ to $CTU_{NC}$ (NC is the total number of Coding Tree Units included in the slice S).

The slice header SH includes a group of coding parameters that are to be referred to by the video decoding device 1 for determining the decoding method to be employed for the target slice. Slice-type specifying information (slice_type) to be used for specifying the slice_type is an example of coding parameters included in the slice header SH.

Some of the slice types that the slice-type specifying information can specify are: (1) an I-slice that uses only the intra-prediction for coding; (2) a P-slice that uses uni-prediction or intra-prediction for coding; (3) a B-slice that uses uni-prediction, bi-prediction, or intra-prediction for coding.

In addition, the slice header SH may include a filter parameter to be referred to by a loop filter (see FIG. 2) included in the video decoding device 1.

<Coding Tree Unit Layer>

The Coding Tree Unit layer defines an aggregate of data to be referred to by the video decoding device 1 for decoding a Coding Tree Unit CTU to be processed. The Coding Tree Unit CTU is a unit obtained by splitting a slice (picture) into fixed-sized portions. Of those units obtained through the splitting, image data (picture elements) are referred to as Coding Tree Blocks CTBs. A unit including not only image data but also information for decoding image data (e.g., splitting information, etc.) is referred to as a Coding Tree Unit CTU. In a case where the image data are distinguished between those of luminance and those of chrominance, the CTB is referred to as a CTB of luminance or a CTB of chrominance. Hereinafter, the Coding Tree, the Coding Unit, and the like are treated as ones including not only the image data for the corresponding units but also the information for decoding the image data (e.g., the splitting information, and the like).

The Coding Tree Unit CTU includes a Coding Tree Unit header CTUH, Coding Trees CTs, and a Coding Tree Unit footer CTUF. The relationship between the Coding Tree Unit CTU and the Coding Trees CTs is described as follows.

The Coding Tree Unit CTU is split into Coding Trees (CTs) by a recursive quadtree segmentation. Hereinafter, a tree structure and its node obtained through a recursive quadtree segmentation are referred to as a Coding Tree.

Hereinafter, the unit corresponding to the smallest Coding Tree, or leaf, is referred to as a coding node. In addition, as the coding node is a basic unit for the coding processing, the coding not is referred to as a Coding Unit (CU) from now onwards. Hence the Coding Tree CT of the highest layer is the CTU, and the smallest Coding Tree CT is the CU.

Each Coding Tree has half a lengthwise dimension and half a crosswise dimension of the Coding Tree in a layer immediately above the layer of the Coding Tree in question.

The possible size range of each Coting Tree depends on the size-specifying information and the maximum hierarchical depth of the Coding Tree included in the sequence parameter set SPS of the coded data #1. For instance, suppose that the size of the Coding Tree Unit CTU is 64×64 pixels and the maximum hierarchical depth is 3. In this case, each Coding Tree in the same layer as or the layers below the Coding Tree Unit CTU may have any of the following 4 different sizes: 64×64 pixels, 32×32 pixels, 16×16 pixels, and 8×8 pixels.

<Coding Tree Unit Header and Coding Tree Unit Footer>

The Coding Tree Unit header CTUH and the Coding Tree Unit footer CTUF include coding parameters to be referred to by the video decoding device 1 for determining the method of decoding the target Coding Tree Unit. Specifically, as illustrated in FIG. 3C, the CTUH includes SAO information used for specifying the method of filtering the target Coding Tree Unit. The information included in CTU, such as CTUH and CTUF, is referred to as Coding Tree Unit information (CTU information). The information stored in the Coding Tree Unit header CTUH (e.g., the SAO information) may be stored not in the header but in the footer (CTUF).

<Coding Tree>

Coding Tree CT has Coding Tree split information SP to be used for splitting the Coding Tree Unit CTU. Specifically, for instance, as illustrated in FIG. 3D, the Coding Tree split information SP may be a CU split flag (split_cu_flag), which is a flag indicating whether or not the entire target Coding Tree Unit or a partial region of the target Coding Tree Unit is to be quadtree segmented. In a case where the CU split flag split_cu_flag is 1, the Coding Tree CT is further split into 4 Coding Trees CTs. In a case where the split_cu_flag is 0, the Coding Tree is a non-splittable Coding Unit CU. The information that the Coding Tree has, such as the CU split flag split_cu_flag, is referred to as Coding Tree information (CT information). The CT information may include not only the CU split flag split_cu_flag indicating whether or not the Coding Tree in question is to be further split, but also the parameters to be applied to the Coding Tree in question and the Coding Units below that.

<CU Layer>

The CU layer defines an aggregate of data to be referred to by the video decoding device 1 for decoding the CU to be processed (the CU information, a prediction unit PU, a transform tree TT).

Now, a tree structure of the data included in the CU will be described below. The Coding Unit serves as a root for the prediction unit (PU) and the transform tree (TT). The prediction unit and the transform tree are described as follows.

The prediction unit is one region or multiple regions that are not overlaid on each other, and the region(s) is(are) included the Coding Unit. The prediction processing is performed for each prediction unit. The splitting types in the prediction unit are roughly classified into cases of the intra-prediction; and cases of the inter-prediction.

In the cases of the intra-prediction, there are two splitting methods: 2N×2N (resulting in the same size as the size of the Coding Unit); and N×N.

On the other hand, in the cases of the inter-prediction, the splitting methods are: 2N×2N (resulting in the same size as the size of the Coding Unit), 2N×N, N×2N, N×N, and the like.

In the transform tree, the Coding Unit is split into a single transform unit (TU) or is split into multiple transform units. The position and the size of each transform unit is prescribed. To put it differently, the transform unit refers to a single region, or multiple but not overlaid regions, included in the Coding Unit. The transform tree includes a single transform unit or multiple transform units obtained through the splitting described above. The transform processing is performed for each transform unit.

<Data Structure of Coding Unit Information>

Next, specific details of the data included in the Coding Unit CU will be described below with reference to FIG. 3E. As illustrated in FIG. 3E, the Coding Unit CU includes, specifically, CU information (skip flag SKIP (cu_skip_flag), CU prediction type information Pred_type, and the like), PU information PUI, and TT information TTI.

[Skip Flag]

The skip flag SKIP is a flag (cu_skip_flag) indicating whether or not a skip mode is applied to the target CU. In a case where the skip flag SKIP has a value of 1, that is, where the skip mode is applied to the target CU, the PU information PUI and the TT information TTI in that Coding Unit CU are omitted. It should be noted that the skip flag SKIP is omitted in a case of the I-slice.

CU Prediction Type Information

The CU prediction type information Pred_type includes CU prediction mode information (PredMode) and PU split type information (PartMode).

CU prediction mode information (PredMode) specifies, as a method to be used for generating a predictive image for each PU included in the target CU, any one of the skip mode, the intra-prediction (intra-CU), and the inter-prediction (inter-CU). Hereinafter, in the target CU, different types such as the skip, the intra-prediction, and the inter-prediction are referred to CU prediction modes.

PU split type information (PartMode) specifies the PU split type, which is a splitting pattern for each PU of the target Coding Unit. Hereinafter, the operation of splitting the target Coding Unit CU into individual PUs in accordance with the PU split type is referred to as the PU splitting.

PU split type information (PartMode) may be, for instance, the index indicating the type of PU split patterns, or may specify the shape, the size, and the position within the CU.

It should be noted that the selectable PU split type depends on the CU prediction mode and the CU size. In addition, the PU split type selectable in the cases of inter-prediction differs from the one selectable in the cases of intra-prediction. Details of the PU split type will be described later.

[PU Information]

PU information PUI is information on the PU(s) included in the target CU. To put it differently, the PU information PUI is a collection of information on the single PU or on each of the multiple Pus included in the PU. As the generation of the predictive image Pred is performed by using the PU as the unit as described above, the PU information PUI is referred to by the video decoding device 1 to generate a predictive image. As illustrated in FIG. 3E, the PU information PUI includes PU information $PUI_1$ to $PUI_{NP}$ (NP is the total number of the PUs included in the target CU including predictive information and the like in each PU.

The PUI includes either the intra-prediction information or the inter-prediction information in accordance with which prediction method the CU prediction mode information (PredMode) specifies. Hereinafter, the PU to which the intra-prediction is applied is referred also to as an intra-PU, and the PU to which the inter-prediction is applied is referred also to as an inter-PU.

The inter-prediction information includes coding parameters which the video decoding device 1 refers to when the video decoding device 1 generates an inter-prediction image by use of the inter-prediction.

Some exemplar inter-prediction parameters are: a merge flag (merge_flag); a merge index (merge_idx); an estimated motion vector index (mvp_idx); a reference image index (ref_idx); an inter-prediction identifier inter_pred_idc; and a motion vector residue (mvd).

The intra-prediction information includes a coding parameter which the video decoding device 1 refers to when the video decoding device 1 generates an intra-prediction image by use of the intra-prediction.

Examples of the intra-prediction parameters include an estimated prediction mode flag, an estimated prediction mode index, and a residue prediction mode index.

It should be noted that for the intra-prediction information, a PCM mode flag indicating whether the PCM mode is to be used may be coded. In a case where the PCM mode flag is coded and where the PCM mode flag indicates that the PCM mode is to be used, the prediction processing (intra), the transform processing, and the processing of the entropy coding are omitted.

TT Information

The TT information TTI is information on the TT included in the CU. To put it differently, the TT information TTI is a collection of information on the single TU or on each of the multiple TU included in the TT. The TT information is referred to by the video decoding device 1 when the residual data are decoded. Hereinafter, the TU may sometimes be referred to as a transform unit.

As illustrated in FIG. 3E, the TT information TTI includes: a CU residue flag CBP_TU indicating whether or not the target CU includes residual data; TT split information SP_TU specifying the splitting pattern by which the target CU is split into each of the transform units, and transform units $TUI_1$ to $TUI_{NT}$ (NT is the total number of transform units included in the target CU).

In a case where the CU residue flag CBP_TU is 0, the target CU includes no transform unit TU. In a case where the CU residue flag CBP_TU is 1, the target CU includes a transform unit TU. The CU residue flag CBP_TU may be a residual root flag rqt_root_cbf (Residual Quad Tree Root Coded Block Flag) indicating that there is no residue in all the segments obtained by splitting the target TT or below that. TT split information SP_TU, specifically, information for determining the shape, the size, and the position, within the target CU, of each TU included in the target CU. For instance, the TT split information SP_TU can be obtained from a TU split flag (split_transform_flag) indicating whether or not the splitting of the target TT is to be performed and a TU level (trafoDepth) indicating the depth of the split. The TU split flag split_transform_flag is a flag indicating whether or not to split a transform unit that is to be subjected to a transform (inverse transform). In a case where the transform unit is to be split, a transform (the quantization, the inverse transform, and/or the inverse quantization) is performed on the smaller transform units.

In addition, in a case, for instance, where the size of the CU is 64×64, each TU obtained by the splitting may have a size ranging from 32×32 pixels to 4×4 pixels.

TU information $TUI_1$ to $TUI_{NT}$ are discrete pieces of information on a single TU or on each of the multiple TUs included in the TT. For instance, the TU information TUI includes a quantized predictive residue (residual_coding).

Each quantized predictive residue is coded data generated by the video encoding device 2 performing the following processing 1 to 2 on the target TU.

Processing 1: Performing a Discrete Cosine Transform (DCT transform) on a predictive residue obtained by subtracting a predictive image from a coded target image;

Processing 2: Quantizing a transform coefficient obtained by Processing 1;

The above-described quantization parameter qp represents the magnitude of a quantization step QP ($QP=2^{qp/6}$) used when the video encoding device 2 quantizes the transform coefficient.

<PU Split Type>

The PU split type (PartMode) has the following 8 patterns in a case where the size of the target CU is 2N×2N pixels. Specifically, the 8 patterns are: 4 symmetric splitting patterns of 2N×2N pixels 2N×N pixels, N×2N pixels, and N×N pixels; and 4 asymmetric splitting patterns of 2N×nU pixels, 2N×nD pixels, nL×2N pixels, and nR λ2N pixels. Note that N=$2^m$ (m is a natural number greater than or equal to 1). Hereinafter, a region/regions that is/are obtained by splitting the target CU is/are referred also to as a partition/partitions.

FIGS. 4A to 4H illustrate specifically the positions of the PU splitting in the CU for each split type.

FIG. 4A illustrates the 2N×2N PU split type, which is of a case where no CU splitting is performed.

FIGS. 4B, 4C, and 4D illustrate, respectively, the partition shapes of the 2N×N, 2N×nU, and 2N×nD PU split types. Hereinafter, the partitions of the 2N×N, 2N×nU, and 2N×nD PU split types are collectively referred to as horizontally long partitions.

FIGS. 4E, 4F, and 4G illustrate, respectively, the partition shapes of the N×2N, nL×2N, and nR×2N PU split types. Hereinafter, the partitions of the N×2N, nL×2N, and nR×2N PU split types are collectively referred to as vertically long partitions.

The horizontally long partition(s) and the vertically long partition(s) are collectively referred to as rectangular partitions.

FIG. 4H illustrates the partition shape of the N×N PU split type. The PU split types of FIGS. 4A and 4H are referred also to as square partitions based on the partition shapes. The PU split types of FIGS. 4B to 4G are referred also to as non-square partitions.

In FIGS. 4A to 4H, each partition has an identification number, which indicates the order in which the corresponding partition is processed. To put it differently, the identification numbers represent the order of scanning the partitions.

Note that in FIGS. 4A to 4H, the top left-hand corner is the reference point (origin) of the CU.

[Split Type of Inter-Prediction Case]

For the inter-PU, 7 of the above-mentioned 8 split types (all but the N×N split type (FIG. 4H)) are defined. The above-mentioned 4 asymmetric splittings are referred also to as Asymmetric Motion Partitions (AMP). In general, the CU that is split by the Asymmetric Motion Partition method includes partitions of different shapes and sizes. The symmetric splitting is referred also to as the symmetric motion partition. In general, the CU that is split by the symmetric motion partition method includes partitions of identical shapes and sizes.

A specific value is given to the above-mentioned N based on the size of the CU to which the PU belongs, and the specific values of the nU, nD, nL, and nR are determined in accordance with the value of N. For instance, an inter-CU of 128×128 pixels can be split into inter-PUs of 128×128 pixels, 128×64 pixels, 64×128 pixels, 64×64 pixels, 128×32 pixels, 128×96 pixels, 32×128 pixels, and 96×128 pixels.

[Split Type of Intra-Prediction Case]

For the intra-PU, the following two splitting patterns are defined. Specifically, a first one is a splitting pattern 2N×2N, which is a case where target CU is not split, that is, where the target CU as a whole is treated as a single PU; and a second one is a splitting pattern of N×N, which is a case where the target CU is symmetrically split into 4 PUs.

Hence, of those examples illustrated in FIGS. 4A to 4H, the splitting patterns of FIGS. 4A and 4H are possible for the intra-PU.

For instance, the intra-CU of 128×128 pixels can be split into intra-PUs of 128×128 pixels and 64×64 pixels.

In a case of the I-slice, in the Coding Unit CU, an intra-split mode (intra_part_mode) for specifying the PU split type information (PartMode) may be included.

(Video Decoding Device)

Hereinafter, a configuration of the video decoding device 1 according to the present invention will be described with reference to FIG. 1 to FIGS. 47A to 47C, and FIGS. 51A to 51C to FIGS. 53A to 53C.

<Overview of Video Decoding Device>

The video decoding device 1 generates a predictive image Pred for each PU, generates a decoded image #2 by adding the generated predictive image Pred and a predictive residue D (hereinafter, the predictive residue may sometimes express as r[ ][ ]) obtained by decoding the coded data #1, and outputs the decoded image #2 thus generated to the outside.

The generation of the predictive image Pred is performed by referring to coding parameters obtained by decoding the coded data #1. The coding parameters refer to the parameters that are referred to when the predictive image Pred is generated. The coding parameters include: predictive parameters such as a motion vector that is referred to in the inter-image prediction and a prediction mode that is referred to in the intra-image prediction; the size and the shape of the PU; the size and the shape of the TU; the residual data between the original image and the predictive image; and the like. Hereinafter, of those pieces of information included in the coding parameters, a collection of all but the residual data is referred to as side information.

Hereinafter, the picture (frame), the slice, the CTU, the CT, the CU, the PU, the TT, and the TU that are the target of the decoding will be referred to as the target picture, the target slice, the target CTU, the target CT, the target CU, the target PU, the target TT, and the target TU.

The size of the Coding Tree Unit is, for instance, 64×64 pixels while the size of the PU and the size of the TU are, for instance, 64×64 pixels, 32×32 pixels, 16×16 pixels, 8×8 pixels, 4×4 pixels, and the like. These sizes are, however, only some examples. The sizes of the Coding Tree Unit, the PU and the TU may be other than the sizes mentioned above.

<Configuration of Video Decoding Device>

A schematic configuration of the video decoding device 1 will be described below with reference again to FIG. 2. FIG. 2 is a functional block diagram illustrating a schematic configuration of the video decoding device 1.

As illustrated in FIG. 2, the video decoding device 1 includes a decoding module 10, a CT information decoder 11, a PU information decoder 12, a TT information decoder 13, a predictive image generator 14, an inverse quantization/inverse transform unit 15, a frame memory 16, an adder 17, a loop filter 18, a header decoder 19, a CU decoder 20, an CU information decoder 21. The TT information decoder 13 further includes a TU decoder 22.

[Basic Flow]

Figure 2:
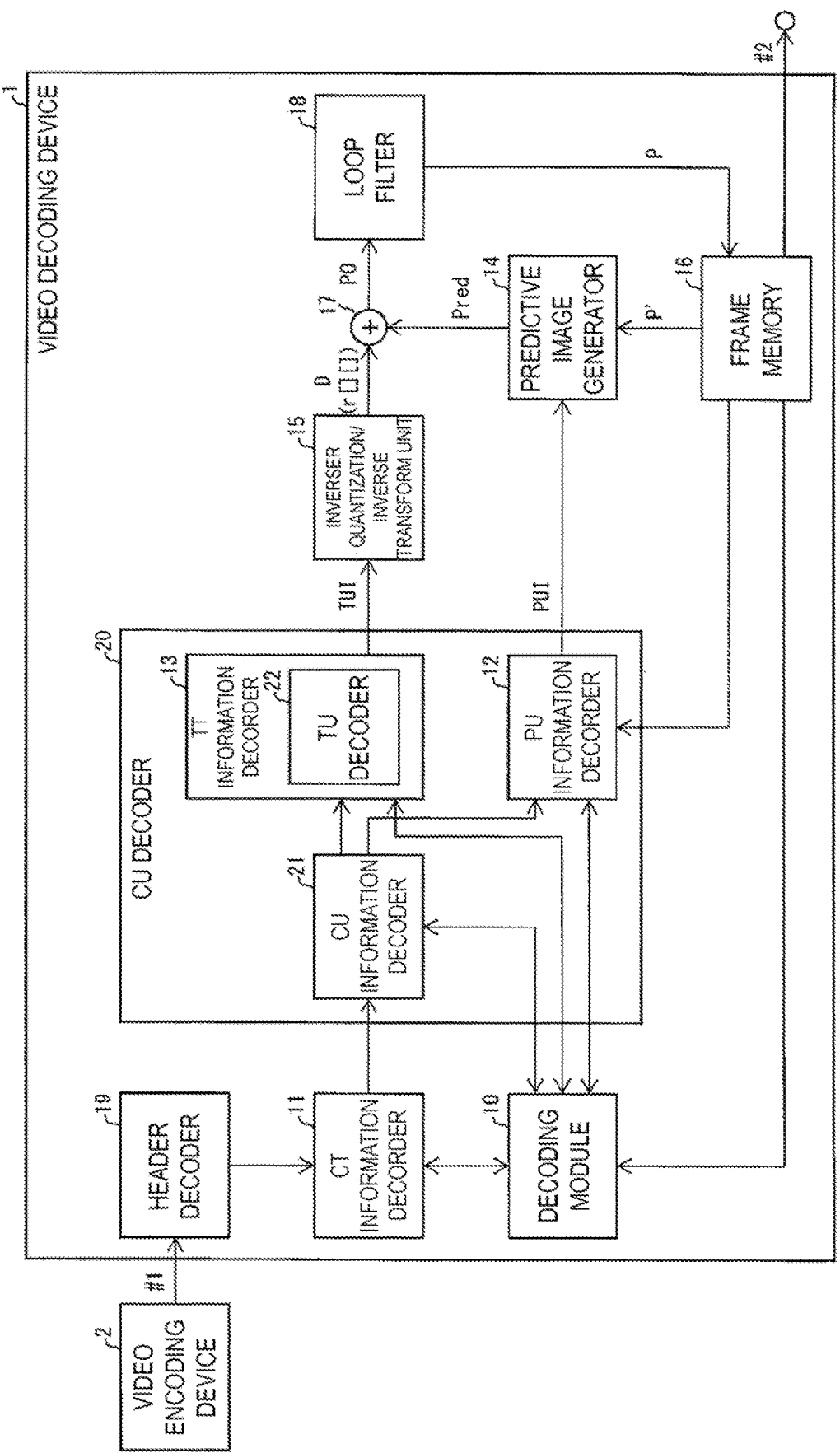
FIG. 2 is a functional block diagram illustrating a schematic configuration of the video decoding device.

FIG. 1 is a flowchart schematically describing operations of the video decoding device 1.

(S1100: Parameter set information decoding) The header decoder 19 decodes the coded data #1 into parameter set information of VPS, SPS, PPS, and the like.

(S1200: Slice information decoding) The header decoder 19 decodes the coded data #1 into a slice header (slice information).

Hereinafter, the video decoding device 1 derives a decoded image of each CTU included in the target picture by repeating the processing from S1300 to S5000.

(S1300: CTU information decoding) The CT information decoder 11 decodes the coded data #1 into a Coding Tree Unit (CTU).

(S1400: CT information decoding) The CT information decoder 11 decodes the coded data #1 into a Coding Tree (CT).

(S1500: CU decoding) The CU decoder 20 decodes the coded data #1 into a Coding Unit (CU) by performing the processing at S1510, at S1600, and at S1700.

(S1510: CU information decoding) The CU information decoder 21 decodes the coded data #1 into a CU information.

(S1600: PU information decoding) The PU information decoder 12 decodes the coded data #1 into prediction unit information (PU information PTI).

(S1700: TT information decoding) The TT information decoder 13 decodes the coded data #1 into a transform tree TT.

(S2000: Predictive image generation) The predictive image generator 14 generates, based on the PU information PUI, a predictive image Pred for each PU included in the target CU.

(S3000: Inverse quantization/inverse transform) The inverse quantization/inverse transform unit 15 performs, based on the TT information TTI, an inverse quantization/inverse transform processing for each TU included in the target CU.

(S4000: Decoded image generation) The adder 17 generates a decoded image P0 for the target CU by adding the predictive image Pred supplied from predictive image generator 14 and a predictive residue D supplied from the inverse quantization/inverse transform unit 15.

(S5000: Loop filter) The loop filter 18 generates a decoded image P by applying, to the decoded image P0, the loop filtering such as a deblocking filter and a sample adaptive filter (SAO).

[Decoding Module]

Operations of each module will be described schematically below. The decoding module 10 performs a decoding processing to decode binary values into syntax values. To be more specific, the decoding module 10 decodes, based on the coded data and the syntax type supplied from the supply source, a syntax value coded by an entropy coding scheme such as the CABAC. Then, the decoding module 10 returns the decoded syntax value to the supply source.

In the following example, the supply sources of the coded data and the syntax types are the CT information decoder 11, and the CU decoder 20 (CU information decoder 21, the PU information decoder 12, and the TT information decoder 13).

[Header Decoder]

The header decoder 19 decodes a video parameter set (VPS), an SPS, a PPS, and a slice header of the coded data #1 input from the video encoding device 2.

[CT Information Decoder]

The CT information decoder 11 performs, by use of the decoding module 10, a decoding processing on the coded data #1 input from the video encoding device 2 at the level of the Coding Tree Unit layer and at the level of the Coding Tree layer. Specifically, the CT information decoder 11 decodes the coded data #1 into CTU information and CT information in accordance with the following procedure.

First, the CT information decoder 11 decodes the Coding Tree Unit header CTUH of the CTU information by use of the decoding module 10. Next, the CT information decoder 11 proceeds to the decoding of the CT. the CT information decoder 11 decodes the CU split flag SP of the CT information. The target CT is split and decoded recursively until the SP stops notifying any further splitting. Finally, the CT information decoder 11 decodes the Coding Tree Unit footer CTUF of the CTU information.

[CU Decoder]

The CU decoder 20 includes a CU information decoder 21, a PU information decoder 12, and a TT information decoder 13. The CU decoder 20 decodes the CU information of the lowest Coding Tree CT (i.e., CU), the PUI information, and the TTI information.

[CU Information Decoder]

The CU information decoder 21 decodes the CU information (skip flag SKIP, CU prediction mode information PredMode, PU split type information PartMode, and the like) of each CU by use of the decoding module 10.

[PU Information Decoder]

The PU information decoder 12 decodes the PU information (a merge flag (merge_flag), a merge index (merge_idx), an estimated motion vector index (mvp_idx), a reference image index (ref_idx), an inter-prediction identifier (inter_pred_flag), a motion vector residue (mvd), and the like) of each PU by use of the decoding module 10.

[TT Information Decoder]

The TT information decoder 13 decodes each TTI (a TU split flag SP_TU (split_transform_flag), a CU residue flag CBP_TU (cbf_cb, cbf_cr, cbf_luma), a TU, and the like) by use of the decoding module 10.

The TT information decoder 13 includes the TU decoder 22. The TU decoder 22 decodes QP update information (a quantization correction value) in a case where the TU contains a residue. The QP update information is a value indicating a differential value from a quantization-parameter predictive value qPpred, which is a predicted value of the quantization parameter QP. The TU decoder 22 decodes the quantized predictive residue (residual_coding).

Figure 5:
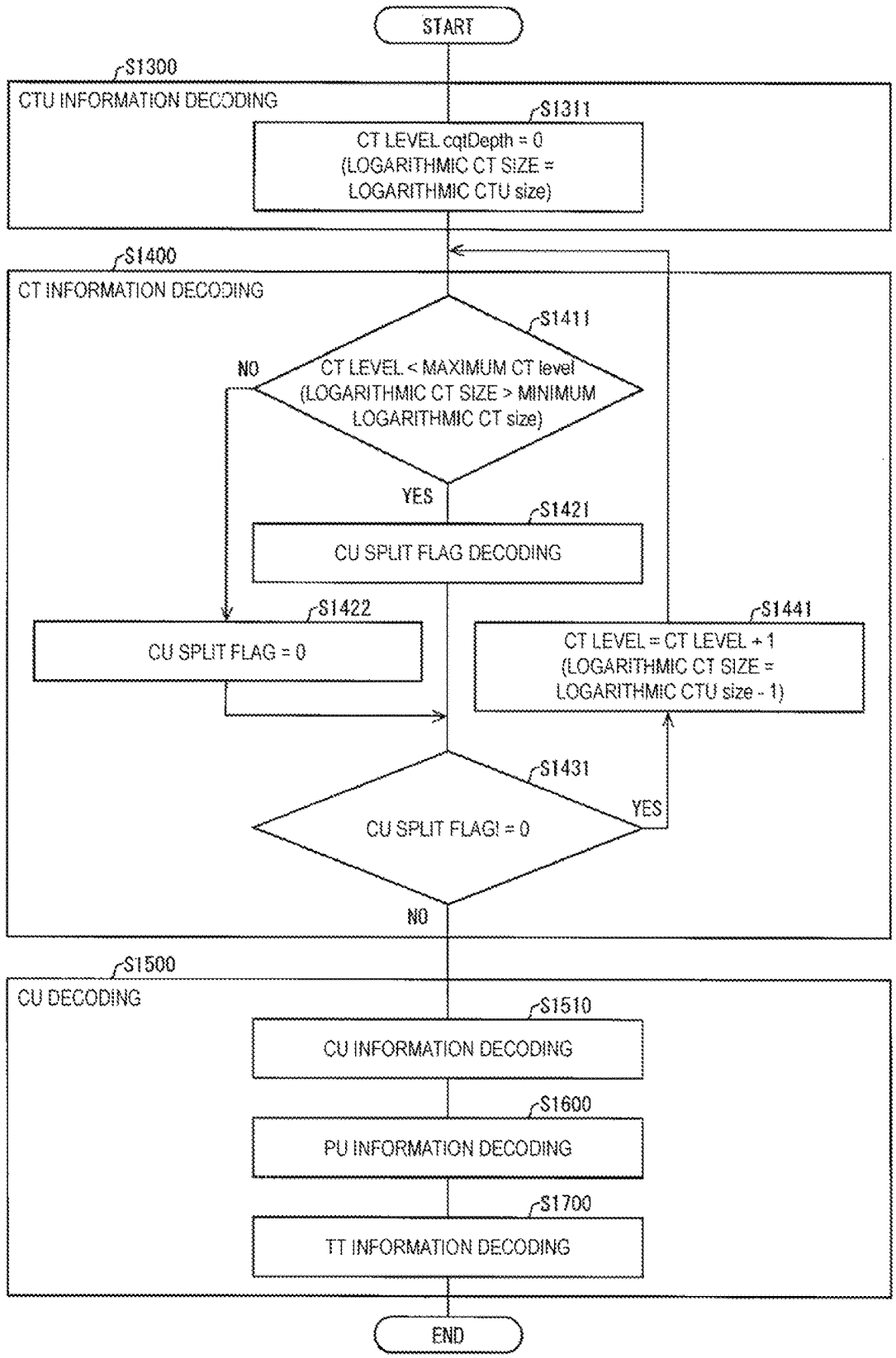
FIG. 5 is a flowchart schematically describing operations of a CT information decoder (CTU information decoding at S1300, and CT information decoding at S1400) according to an embodiment of the present invention.

To be more specific, the CT information decoder 11 performs the following operations illustrated in FIG. 5. FIG. 5 is a flowchart schematically describing operations of the CT information decoder 11 (CTU information decoding S1300 and CT information decoding S1400) according to an embodiment of the present invention.

FIG. 9 illustrates an exemplar configuration of CTU information and an exemplar configuration of a syntax table of CT information according to an embodiment of the present invention.

(S1311) The CT information decoder 11 decodes the coded data #1 into CTU information and initializes the variable to manage the Coding Tree CT that is to be recursively split. Specifically, as the following equation describes, by setting zero to the CT level (CT depth) cqtDepth indicating the level of the Coding Tree, a logarithmic size of the Coding Tree Unit Ctb Log 2SizeY is set, as an initial value, to the size of the Coding Tree, or the CT size (logarithmic CT size log 2CbSize in this example).

$$cqtDepth=0$$

$$\log 2CbSize = Ctb \log 2SizeY$$

It should be noted that the CT level cqtDepth for the highest level is assumed to be zero and to be incremented by 1 as the level goes deeper to the lower side. This, however, is not the only possible way. In the above-described case, by limiting the CT size and the CTU size to an exponential power of 2 (4, 8, 16, 32, 64, 128, 256, etc.), these sizes are treated as base 2 logarithms, but this is not the only possible way. In cases where the sizes are 4, 8, 16, 32, 64, 128, and 256, their respective logarithmic values are 2, 3, 4, 5, 6, 7, and 8.

Hereinafter, the CT information decoder 11 decodes, recursively, the Coding Tree CT (coding_quadtree) (S1400).

The CT information decoder 11 decodes the highest (root) Coding Tree coding_quadtree (xCtb, yCtb, CtbLog 2SizeY, 0) (SYN1400). Note that (xCtb, yCtb) are the upper-left coordinates of the CTU, and that CtbLog 2SizeY is the logarithmic size of the CTU (e.g., 6, 7, and 8 corresponds to the sizes of 64, 128, and 256, respectively).

(S1411) The CT information decoder 11 determines whether the logarithmic CT size log 2CbSize is larger than the logarithmic value of the prescribed minimum CT size Min Cb Log 2SizeY (SYN1411). In a case where the logarithmic CT size log 2CbSize is larger than the Min Cb Log 2SizeY, the CT information decoder 11 proceeds to S1421. Otherwise, it proceeds to S1422.

(S1421) If it is determined that the logarithmic CT size log 2CbSize is larger than the Min Cb Log 2SizeY, the CT information decoder 11 decodes the CU split flag (split_cu_flag), which is a syntax element indicated in SYN1421.

(S1422) Otherwise (i.e., in a case where the logarithmic CT size log 2CbSize is equal to or smaller than the Min Cb Log 2SizeY), or in a case where no CU split flag split_cu_flag appears in the coded data #1, the CT information decoder 11 does not decode the coded data #1 into the CU split flag split_cu_flag. Instead, a value 0 is derived for the CU split flag split_cu_flag.

(S1431) In a case where the CU split flag split_cu_flag is non-zero (i.e., equals to 1) (SYN1431), the CT information decoder 11 performs the processing at S1441 (to be described later), and proceeds down to the next level (i.e, a level lower) and repeats the processing from S1411 onwards. Hence, the CT information decoder 11 decodes 4 Coding Trees CTs each of which has a logarithmic CT size log 2CbSize−1 at positions of the CT level cqtDepth+1 (x0, y0), (x1, y0), (x0, y1), and (x1, y1). Also in the lower Coding Tree CT, the CT information decoder 11 continues CT information decoding S1400 started at S1411.

$$\text{coding\_quadtree}(x0,y0,\log 2CbSize-1,cqtDepth+1) \quad (SYN1441A)$$

$$\text{coding\_quadtree}(x1,y0,\log 2CbSize-1,cqtDepth+1) \quad (SYN1441B)$$

$$\text{coding\_quadtree}(x0,y1,\log 2CbSize-1,cqtDepth+1) \quad (SYN1441C)$$

$$\text{coding\_quadtree}(x1,y1,\log 2CbSize-1,cqtDepth+1) \quad (SYN1441D)$$

Note that (x0, y0) are upper-left coordinates of the target Coding Tree; (x1, y1) are derived by adding ½ of the logarithmic CT size (1<<log 2CbSize) to (x0, y0) as described in the following equations.

$$x1=x0+(1<<(\log 2CbSize-1))$$

$$y1=y0+(1<<(\log 2CbSize-1))$$

Note that the symbol "<<" means a left shift. The "1<<N" is equivalent to the n-th power of 2 (the same hereinafter). Likewise, hereinafter the ">>" means a right shift.

In a case other than the case described above, (i.e., a case where the CU split flag split_cu_flag is 0), the CT information decoder 11 proceeds to S1500 to decode the Coding Unit CU.

(S1441) The CT level cqtDepth indicating the level of the Coding Tree is updated by adding 1, whereas the logarithmic CT size log 2CbSize, which is the logarithmic value of the Coding Unit size, is updated by subtracting 1.

$$cqtDepth=cqtDepth+1$$

$$\log 2CbSize=\log 2CbSize-1$$

Figure 6:
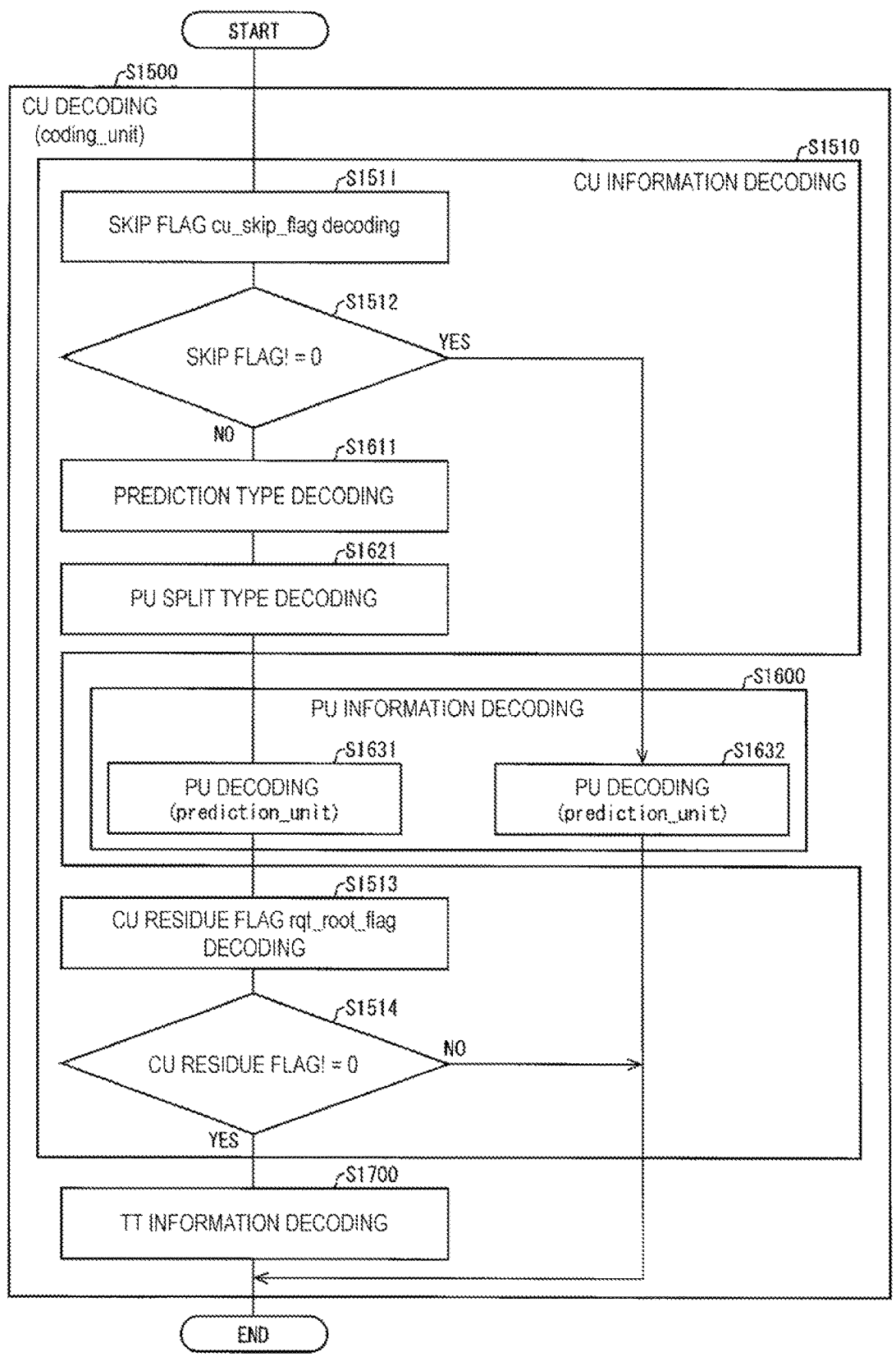
FIG. 6 is a flowchart schematically describing operations of a CU decoder (CU decoding at S1500), a CU information decoder 21 (CU information decoding at S1510), a PU information decoder (PU information decoding at S1600), and a TT information decoder (TT information decoding at S1700) according to an embodiment of the present invention.

FIG. 6 is a flowchart schematically describing operations of a CU decoder 20 (CU decoding at S1500), a CU information decoder 21 (CU information decoding at S1510), a PU information decoder 12 (PU information decoding at S1600), and a TT information decoder 13 (TT information decoding at S1700) according to an embodiment of the present invention. FIG. 10 illustrates an exemplar configuration of a syntax table of CU information, PT information PTI, and TT information TTI according to an embodiment of the present invention.

[CU Decoder]

(S1500) The CU decoder 20 decodes the Coding Unit CU (coding unit(x0, y0, log 2CbSize)) (SYN1500). Note that (x0, y0) are the upper-left coordinates of the Coding Unit. The log 2CbSize, which is the logarithmic size of the Coding Unit, is notified of by the CT information decoder 11. The processing of the CU decoder 20 is performed, specifically, by the CU information decoder 21, the PU information decoder 12, and the TT information decoder 13 as described below.

[CU Information Decoder]

CU information decoder 21 decodes the CU information (a skip flag, CU prediction mode information PartMode, PU split type information, and a residual root flag) by use of the decoding module 10.

(S1511) The CU information decoder 21 decodes the coded data #1 into a skip flag cu_skip_flag (SKIP in FIG. 3E) by use of the decoding module 10.

(S1512) The CU information decoder 21 determines whether the skip flag cu_skip_flag is non-zero (i.e, equals to 1). In a case where the skip flag cu_skip_flag is non-zero, the CU information decoder 21 notifies the PU information decoder 12 of the determination result. In a case where the skip flag cu_skip_flag is 0, the CU information decoder 21 decodes the CU prediction mode information pred_mode_flag (at S1513), and also decodes the PU split type information PartMode (part_mode) (at S1514). Then the CU information decoder 21 notifies the PU information decoder 12 of the two decoding processings. Then, the CU information decoder 21 decodes the residual root flag rqt_root_flag (at S1515), and determines whether the residual root flag is non-zero or is not non-zero (at S1516). In a case where the residual root flag is 0, the CU information decoder 21 finishes the processing. In a case where the residual root flag is non-zero, the CU information decoder 21 notifies the TT information decoder 13 of the determination result.

[PU Information Decoder]

The PU information decoder 12 performs a processing of decoding the PU information PUI by use of the decoding module 10. The PU information decoder 12 decodes the PU information PUI specifically in accordance with the following procedure.

PU information decoder 12 determines the PU split type for the target CU by referring to the PU split type information PartMode, which is configured in advance or which is notified of by the CU information decoder 21. Subsequently, the PU information decoder 12 sets sequentially the PUs in included in the target CU as the target PUs and then performs a decoding processing on the pieces of the PU information corresponding to the target PUs.

To put it differently, the PU information decoder 12 performs a decoding processing on the pieces of the PU information corresponding to the target Pus to obtain the parameters to be used for generating the predictive image Pred.

The PU information decoder 12 supplies the decoded pieces of PU information PUI for the target PUs to the predictive image generator 14.

To be more specific, the PU information decoder 12 performs the following operations as illustrated in FIG. 6. FIG. 6 is a flowchart schematically describing operations of the PU information decoding illustrated in S1600.

FIG. 11 illustrates an exemplar configuration of a syntax table of PU information PUI according to an embodiment of the present invention.

(S1631) The PU information decoder 12 decodes the coded data #1 into each PU information included in the target CU in accordance with the number of the PU splits indicated by the PU split type information PartMode.

For instance, in a case where the PU split type is of the 2N×2N, the PU information decoder 12 decodes the coded data #1 into the following single piece of PU information PUI by making the CU a single PU.

Prediction_unit($x0,y0,nCbS,nCbS$)　　　(SYN1631A)

In a case where PU split type is of the 2N×N, The PU information decoder 12 decodes the coded data #1 into the following two pieces of PU information PUI by splitting the CU into an upper part and a lower part.

Prediction_unit($x0,y0,nCbS,nCbS/2$)　　　(SYN1631B)

Prediction_unit($x0,y0+(nCbS/2),nCbS,nCbS/2$)　　　(SYN1631C)

In a case where the PU split type is of the N×2N, the PU information decoder 12 decodes the coded data #1 into the following two pieces of PU information PUI by splitting the CU into a left part and a right part.

Prediction_unit($x0,y0,nCbS/2,nCbS$)　　　(SYN1631D)

Prediction_unit($x0+(nCbS/2),y0,nCbS/2,nCbS$)　　　(SYN1631E)

In a case where the PU split type is of the N×N, the PU information decoder 12 decodes the coded data #1 into the following four pieces of PU information PUI by quadrisecting the CU.

Prediction_unit($x0,y0,nCbS/2,nCbS/2$)　　　(SYN1631F)

Prediction_unit($x0+(nCbS/2),y0,nCbS/2,nCbS/2$)　　　(SYN1631G)

Prediction_unit($x0,y0+(nCbS/2),nCbS/2,nCbS/2$)　　　(SYN1631H)

Prediction_unit($x0+(nCbS/2),y0+(nCbS/2),nCbS/2,nCbS/2$)　　　(SYN1631I)

(S1632) In a case where the skip flag is 1, the PU information decoder 12 decodes the coded data #1 into a single piece of PU information PUI by employing the PU split type of 2N×2N.

Prediction_unit($x0,y0,nCbS,nCbS$)　　　(SYN1632S)

[TT Information Decoder]

In a case where the residual root flag rqt_root_cbf obtained by the decoding in the CU information decoder 21 is non-zero (i.e., equals to 1), the processing proceeds to S1700 for obtaining the decoded TT information TTI through the processing performed by the TT information decoder 13. In a case where the residual root flag rqt_root_cbf is 0, the processing of decoding the coded data #1 into the TT information TTI of the target CU does not be performed. Instead, the TT information TTI is derived by assuming that the target CU has no TU split and that the quantized prediction residual of the target CU is 0.

The TT information decoder 13 performs a decoding processing to obtain the TT information TTI (TU split information, a CU residue flag, an AMT flag, and TU) by use of the decoding module 10.

[Predictive Image Generation Unit]

The predictive image generator 14 generates, based on the PU information PUI, a predictive image Pred for each PU included in the target CU. Specifically, the predictive image generator 14 generates a predictive image Pred from a locally decoded image P', which is an already decoded image, by performing either the intra-prediction or the inter-prediction in accordance with the parameters included in the PU information PUI corresponding to the target PU. The predictive image generator 14 supplies the predictive image Pred thus generated to the adder 17.

Now, a description is provided below to explain a technique by which the predictive image generator 14 generates a predictive image Pred of the PU included in the target CU based on motion-compensated prediction parameters (a motion vector, a reference image index, and an inter-prediction identifier).

In a case where the inter-prediction identifier indicates a uni-prediction, the predictive image generator 14 generates a predictive image Pred by use of the decoded image of the position indicated by the motion vector in the reference image indicated by the reference image index.

On the other hand, in a case where the inter-prediction identifier indicates a b-prediction, the predictive image generator 14 generates a predictive image by motion compensation for each of the two combinations of a reference image index and a motion vector. Then, a final predictive image Pred is generated by calculating the average or by weight-adding to each predictive image based on the display time intervals of the target picture and of each reference image.

[Inverse Quantization/Inverse Transform Unit]

Based on the TT information TTI, the inverse quantization/inverse transform unit 15 performs an inverse quantization/inverse transform processing for each TU included in the target CU. Specifically, the inverse quantization/inverse transform unit 15 restores the predictive residue D for each pixel by performing an inverse quantization and an inverse orthogonal transform on a quantization transform coefficient qd[ ][ ] included in the target TU. Hence, the transform where the inverse quantization/inverse transform unit 15 performs restoration (inverse operation) is a processing for mapping so that the energy (total sum of variances) is concentrated (i.e., biased) on a small number of components of multiple-component information. The performance of the transform depends on how small number of components the energy can be concentrated on.

Note that the transform mentioned above refers to, for instance, an orthogonal transform from the pixel domain to the frequency domain. Hence, the inverse transform is a transform from the frequency domain to the pixel domain. Some exemplar inverse transforms are an Inverse Discrete Cosine Transform (inverse DCT transform) and an Inverse Discrete Sine Transform (inverse DST transform). The inverse quantization/inverse transform unit 15 supplies the restored predictive residue D to the adder 17.

The inverse quantization/inverse transform unit 15 can restore the predictive residue D not only by the above-described inverse transform but also by an Adaptive Multiple Core Transform (AMT) (first transform) and/or a Secondary Transform (second transform). The AMT is a transform adaptively selected in accordance with: which one of the intra- and the inter-prediction methods is employed; how large is the block size; and which type of signal is employed, a luminance signal or a chromaticity signal. The Secondary Transform is a transform selected in the intra-prediction mode. More detailed description of the Adaptive Multiple Core Transform and the Secondary Transform will be given later.

[Adder]

The adder 17 generates a decoded image P0 of the target CU by adding together the predictive image Pred supplied from the predictive image generator 14 and the predictive residue D supplied from the inverse quantization/inverse transform unit 15.

[Loop Filter]

The loop filter 18 generates a decoded image P by filtering the decoded image P0 of the target CU by use of, for instance, a deblocking filter, a sample adaptive offset filter SAO, an adaptive loop filter ALF, or the like.

[Frame Memory]

In the frame memory 16, the decoded images P having been subjected to the filtering by the loop filter are recorded sequentially together with the parameters used for decoding the decoded image P. Decoded images corresponding to all the Coding Tree Units decoded before a target Coding Tree Unit (e.g., all the preceding Coding Tree Unit in the raster scan order) at the time of decoding that target Coding Tree Unit are recorded in the frame memory 16. An exemplar decoding parameter to be recorded in the frame memory 16 is CU prediction mode information (PredMode).

At the time when the decoded-image generation processing for every Coding Tree Unit in an image is finished, the video decoding device 1 outputs, to the outside, the decoded image #2 corresponding to the coded data #1 for a single frame having been inputted into the video decoding device 1.

Adaptive Multiple Core Transform and Secondary Transform

Figure 14:
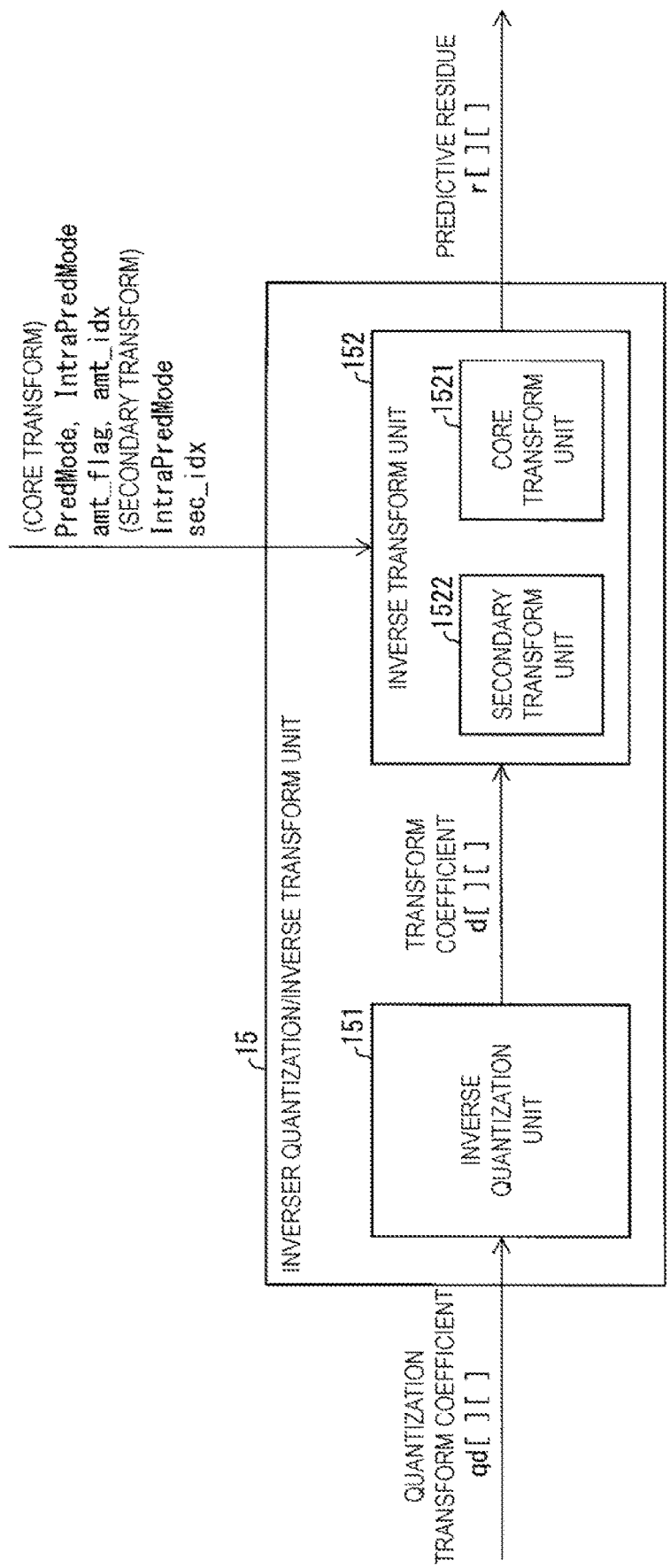
FIG. 14 is a functional block diagram illustrating an exemplar configuration describing an inverse quantization/inverse transform unit according to an embodiment of the present invention.

FIG. 14 is a functional block diagram illustrating an exemplar configuration describing an inverse quantization/inverse transform unit 15. As illustrated in FIG. 14, the quantization/inverse transform unit 15 includes an inverse quantization unit 151 and an inverse transform unit 152. The inverse quantization unit 151 inversely quantizes the quantization transform coefficient qd[ ][ ] obtained by the decoding performed by the TU decoder 22 in the TT information decoder 13, and thus derives a transform coefficient d[ ][ ]. The inverse quantization unit 151 sends the derived transform coefficient d[ ][ ] to the inverse transform unit 152.

The inverse transform unit 152 inversely transforms the received transform coefficient d[ ][ ], and thus restores the predictive residue r[ ][ ] (in FIG. 2, expressed as "D"). The restored predictive residue r[ ][ ] is sent from the inverse transform unit 152 to the adder 17.

The inverse transform unit 152 can employ the Adaptive Multiple Core Transform and the Secondary Transform.

Note that the transform processing and the inverse transform processing differ from each other only in the value of the coefficient to be used as the transform base. In the description from now onward, the transform processing performed in the inverse transform unit 152 is referred to with the term "transform" instead of the term "inverse transform".

<Adaptive Multiple Core Transform>

The inverse transform unit 152 is capable of adaptively switching the transform method. In this specification, a term Adaptive Multiple Core Transform is used for mentioning a transform that is switchable by means of an explicit flag or index, a prediction mode, and the like. The transform (core transform) used in the Adaptive Multiple Core Transform is a separable transform including a vertical transform and a horizontal transform. The transform base of the core transform is DCT2, DST7, DCT8, DST1, and DCT5. In the Adaptive Multiple Core Transform, the vertical transform and the horizontal transform independently switches their respective transform bases. Selectable transforms are not limited to those mentioned above. Other transforms (transform bases) may also be used. Note that the DCT2, DST7, DCT8, DST1, and DCT5 may sometimes be expressed as the DCT-II, DST-VII, DCT-VIII, DST-I, and DCT-V, respectively.

The Adaptive Multiple Core Transform refers to the AMT flag (amt_flag) obtained by the decoding of the coded data, and thus switches the transform scheme between a fixed transform, where no switching by use of an index is performed, and a selective transform, where switching by use of an index is performed. In a case of amt_flag=0, a fixed transform is used; in a case of amt_flag=1, a selective transform is used. In the fixed transform (amt_flag=0), no AMT index amt_idx is referred to. Instead, the transform is performed by use of a fixed transform, specifically, DCT2 or DST7, in this example. In the selective transform (amt_flag=1), the AMT index amt_idx to be used for the selection is further obtained by the decoding of the coded data, and the transform is switched in accordance with the prediction mode and the AMT index amt_idx. Note that the example described in the present embodiment is one where the AMT flag is obtained by the decoding with the CU or the TU used as the unit, and where the AMT index amt_idx is obtained by the decoding with the TU used as the unit. The unit of the decoding (switching) is not limited to those described above.

The AMT index amt_idx is a switching index for selecting the transform base for the Adaptive Multiple Core Transform. The high bits of AMT index amt_idx are assigned to a transform selection flag for the vertical transform selection flag; the low bits of the amt_idx are assigned to the transform selection for the horizontal transform. The amt_trans_idx_ver, which is a transform selection flag amt_trans_idx of the vertical transform, and the amt_trans_idx_hor, which is a transform selection flag amt_trans_idx of the horizontal transform, are derived by the following equations.

$$amt\_trans\_idx\_ver = amt\_idx >> 1$$

$$amt\_trans\_idx\_hor = amt\_idx \ \&1$$

The amt_trans_idx_ver and the amt_trans_idx_hor are collectively referred to as the amt_trans_idx.

In a case of using a flag vertTrFlag indicating whether the transform is a vertical transform or a horizontal transform (1 for a vertical transform and 0 for a horizontal transform), the amt_trans_idx may be derived from the following equation.

$$amt\_trans\_idx = (vertTrFlag)?amt\_trans\_idx\_ver:amt\_trans\_idx\_hor$$

Note that the assignment of some of the bits of the amt_trans_idx to the vertical transform and to the horizontal transform is not limited to the examples above. Instead, the following assignment may be employed.

amt_trans_idx_ver=amt_idx &1 amt_trans_idx_hor=amt_idx>>1

The transform to be used in the Adaptive Multiple Core Transform is selected from the above-mentioned multiple transform bases by use of the prediction mode (intra- and inter-prediction modes) and of the transform selection flag (amt_trans_idx). FIG. 15A is a chart used for explaining a table of the transform set coreTrSet. A selection method will be described by use of this chart.

In a case of the intra-prediction mode, a transform to be used is selected from the 3 transform sets with the Names of TrSetIntra0, TrSetIntra1, and TrSetIntra2. Each transform set has two transform bases. For instance, the TrSetIntra0 has DST7 and DCT8 as a set. Then, which of the two transform bases is to be used is switched by use of the transform selection flag (amt_trans_idx). Suppose a case, for instance, of the TrSetIntra0. In this case, DST7 is selected with amt_trans_idx=0, but DCT8 is selected with amt_trans_idx=1.

In the inter-prediction mode, TrSetInter is the only possible transform set. The transform base out of the two transform bases of the TrSetInter to be used is switched by use of the transform selection flag (amt_trans_idx) as in the case of the intra-prediction mode.

The transform set out of the three transform sets (TrSetIntra0, TrSetIntra1, and TrSetIntra2) in the intra-prediction mode to be used is determined with reference to the intra-prediction mode IntraPredMode. This is illustrated in FIG. 16. FIG. 16 illustrates which transform set the horizontal transform and the vertical transform of each of the 35 different intra-prediction modes IntraPredMode select. The numbers 0, 1, and 2 in the table indicate the transform sets TrSetIntra0, TrSetIntra1, and TrSetIntra2, respectively. For instance, in a case of IntraPredMode=10, the value of the horizontal transform (Horizontal) in the table is 0. Hence, the transform set of TrSetIntra0 (=0) is used for the horizontal transform. In addition, the value of the vertical transform (Vertical) in the table is 2. Hence, the transform set of the TrSetIntra2 (=2) is used for the vertical transform.

Figure 17:
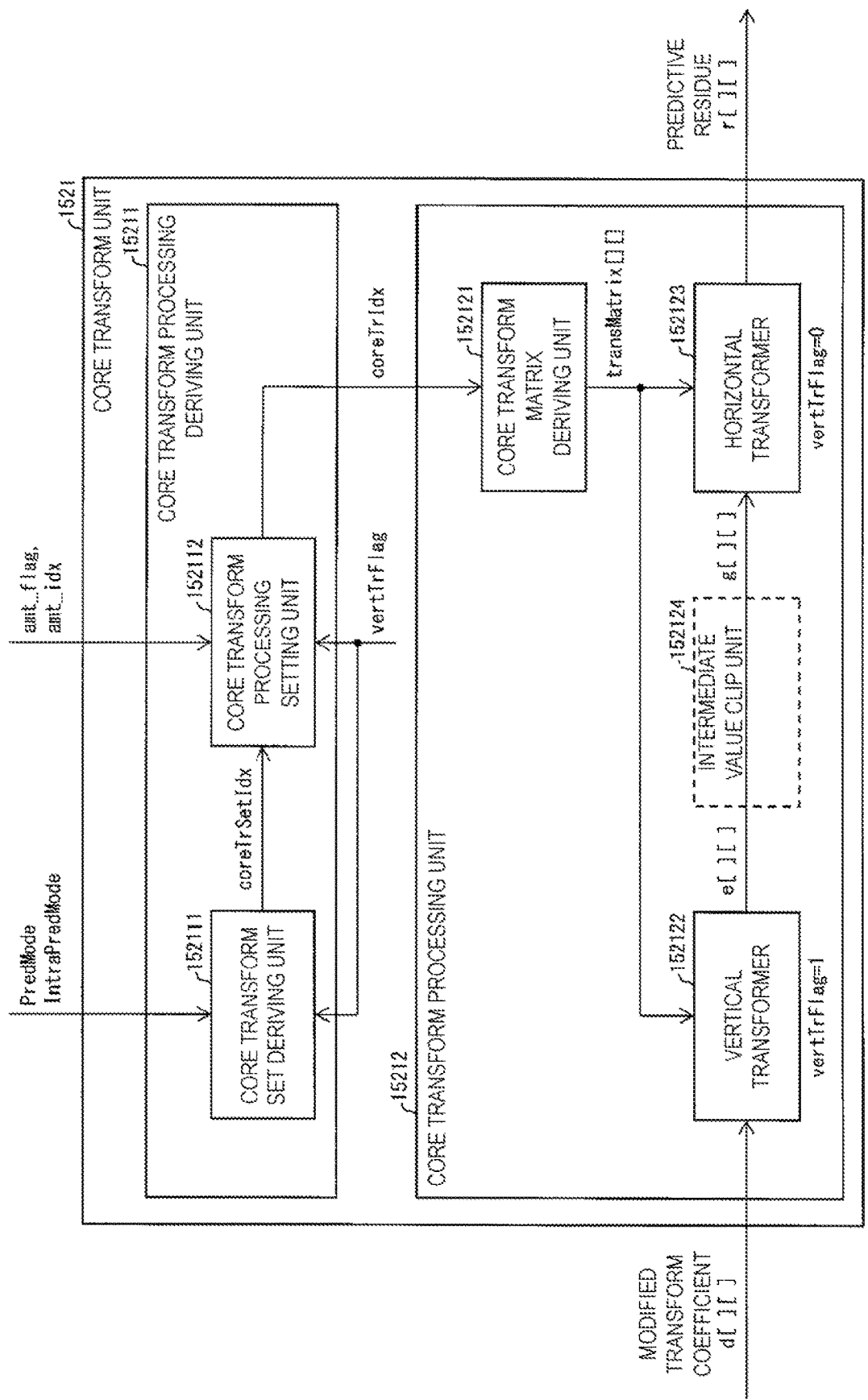
FIG. 17 is a functional block diagram illustrating an exemplar configuration describing an inverse transform unit according to an embodiment of the present invention.

The above-described Adaptive Multiple Core Transform will be described more specifically with reference to FIG. 17. The inverse transform unit 152 of FIG. 17 is an example of the inverse transform unit 152 of FIG. 14. A core transform unit 1521 (first transform unit) of FIG. 17 includes a core transform processing deriving unit 15211 that can derive a core transform to be used from multiple transform bases; and a core transform processing unit 15212 that can calculate a prediction residual r[ ][ ] from a (modified) transform coefficient d[ ][ ] by use of the derived core transform. In a case where no Secondary Transform is performed, the modified transform coefficient is equal to the transform coefficient. In a case where a Secondary Transform is performed, the modified transform coefficient has a different value from the transform coefficient. The core transform processing deriving unit 15211 includes: a core transform set deriving unit that can derive an index coreTrSetIdx of transform set to be used; and a core transform processing setting unit 152112 that can derive, by use of a coreTrSetIdx, a core transform index coreTrIdx to be used.

The core transform set deriving unit 152111 will be described below.

First, a table coreTrSet that collects 4 different transform sets (TrSetIntra0, TrSetIntra1, TrSetIntra2, TrSetInter) is provided below.

```
coreTrSet[ ][ ]=
{
    {DST7, DCT8}, /* TrSetIntra0 */
    {DST7, DST1}, /* TrSetIntra1 */
    {DST7, DCT5}, /* TrSetIntra2 */
    {DCT8, DST7} /* TrSetInter */
}
```

The core transform set deriving unit 152111 then derives, by the following equation, the index coreTrSetIdx of the transform set to be used.

coreTrSetIdx=(PredMode==PRED_INTER)?TrSetInter:coreTrSetTbl[IntraPredMode][vertTrFlag]

Here, the PredMode is an intra- or inter-prediction mode. The coreTrSetTbl and the vertTrFlag are the table described in FIG. 16 and a flag indicating either a horizontal transform or a vertical transform. For instance, in a case of the inter-prediction (PredMode=PRED_INTER), coreTrSetIdx=TrSetInter. Suppose a case of intra-prediction (PredMode=PRED_INTRA) and where intra-prediction mode IntraPredMode=10. In this case, the horizontal transform (vertTrFlag=0) makes coreTrSetIdx=TrSetIntra0, and the vertical transform (vertTrFlag=1) makes coreTrSetIdx=TrSetIntra2.

The core transform processing setting unit 152112 will be described below. The core transform processing setting unit 152112 derives, by the following equation, a core transform index coreTrIdx to be used.

coreTrIdx=(amt_flag==0)?fixedTr:coreTrSet[coreTrSetIdx][amt_trans_idx]

Where fixedTr indicates a fixed transform. In addition, the coreTrIdx is defined as follows (FIG. 15B).

coreTrIdx={*DCT2,DCT5,DCT8,DST1,DST7*}

Note that numerical values may be used for the coreTrIdx. Specifically, for instance, DCT2, DCT5, DCT8, DST1, and DST7 may be 0, 1, 2, 3, and 4, respectively.

In a case where amt_flag==0 and the fixed transform fixedTr is selected, both the transform base for the horizontal transform and for the vertical transform are DCT2 or DST7. Hence, DCT2 or DST7 may be selected as the coreTrIdx, and then may be subjected to a processing in the core transform processing unit 15212, or in an unillustrated processing unit dedicated to fixed transforms. Suppose that amt_flag=1 and an adaptive transform is selected. In this case, for instance, coreTrIdx=DST7 provided that coreTrStIdx=TrSetIntra0 and amt_trans_idx=0. In addition, coreTrIdx=DCT8 provided that coreTrStIdx=TrSetIntra0 and amt_trans_idx=1.

The core transform processing unit 15212 includes: a core transform matrix deriving unit 152121 that can derive a transform matrix indicated by the core transform index coreTrIdx; a vertical transformer 152122 that can perform a vertical transform on a modified transform coefficient d[ ][ ]; and a horizontal transformer 152123 that can perform a horizontal transform. The core transform processing unit 15212 first makes the core transform matrix deriving unit 152121 derive a transform matrix transMatrix[ ][ ] indicated by the core transform index coreTrIdx.

transMatrix[ ][ ]=coreTransMatrixTbl[coreTrIdx][ ][ ]

In the equation above, the coreTransMatrixIdx is a table storing the transform bases illustrated in FIG. 15B.

Note that the transform matrices of the vertical and the horizontal transforms may be distinguished from each other by expressing the transform matrix transMatrix of the vertical transform as transMatrixV and by expressing the transform matrix of the horizontal transform as transMatrixH.

Then, the core transform processing unit 15212 notifies the vertical transformer 152122 and the horizontal transformer 152123 of the transform matrices derived individually for the vertical and the horizontal transforms, and transforms the modified transform coefficient d[ ][ ] into a predictive residue r[ ][ ]. The vertical transformer 152122 transforms the modified transform coefficient d[ ][ ] into an intermediate value e[ ][ ] by a vertical one-dimensional transform, and sends the intermediate value e[ ][ ] to an intermediate value clip unit 152124. The intermediate clip unit 152124 derives an intermediate value g[ ][ ] by clipping the intermediate value e[ ][ ], and sends the intermediate value g[ ][ ] thus derived to the horizontal transformer 152123. The horizontal transformer 152123 transforms the intermediate value g[ ][ ] into a predictive residue r[ ][ ]. The predictive residue r[ ][ ] is sent from the horizontal transformer 152123 to the adder 17.

The vertical transformer 152121 (core transform processing unit 15212) derives a first intermediate value e[x][y].

$e[x][y]=\Sigma(\text{transMatrix}[y][j] \times d[x][j])(j=0 \ldots nTbS-1)$

In the equation above, transMatrix[ ][ ](=transMatrixV[ ][ ]) is a transform base expressed by a nTbS×nTbS matrix derived by the equation above in a case of a vertical transform (vertTrFlag=1). The nTbS is a TU size. In a case of a 4×4 transform (nTbS=4) with the coreTrIdx being DCT2, a transMatrix={{29 55 74 84} {74 74 0 −74} {84 −29 −74 55} {55 −84 74−29}} is used, for instance. The symbol $\Sigma$ means a processing of adding the products of a matrix transMatrix[y][j] and the transform coefficient d[x][j] for the subscription j from 0 to nTbS−1. Hence, the e[x][y] is obtained by arranging the columns obtained from the products of a vector x[j] (j=0 to nTbS−1) including the d[x][j] (j=0 to nTbS−1), which is identical to each column of the d[x][y], and the matrix elements transMatrix[y][j].

The intermediate clip unit 152124 (core transform processing unit 15212) clips a first intermediate value e[x][y], and thus derives a second intermediate value g[x][y].

$g[x][y]=\text{Clip3}(\text{coeff Min},\text{coeff Max},(e[x][y]+64)>>7)$

The numbers 64 and 7 in the equation above are determined based on the bit depth of the transform base. For the equation above, the transform base is assumed to be a 7-bit one. The coeff Min and the coeff Max are the minimum value and the maximum value of the clipping.

The horizontal transformer 152123 (core transform processing unit 15212) transforms the intermediate value g[x][y] into a prediction residual r[x][y] by a horizontal one-dimensional transform by use of a transform base transMatrix[ ][ ](=transMatrixH[ ][ ]) expressed by an nTbS×nTbS matrix derived by the equation above in a case of a vertical transform (vertTrFlag=1).

$r[x][y]=\Sigma \text{transMatrix}[x][j] \times g[j][y](j=0 \text{ to } nTbS-1)$ The symbol $\Sigma$ means a processing of adding the products of a matrix transMatrix[x][j] and g[j][y] for the subscription j from 0 to nTbS−1. Hence, the r[x][y] is obtained by arranging the rows obtained from the products of g[j][y](j=0 to nTbS−1), which is the rows of the g[x][y], and a matrix transMatrix.

Note that as an example of the transform, a vertical transform and a horizontal transform may be performed by use of a transformer provided below to transform a one-dimensional signal x[j] into a one-dimensional signal y[i]. The vertical transform is performed by setting an x-column transform coefficient d[x][j] in a one-dimensional transform coefficient x[j]. The horizontal transform is performed by setting a y-row intermediate coefficient g[j][y] in the x[j].

$y[i]=\Sigma(\text{transMatrix}[i][j] \times x[j])(j=0 \text{ to } nTbS-1)$

[Decoding of AMT Flag amt_flag]

Figure 7:
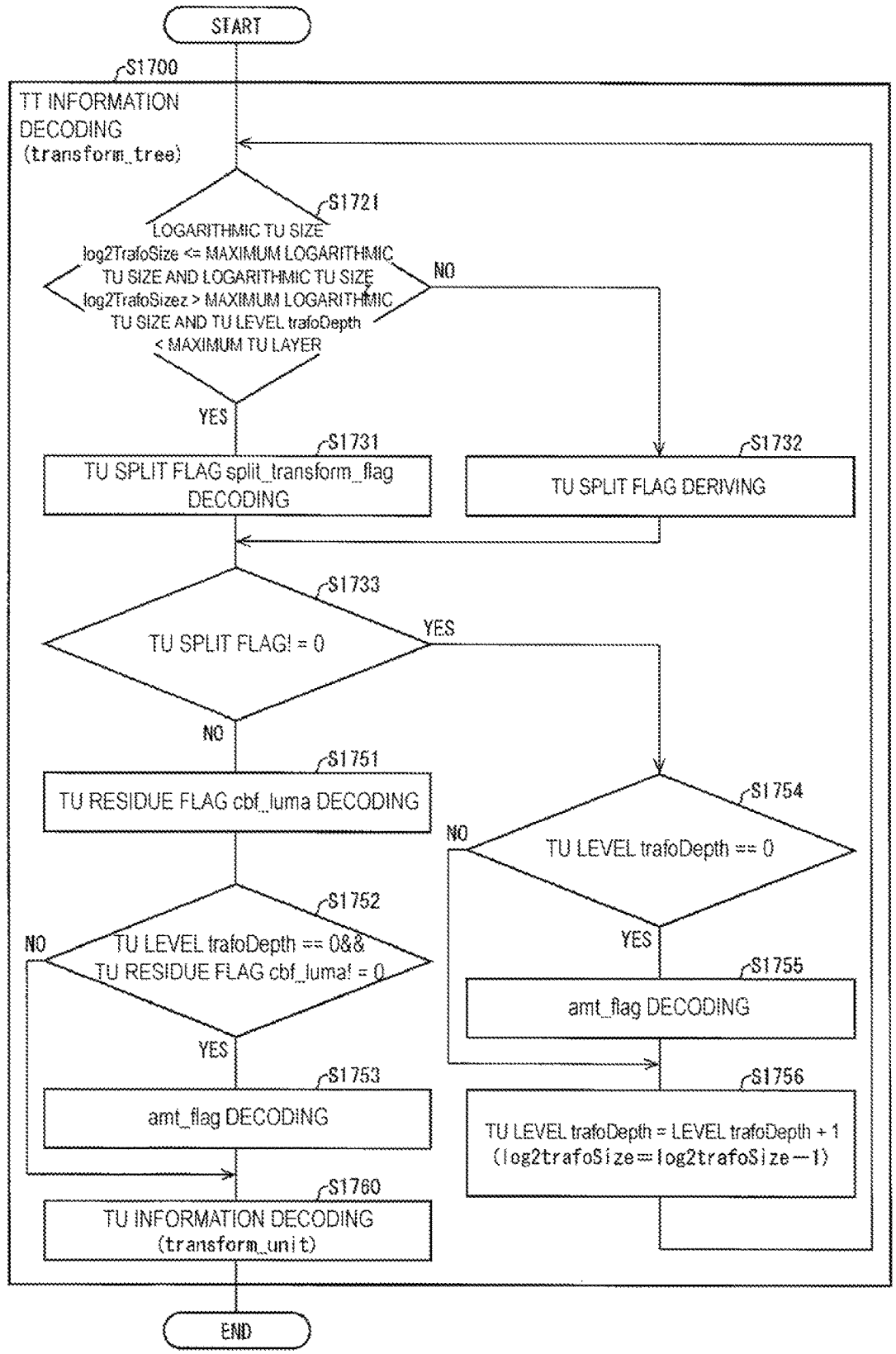
FIG. 7 is a flowchart schematically describing operations of a TT information decoder (TT information decoding at S1700) according to an embodiment of the present invention.

A decoding processing that the TT information decoder 13 performs to obtain an AMT flag amt_flag to be used in the Adaptive Multiple Core Transform will be described below with reference to FIG. 7 and FIG. 12. FIG. 7 is a flowchart schematically describing operations of the TT information decoder 13 (TT information decoding at S1700) according to an embodiment of the present invention. FIG. 12 illustrates an exemplar configuration of a syntax table of TT information TTI according to an embodiment of the present invention.

(S1731) The TT information decoder 13 performs a decoding to obtain a TU split flag (split_transform_flag) provided that the target TU size (e.g., logarithmic TU size log 2TrafoSize) is within a prescribed transform size range (in this case, not larger than the maximum logarithmic TU size Max Tb Log 2SizeY but larger than the minimum logarithmic TU size Min Tb Log 2SizeY) and that the TU level trafoDepth of the target TU is lower than a prescribed level (in this case, lower than the maximum TU level MaxTrafoDepth). To be more specific, as described in SYN1721, in a case where the logarithmic TU size log 2TrafoSize the maximum logarithmic TU size Max Tb Log 2SizeY, and where the logarithmic TU size log 2TrafoSize>the minimum logarithmic TU size Min Tb Log 2SizeY, and where the TU level trafoDepth<the maximum TU level MaxTrafoDepth (YES at S1721), the TT information decoder 13 proceeds to S1731, where the TT information decoder 13 performs a decoding to obtain the TU split flag (split_transform_flag) (at SYN1731).

(S1732) On the other hand, in a case where no split_transform_flag appears in the coded data #1, that is, in a case where the logarithmic TU size log 2TrafoSize>the maximum logarithmic TU size Max Tb Log 2SizeY, or in a case where the logarithmic TU size log 2TrafoSize≤the minimum logarithmic TU size Min Tb Log 2SizeY, or in a case where the TU level trafoDepth maximum TU level MaxTrafoDepth (NO at S1721), the TT information decoder 13 derives a TU split flag (split_transform_flag) from the coded data #1 to derive the TU split flag (split_transform_flag). To be more specific, in a case where the logarithmic TU size log 2TrafoSize is larger than the maximum logarithmic TU size Max Tb Log 2SizeY, the TT information decoder 13 derives a TU split flag split_transform_flag as a value indicating the performing of the splitting provided that the conditions indicated in SYN1721 are not satisfied. Otherwise (in a case where the logarithmic TU size log 2TrafoSize is equal to the minimum logarithmic TU size Max Tb Log 2SizeY, or the TU level trafoDepth is equal to the maximum TU level MaxTrafoDepth), the TT information decoder 13 derives the TU split flag split_transform_flag as a value (=0) indicating that no splitting is to be performed.

(S1755) In a case where the TU split flag split_transform_flag is a value (e.g., 1) indicating that the splitting is to be performed (YES at S1733) and where the TU level trafoDepth is 0 (YES at S1754), the TT information decoder 13 performs a decoding to obtain an AMT flag amt_flag (SYN1755). Note that even in a case where the TU split flag split_transform_flag is a value indicating that the splitting is to be performed (YES at S1733), the TT information decoder 13 does not decode the coded data to obtain the AMT flag amt_flag but proceeds to S1756 provided that the TU level trafoDepth is non-zero (NO at S1754). In such a case, the amt_flag obtained in AMT flag decoding (at S1755) in a higher transform tree TT is used as it is.

(1756) TT information decoder 13 recursively decodes a transform tree TT with a logarithmic CT size log 2CbSize−1, which is the target TU size in accordance with equations provided below, at 4 positions (x0, y0), (x1, y0), (x0, y1), (x1, y1) in the TU level trafoDepth+1 indicating the level of the transform tree.

transform_tree(x0,y0,x0,y0,log 2TrafoSize−1, trafoDepth+1,0)

transform_tree(x1,y0,x0,y0,log 2TrafoSize−1, trafoDepth+1,1)

transform_tree(x0,y1,x0,y0,log 2TrafoSize−1, trafoDepth+1,2)

transform_tree(x1,y1,x0,y0,log 2TrafoSize−1, trafoDepth+1,3)

Here, (x0, y0) indicates the upper-left coordinates of the target transform tree, and (x1, y1) are coordinates to be derived by adding half a target TU size (1<<log 2TrafoSize) to transform tree coordinates (x0, y0), as described in the following equations (SYN1756).

$x1=x0+(1<<(\log 2TrafoSize-1))$ $y1=y0+(1<<(\log 2TrafoSize-1))$

As described earlier, before the recursive decoding of the transform tree transform_tree, the TT information decoder 13 updates, in accordance with the following equations, the TU level trafoDepth, indicating the level of the transform tree TT, by adding 1 to the TU level trafoDepth, and also updates, by subtracting 1 from the logarithmic CT size log 2TrafoSize, the logarithmic CT size log 2TrafoSize which is the target TU size.

trafoDepth=trafoDepth+1 log 2TrafoSize=log 2TrafoSize−1

(S1751) On the other hand, in a case where the TU split flag split_transform_flag is 0 (NO at S1733), the TT information decoder 13 performs a decoding to obtain a TU residue flag (e.g., cbf_luma) indicating whether the target TU includes a residue. Here, a luminance residue flag cbf_luma is used as the TU residue flag indicating whether a residue is included in the luminance component of the target TU but this is not the only possible way.

(S1753) In a case where the TU level trafoDepth is 0, and where the TU residue flag (e.g., cbf_luma) is 0 (YES at S1752), the TT information decoder 13 preforms a decoding to obtain an AMT flag amt_flag (SYN1753). Otherwise (NO at S1752), no decoding to obtain the amt_flag is performed, making the amt_flag=0. Note that even in a case where the TU split flag split_transform_flag is a value indicating that the splitting is to be performed (non-zero in this case) (YES at S1733), the TT information decoder 13 does not decode the coded data to obtain the AMT flag amt_flag but proceeds to S1756 provided that the TU level trafoDepth is non-zero (NO at S1754). Otherwise (YES at S1757), a decoding to obtain an amt_flag is performed.

(S1760) In a case where the TU split flag split_transform_flag is 0 (NO at S1733), the TT information decoder 13 performs a decoding to obtain a transform unit indicated in SYN1760.

TU transform unit(x0,y0,xBase,yBase,log 2TrafoSize, trafoDepth,blkIdx)

Figure 8:
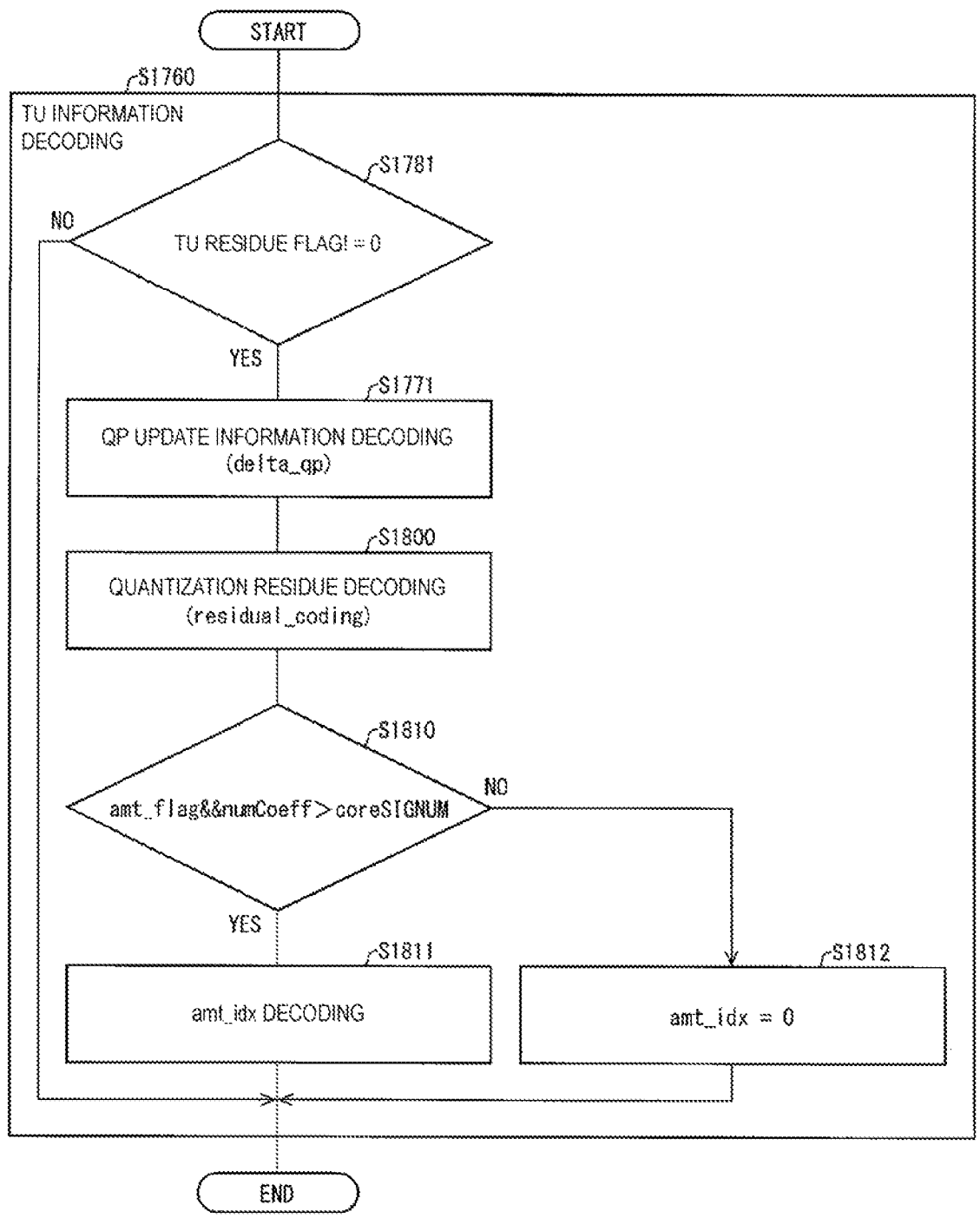
FIG. 8 is a flowchart schematically describing operations of a TU information decoder (TU information decoding at S1760) according to an embodiment of the present invention.

Next, a decoding processing performed by the TT information decoder 13 to obtain the TU information will be described with reference to FIG. 8 and FIG. 13. FIG. 8 is a flowchart schematically describing operations of the TT information decoder 13 (TU information decoding at S1760) according to an embodiment of the present invention. FIG. 13 illustrates an exemplar configuration of a syntax table of the TU information according to an embodiment of the present invention.

(S1781) The TT information decoder 13 determines whether a residue is contained in the TU (whether the TU residue flag is non-zero). In SYN1781, whether a residue is contained in the TU is determined by use of cbfLuma||cbfChroma derived by the following equations, but this is not the only possible method. Hence, a luminance residue flag cbf_luma indicating whether a residue is contained in the luminance component of the target TU may be used as the TU residue flag.

cbfLuma=cbf_luma[x0][y0][trafoDepth]

cbfChroma=cbf_cb[xC][yC][cbfDepthC]||cbf_cr[xC][yC][cbfDepthC])

Note that the cbf_cb and the cbf_cr are flags obtained by decoding the coded data #1 and respectively indicate whether a residue is contained in the chrominance components Cb and Cr of the target TU. The || represents a logical sum. Here, from the syntax elements cbf_luma, cbf_cb, cbf_cr of the luminance position (x0, y0) of the TU, the chrominance position (xC, yC) of the TU, the TU depth trafoDepth, and the cfbDepthC, a TU residue flag cbfLuma of the luminance and a TU residue flag cbfChroma of the chrominance are derived, and their sum (logical sum) is derived as the TU residue flag of the target TU.

(S1771) In a case where a residue is contained in the TU (the TU residue flag is non-zero), the TT information decoder 13 performs a decoding in the TU decoder 22 to obtain QP update information (quantization correction value). The QP update information is a value indicating a differential value from a quantization-parameter predictive value qPpred, which is a predicted value of the quantization parameter QP. Here, the differential value is obtained, as a syntax element of the coded data, through the decoding with an absolute value cu_qp_delta_abs and a sign cu_qp_delta_sign_flag. This, however, is not the only possible method.

(S1800) In a case where the TU residue flag (cbfLuma in this example) is non-zero, the TT information decoder 13 performs a decoding in TU decoder 22 to obtain a quantized predictive residue (residual_coding). The TT information decoder 13 and the TU decoder 22 may perform a decoding to obtain sequentially multiple color components as quantized predictive residues. In the illustrated example, in a case where the TU residue flag (cbfLuma in this example) is non-zero, the TT information decoder 13 performs a decoding to obtain a luminance quantized predictive residue (first color component) residual_coding (x0, y0, log 2TrafoSize, 0); in a case where a second color component residue flag cbf_cb is non-zero, the TT information decoder 13 performs a decoding to obtain the residual_coding (x0, y0, log 2TrafoSize, 0); and in a case where second color component residue flag cbf_cr is non-zero, the TT information decoder 13 performs a decoding to obtain a third color component quantized predictive residue residual_coding (x0, y0, log 2TrafoSizeC, 2).

(S1811) In a case where the AMT flag amt_flag is non-zero and where the number of non-zero coefficients numCoeff is larger than the coreSIGNUM (YES at S1810), the TT information decoder 13 performs a decoding to obtain AMT index amt_idx.

(S1812) Otherwise (in a case where the AMT flag amt_flag is 0, or where the number of non-zero coefficients numCoeff is not larger than the coreSIGNUM) (NO at S1810), the TT information decoder 13 does not decode the coded data to obtain AMT index amt_idx. Instead, the TT information decoder 13 outputs the AMT index amt_idx=0.
<Secondary Transform>

The inverse transform unit 152 can use not only the Adaptive Multiple Core Transform described above but also a Secondary Transform.

The Secondary Transform is one of the inverse transforms following the inverse quantization in the video decoding device 1. Such inverse transforms are performed in an order of first the Secondary Transform and then the Adaptive Multiple Core Transform (note that in the video encoding device 2, of such transforms, the Adaptive Multiple Core Transform is performed first, and then the Secondary Transform is performed. Then, the result is quantized).

Figure 18:
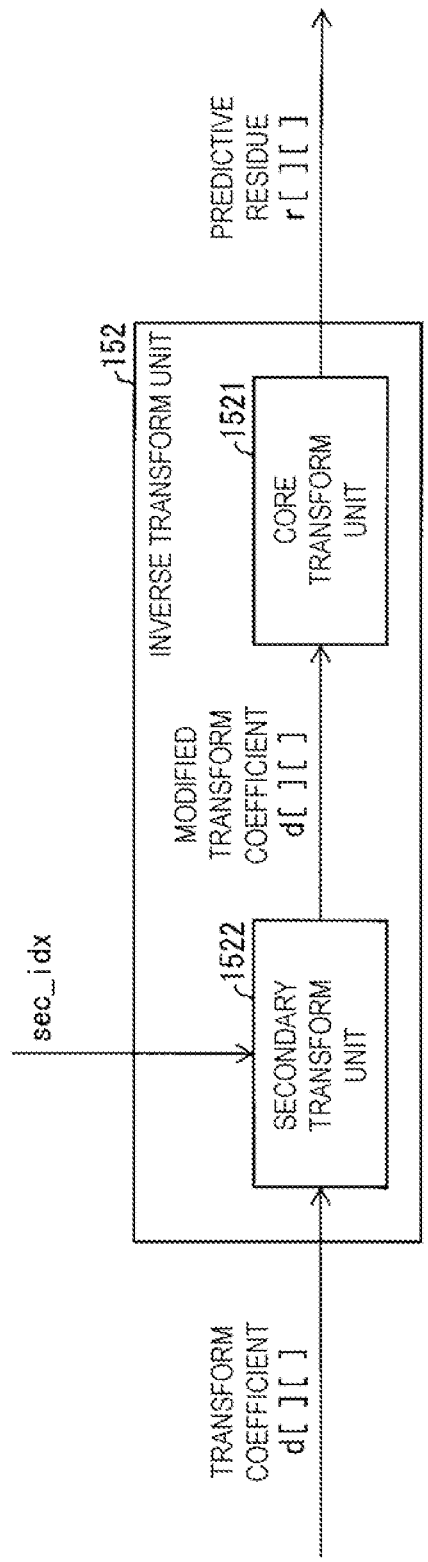
FIG. 18 is a functional block diagram illustrating an exemplar configuration describing an inverse transform unit according to an embodiment of the present invention.

Now, a configuration of the inverse transform unit 152 capable of performing not only a core transform but also a Secondary Transform will be described below with reference to FIG. 18. FIG. 18 is a functional block diagram illustrating an exemplar configuration of the inverse transform unit 152. As illustrated, the inverse transform unit 152 includes a core transform unit 1521 (first transform unit) and a Secondary Transform unit 1522 (second transform unit). The Secondary Transform unit 1522 receives, from the TT information decoder 13, information indicating that a Secondary Transform is to be performed. Then, the Secondary Transform unit 1522 performs a Secondary Transform on a transform coefficient d[ ][ ] received from the inverse quantization unit 151 to restore a modified transform coefficient d[ ][ ]. The modified transform coefficient d[ ][ ] thus restored is sent from the Secondary Transform unit 1522 to the core transform unit 1521. In a case where no Secondary Transform has been performed, the transform coefficient d[ ][ ] received by the Secondary Transform unit 1522 is sent, as it is, from the Secondary Transform unit 1522 to the core transform unit 1521.

The information indicating the ON/OFF of the Secondary Transform and the type of the Secondary Transform may be an index such as the sec_idx. Alternatively, the information indicating the ON/OFF of the Secondary Transform and the type of the Secondary Transform may be divided into two syntaxes instead of expressing the information in a single index sec_idx. In a case where the information is divided into a syntax sec_flag indicating whether the Secondary Transform is to be performed and another syntax sec_trans_idx indicating the type of the Secondary Transform, the two syntaxes have the following relations.

sec_flag=sec_idx!=0 sec_trans_idx=sec_idx−1 sec_idx=(sec_flag)?sec_trans_idx+1:0

For instance, in a case where the Secondary Transform processing includes a case of using no Secondary Transform (Secondary Transform OFF) and a case of selecting a Secondary Transform from 3 Secondary Transforms with Names Secondary Transforms 1 to 3, the index about the Secondary Transform, that is, the sec_idx, can take a total of 4 values from 0 to 3. Specifically, In a case where sec_idx=0 (i.e., sec_flag=0), the Secondary Transform unit 1522 performs no Secondary Transform processing;

In a case where sec_idx=1 (i.e., sec_flag=1 and sec_trans_idx=0), the Secondary Transform unit 1522 performs the Secondary Transform 1 (e.g., a transform for the horizontal direction);

In a case where sec_idx=2 (i.e., sec_flag=1 and sec_trans_idx=1), the Secondary Transform unit 1522 performs a Secondary Transform 2 (e.g., a transform for the vertical direction);

In a case where sec_idx=3 (i.e., sec_flag=1 and sec_trans_idx=2), the Secondary Transform unit 1522 performs a Secondary Transform 3 (e.g., a transform for both the horizontal and the vertical directions).

Note that the range of possible sec_idx values is not limited to the one above. For instance, though a 4-step range from 0 to 3 is employed in the example above, an M-step range from 0 to M−1 may also be employed. In addition, M may be a value such as 1, 2, 3, 4, etc.

The core transform unit 1521 receives the transform coefficient d[ ][ ] restored by the Secondary Transform unit 1522, and then performs an Adaptive Multiple Core Transform to derive a prediction error r[ ][ ]. The prediction residual r[ ][ ] is sent from the core transform unit 1521 to the adder 17.

The Secondary Transform is performed on a TU of a size of nTbS×nTbS (transform coefficient d[ ][ ]) by use of each 4×4 sub-block as a unit. The Secondary Transform is applied only to the intra-CU, and the transform base is determined by referring to the intra-prediction mode. The selection of the transform base will be described later.

The Secondary Transform includes: a separable transform (Rotational Transform: ROT) where the transform of a sub-block is performed in 2 steps of a 1×4 vertical transform and a 4×1 horizontal transform; and a Non-separable secondary transform (NSST) where the transform of the sub-block is performed at a time as a one-dimensional 16×1 vector transform.

[Separable Transform (ROT)]

Figure 20:
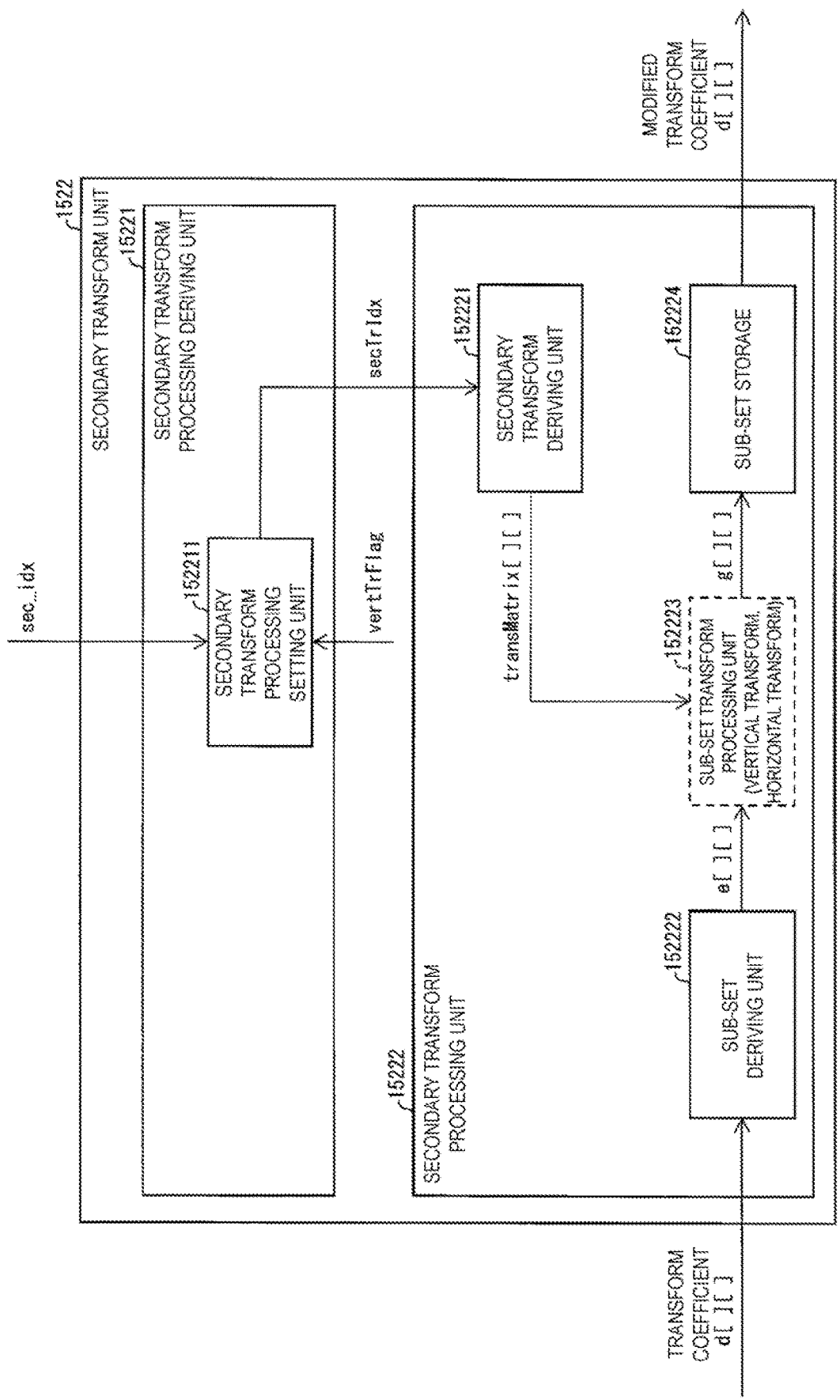
FIG. 20 illustrates an exemplar configuration of a case where the Secondary Transform unit of FIG. 17 performs a separable transform.

Next, the separable transform (ROT) will be described with reference to FIG. 20. FIG. 20 illustrates an exemplar configuration of the Secondary Transform unit 1522 of a case where the Secondary Transform unit 1522 of FIG. 18 performs a separable transform.

The Secondary Transform unit 1522 includes a Secondary Transform processing deriving unit 15221 and a Secondary Transform processing unit 15222. The Secondary Transform processing deriving unit 15221 further includes a Secondary Transform processing setting unit 152211. The Secondary Transform processing unit 15222, on the other hand, includes a Secondary Transform matrix deriving unit 152221, a sub-set deriving unit 152222, a sub-set transform processing unit 152223, and a sub-set storage 152224.

Secondary Transform processing setting unit 152211 receives an index (sec_idx) from the TT information decoder 13. Based on a flag verTrFlag, the Secondary Transform processing setting unit 152211 derives, from the sec_iex, an index secTrIdx indicating whether a transform processing of vertical transform and a transform processing of horizontal transform are to be performed. Then the Secondary Transform processing setting unit 152211 sends an index secTrIdx (a vertical-direction Secondary Transform processing index secTrIdxV and a horizontal-direction Secondary Transform processing index secTrIdxH) to the Secondary Transform matrix deriving unit 152221.

secTrIdxH=secTrSet[sec_trans_idx_hor]

secTrIdxV=secTrSet[sec_trans_idx_ver]

Note that sec_trans_idx_ver=sec_idx>>1, sec_trans_idx_hor=sec_idx & 1.

The Secondary Transform matrix deriving unit 152221 derives a matrix for the vertical transforms transMatrixV[ ][ ] and a matrix for the horizontal transform transMatrixH[ ][ ] from the received parameters secTrIdxV and secTrIdxH indicating the Secondary Transform processing, both of which are needed for an actual transform (sub-set transform processing).

transMatrix*V*[ ][ ]=secTransMatrix[secTrIdx*V*][ ][ ]

transMatrix*H*[ ][ ]=secTransMatrix[secTrIdx*H*][ ][ ]

Secondary Transform matrix deriving unit 152221 sends the derived matrix to the sub-set transform processing unit 152223.

The Secondary Transform processing unit 15222 derives a sub-block (a 4×4 matrix) by extracting, in an order, part of the nTbS×nTbS transform coefficients d[ ][ ] received from the inverse quantization unit 151 (sub-set deriving unit 152222). Then, the Secondary Transform processing unit 15222 transforms sub-blocks in a derived unit (sub-set transform processing unit 152223), reconfigure the transformed sub-block into a nTbS×nTbS modified transform coefficient d[ ][ ] (sub-set storage 152224), and outputs the reconfigured modified transform coefficient d[ ][ ] to the core transform unit 1521.

Hereinafter, each sub-block is processed by configuring sub-block coordinates (xS, yS) sequentially and then by performing a loop processing. The sub-block loop is one where xS=0 to nTbS/4−1, yS=0 to nTbS/4−1.

The sub-set deriving unit 152222 extracts a 4×4 sub-block e[ ][ ] at a coordinate position (xS<<2, yS<<<2) from transform coefficient d[ ][ ] of a nTbS×nTbS.

e[i][j]=d[xx][yy],xx=(xS<<2)+i,yy=(yS<<2)+
   j(i=0 to 3,j=0 to 3)

In the equation above, the (i, j) represents a position on a sub-block. The (xx, yy) represents a position on a nTbS× nTbS transform coefficient d[ ][ ].

The sub-set transform processing unit 152223 performs, on a sub-block e[ ][ ], a Secondary Transform processing indicated by the parameters secTrIdxV, secTrIdxH. The sub-set transform processing unit 152223 transforms a sub-set e[ ][ ] into a temporary variable x[ ][ ] in a vertical sub-set transform (vertical Secondary Transform). On the other hand, in the sub-set transform processing unit 152223, the sub-set transform processing unit 152223 transforms the temporary variable x[j][y] into g[i][y] in a horizontal sub-set transform (horizontal Secondary Transform).

x[x][i]=Σ(transMatrix*V*[i][j]×e[x][j])(j=0 to 3)

g[i][y]=Σ(transMatrix*H*[i][j]×x[j][y])(j=0 to 3)

The sub-set storage 152224 stores the g[i][j] as the modified transform coefficient d[xx][yy], and sends this transform coefficient (modified transform coefficient d[ ][ ]) to the core transform unit 1521.

d[xx][yy]=g[i][j],xx=xS+i,yy=yS+j(i=0 to 3,j=0 to 3)

[Non-Separable Transform (NSST)]

Figure 19:
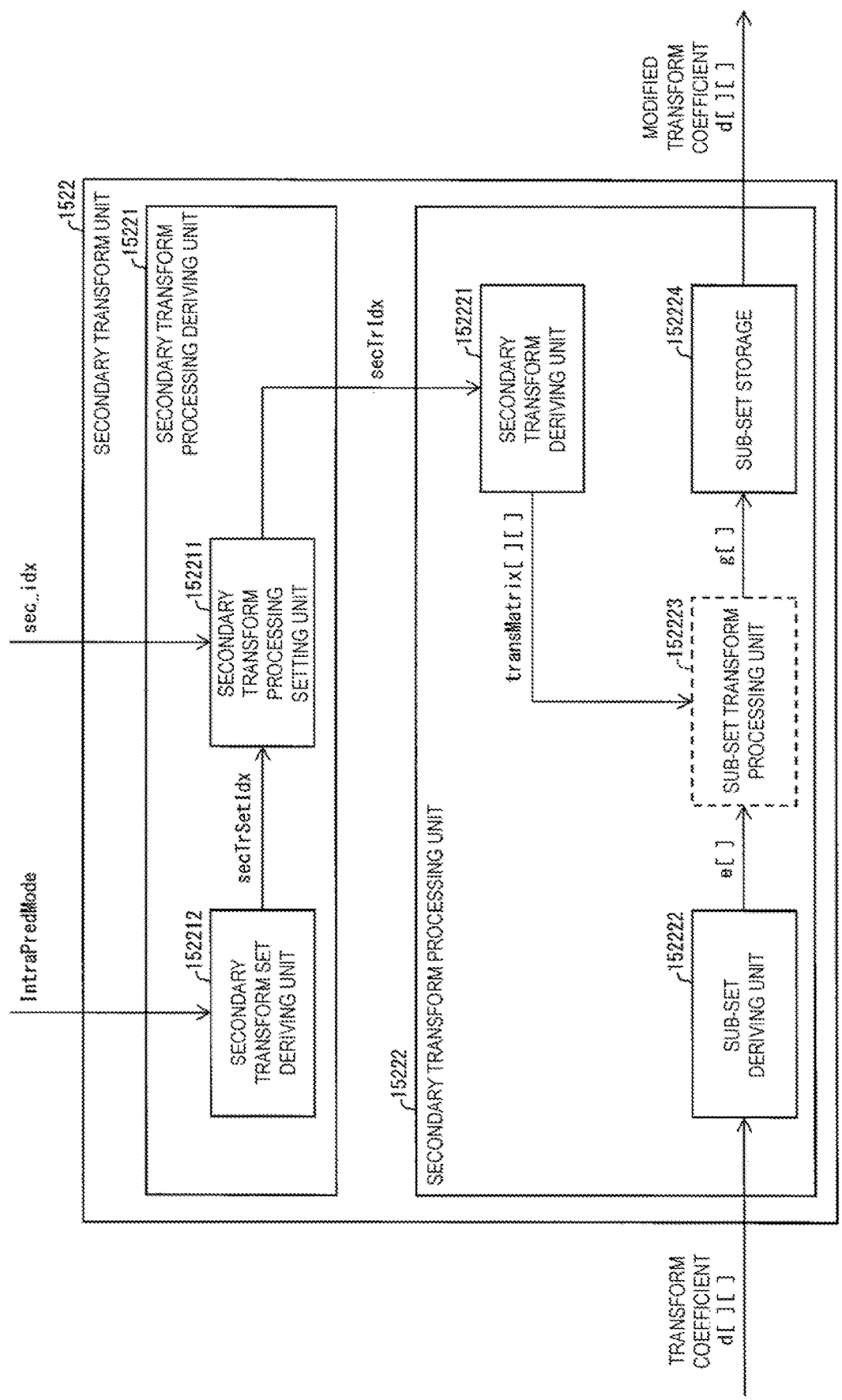
FIG. 19 illustrates an exemplar configuration of a case where a Secondary Transform unit of FIG. 17 performs a Non-separable transform.

Next, the Non-separable secondary transform (NSST) will be described with reference to FIG. 19. FIG. 19 illustrates an exemplar configuration of the Secondary Transform unit 1522 of a case where the Secondary Transform unit 1522 of FIG. 18 performs a non-separable transform.

The Secondary Transform unit 1522 includes a Secondary Transform processing deriving unit 15221 and a Secondary Transform processing unit 15222. The Secondary Transform processing deriving unit 15221 further includes a Secondary Transform set deriving unit 152212 and a Secondary Transform processing setting unit 152211. The Secondary Transform processing unit 15222, on the other hand, includes a Secondary Transform matrix deriving unit 152221, a sub-set deriving unit 152222, a sub-set transform processing unit 152223, and a sub-set storage 152224.

The Secondary Transform set deriving unit 152212 derives, by referring to a Secondary Transform set table secTrSetIdxTbl, a Secondary Transform set index secTrSetIdx depending on the intra-prediction mode IntraPredMode indicated in FIG. 54A. Then, the Secondary Transform set deriving unit 152212 sends the derived Secondary Transform set index secTrSetIdx to the Secondary Transform processing setting unit 152211.

secTrSetIdx=secTrSetIdxTbl[IntraPredMode]

The Secondary Transform processing setting unit 152211 derives an index secTrIdx indicating a Secondary Transform method based on the Secondary Transform set index secTrSetIdx described in FIG. 54A and on the sec_idx from the Secondary Transform set table SecTrSet described in FIG. 54B.

secTrIdx=secTrSet[secTrSetIdx][sec_idx]

In a case where sec_idx=0, the Secondary Transform is OFF. The Secondary Transform processing setting unit 152211 sends the derived secTrIdx to the Secondary Transform matrix deriving unit 152221.

The Secondary Transform matrix deriving unit 152221 derives, from the received parameter secTrIdx indicating the Secondary Transform processing, a matrix transMatrix[ ][ ] needed for an actual transform (sub-set transform processing).

transMatrix[ ][ ]=secTransMatrixTbl[secTrIdx][ ][ ]

The Secondary Transform matrix deriving unit 152221 sends the derived transform matrix to the sub-set transform processing unit 152223.

The Secondary Transform processing performs a sub-set transform by use of each 4×4 sub-block included in the TU as the unit. Specifically, the processing includes 3 processings: a processing for derive a sub-block from a block (in a sub-set deriving unit 152222); a processing of transform the sub-block (in a sub-set transform processing unit 152223); and a processing of storing a sub-block in a block (in a sub-set storage 152224).

Hereinafter, each sub-set is processed by configuring sub-block coordinates (xS, yS) sequentially and then by performing a loop processing. The sub-block loop is one where xS=0 to nTbS/4−1, yS=0 to nTbS/4−1.

The sub-set deriving unit 152222 derives, from the nTbS× nTbS transform coefficient d[ ][ ] received from the inverse quantization unit 151, a sub-block e[j] with 4×4 blocks at positions of coordinates (xS<<2, yS<<2) rearranged in a one dimensional arrangement.

e[j]=d[xx][yy],xx=(xS<<2)+j%     4,yy=(yS<<2)+
   j/4(j=0 . . . 15)

The sub-set transform processing unit 152223 derives a g[i](i=0 to 15) by performing a transform (sub-set transform), due to the need for a non-separable transform here, on a sub-block of a 16×1 vector e[j].

$$g[i] = \Sigma(\text{transMatrix}[i][j] \times x[j]) (j=0 \text{ to } 15)$$

The sub-set storage 152224 stores the g[i] as the transform coefficient d[xx][yy], and sends this modified transform coefficient d[ ][ ] to the core transform unit 1521.

$$d[xx][yy] = y[i], xx = (xS<<2) + i \%4, yy = (yS<<2) + i/4 (i=0 \text{ to } 15)$$

[Decoding Flag sec_idx Associated with Secondary Transform]

FIG. 21 illustrates an exemplar configuration of a syntax table of CU information, PT information PTI, and TT information TTI according to an embodiment of the present invention. First, as illustrated in FIG. 21, the CU information decoder 21 performs a decoding to obtain CU information (a skip flag cu_skip_flag, CU prediction mode information PredMode, PU split type information part_mode, a residual root flag rqt_root_cbf) by use of the decoding module 10. Then, the PU information decoder 12 performs a decoding processing on PU information PUI by use of the decoding module 10.

In a case where the residual root flag rqt_root_cbf is non-zero (i.e., equals to 1), the TT information decoder 13 performs a decoding to obtain a transform tree transform_tree (SYN1700).

$$\text{transform\_tree}(x0, y0, x0, y0, \log 2CbSize, 0, 0)$$

In this event, the TT information decoder 13 may derive, by the following equation, a maximum TU level MaxTrafoDepth to be used in the decoding of the transform tree transform_tree.

MaxTrafoDepth=CuPredMode[x0][y0]==MODE_INTRA?(max_transform_hierarchy_depth_intra+intraSplitFlag):max_transform_hierarchy_depth_inter)

Then, the TT information decoder 13 performs a decoding to obtain an index sec_idx provided that the flag cbf_cu is non-zero, and that the prediction mode is the intra-prediction mode.

if(*cbf_cu*&& PredMode==PRED_INTRA)sec_idx [x0][y0][trafoDepth]

Figure 22:
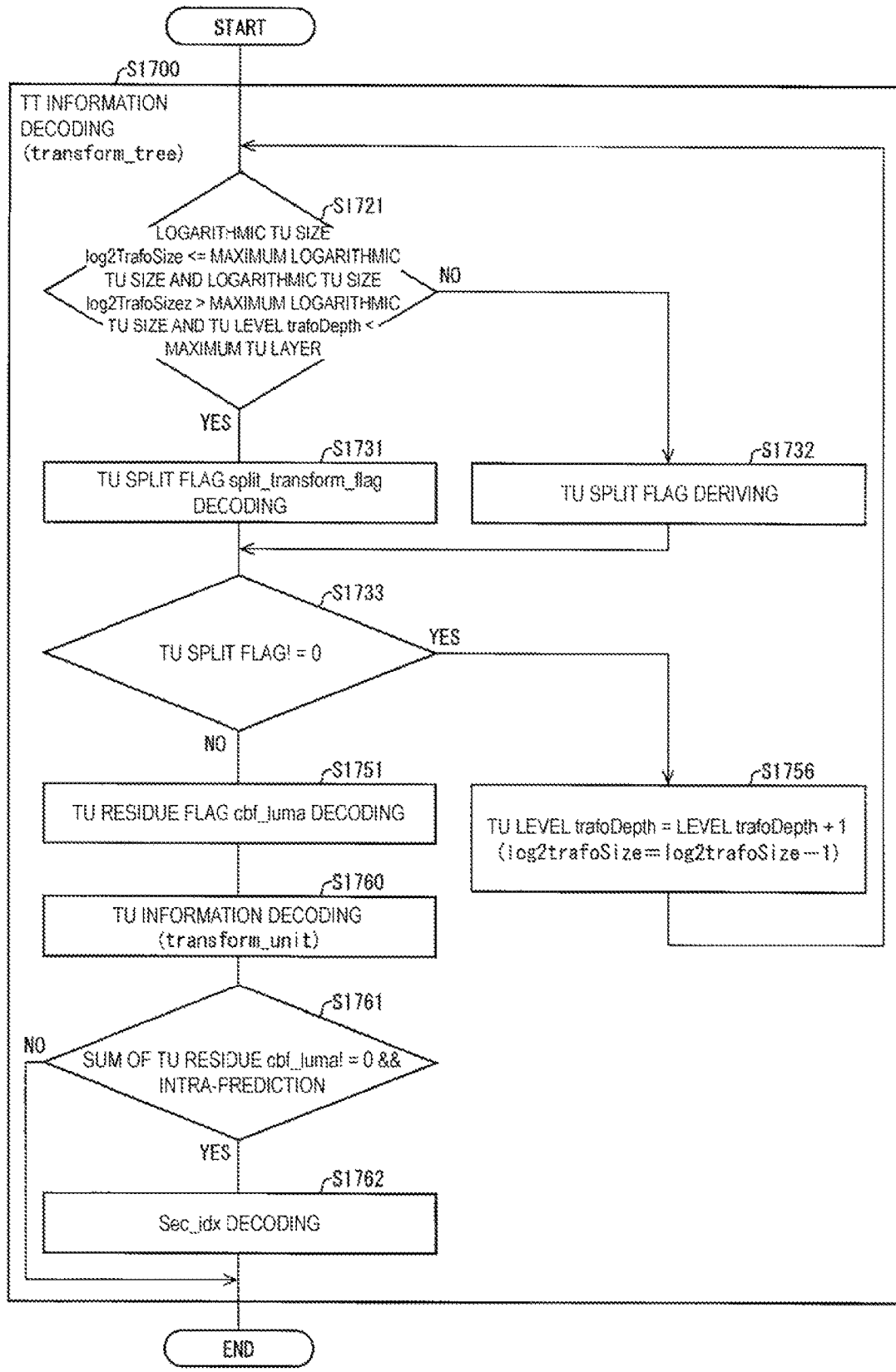
FIG. 22 is a flowchart schematically describing operations of a TT information decoder (TT information decoding at S1700) according to an embodiment of the present invention.

In a case where the residual root flag rqt_root_cbf is non-zero (i.e., equals to 1), the TT information decoder 13 first performs a decoding to obtain a transform tree transform_tree, and then in a case where the flag cbf_cu is non-zero and where the prediction mode is the intra-prediction mode, the TT information decoder 13 performs a series of processings until the index sec_idx is obtained through a decoding. Next, the series of processings will be described with reference to FIG. 22. FIG. 22 is a flowchart schematically describing operations of the TT information decoder 13 (TT information decoding at S1700) according to an embodiment of the present invention. Note that for the sake of simple explanation, a step where a processing similar to an already-described one is performed and a syntax indicating a processing similar to an already-described one will be given the same reference numeral as that used for the already-described one without repeating the explanation.

(S1731) The TT information decoder 13 performs a decoding to obtain a TU split flag (split_transform_flag) provided that the target TU size (e.g., logarithmic TU size log 2TrafoSize) is within a prescribed transform size range (in this case not larger than the maximum logarithmic TU size Max Tb Log 2SizeY but larger than the minimum logarithmic TU size Min Tb Log 2SizeY) and that the TU level trafoDepth of the target TU is lower than a prescribed level (in this case, lower than the maximum TU level MaxTrafoDepth). To be more specific, in a case of YES at S1721 in FIG. 22, the processing proceeds to S1731, where a decoding is performed to obtain a TU split flag (split_transform_flag) (SYN1731). Note that in a case where the IntraSplitFlag==1(N×N) and where the TU level trafoDepth is 0, the TT information decoder 13 does not have to perform a decoding to obtain a TU split flag split_transform_flag.

(S1732) On the other hand, in a case where no split_transform_flag appears in the coded data #1 (i.e., in a case of NO at S1721), the TT information decoder 13 derives a TU split flag split_transform_flag. To be more specific, in a case where the logarithmic TU size log 2TrafoSize is larger than the maximum logarithmic TU size Max Tb Log 2SizeY, the TT information decoder 13 derives a TU split flag split_transform_flag as a value indicating the performing of the splitting. Otherwise (in a case where the logarithmic TU size log 2TrafoSize is not larger than the minimum logarithmic TU size Max Tb Log 2SizeY, or the TU level trafoDepth is not lower than the maximum TU level MaxTrafoDepth), the TT information decoder 13 derives the TU split flag split_transform_flag as a value (=0) indicating that no splitting is to be performed.

(S1755) In a case where the TU split flag split_transform_flag is a value (e.g., 1) indicating that the splitting is to be performed (YES at S1733), the TT information decoder 13 performs a decoding to obtain 4 lower transform trees TT at positions (x0, y0), (x1, y0), (x0, y1), (x1, y1) of the logarithmic CT size log 2CbSize−1 and the TU level trafoDepth+1. Then, the processing returns to S1721.

transform_tree(x0,y0,x0,y0,log 2TrafoSize−1, trafoDepth+1,0)

transform_tree(x1,y0,x0,y0,log 2TrafoSize−1, trafoDepth+1,1)

transform_tree(x0,y1,x0,y0,log 2TrafoSize−1, trafoDepth+1,2)

transform_tree(x1,y1,x0,y0,log 2TrafoSize−1, trafoDepth+1,3)

Here, (x0, y0) indicates the upper-left coordinates of the target transform tree, and (x1, y1) are coordinates to be derived by adding half a target TU size (1<<log 2TrafoSize) to transform tree coordinates (x0, y0), as described in the following equations (SYN1756).

$$x1 = x0 + (1 << (\log 2\text{TrafoSize}-1))$$

$$y1 = y0 + (1 << (\log 2\text{TrafoSize}-1))$$

In addition, in a case where TU level trafoDepth=0 and the transform tree of the target is in the intra-prediction mode, a decoding is performed to obtain sec_idx. Otherwise, no decoding is performed to obtain the sec_idx. Instead, set zero to the sec_idx.

As described earlier, before the recursive decoding of the transform tree transform_tree, the TT information decoder 13 updates, in accordance with the following equations, the TU level trafoDepth, indicating the level of the transform tree TT, by adding 1 to the TU level trafoDepth, and also updates, by subtracting 1 from the logarithmic CT size log 2TrafoSize, the logarithmic CT size log 2TrafoSize which is the target TU size.

trafoDepth=trafoDepth+1 log 2TrafoSize=log 2TrafoSize−1

(S1751) On the other hand, in a case where the TU split flag split_transform_flag is not 0 (NO at S1733), the TT information decoder 13 performs a decoding to obtain a TU residue flag (e.g., cbf_luma) indicating whether the target TU includes a residue. Here, a luminance residue flag cbf_luma is used as the TU residue flag, indicating whether a residue is included in the luminance component of the target TU.

(S1760) Next, in a case where the TU split flag split_transform_flag is 0, the TT information decoder 13 performs a decoding to obtain a transform unit TUtransform_unit(x0, y0, xBase, yBase, log 2TrafoSize, trafoDepth, blkIdx) indicated in SYN1760.

(S1761) In a case where the sum of the TU residue flags cbf_luma is 0, and where the prediction mode is the intra-prediction mode, the TT information decoder 13 performs a decoding to obtain an index associated with the Secondary Transform sec_idx.

Note that in the above-described example the decoding to obtain the index associated with the Secondary Transform sec_idx is performed at the CU level, but this is not the only possible way. For instance, the decoding may be performed at the TT level to obtain the sec_idx. Such modifications will be described below with reference to FIG. 23 and FIG. 24.

Figure 23:
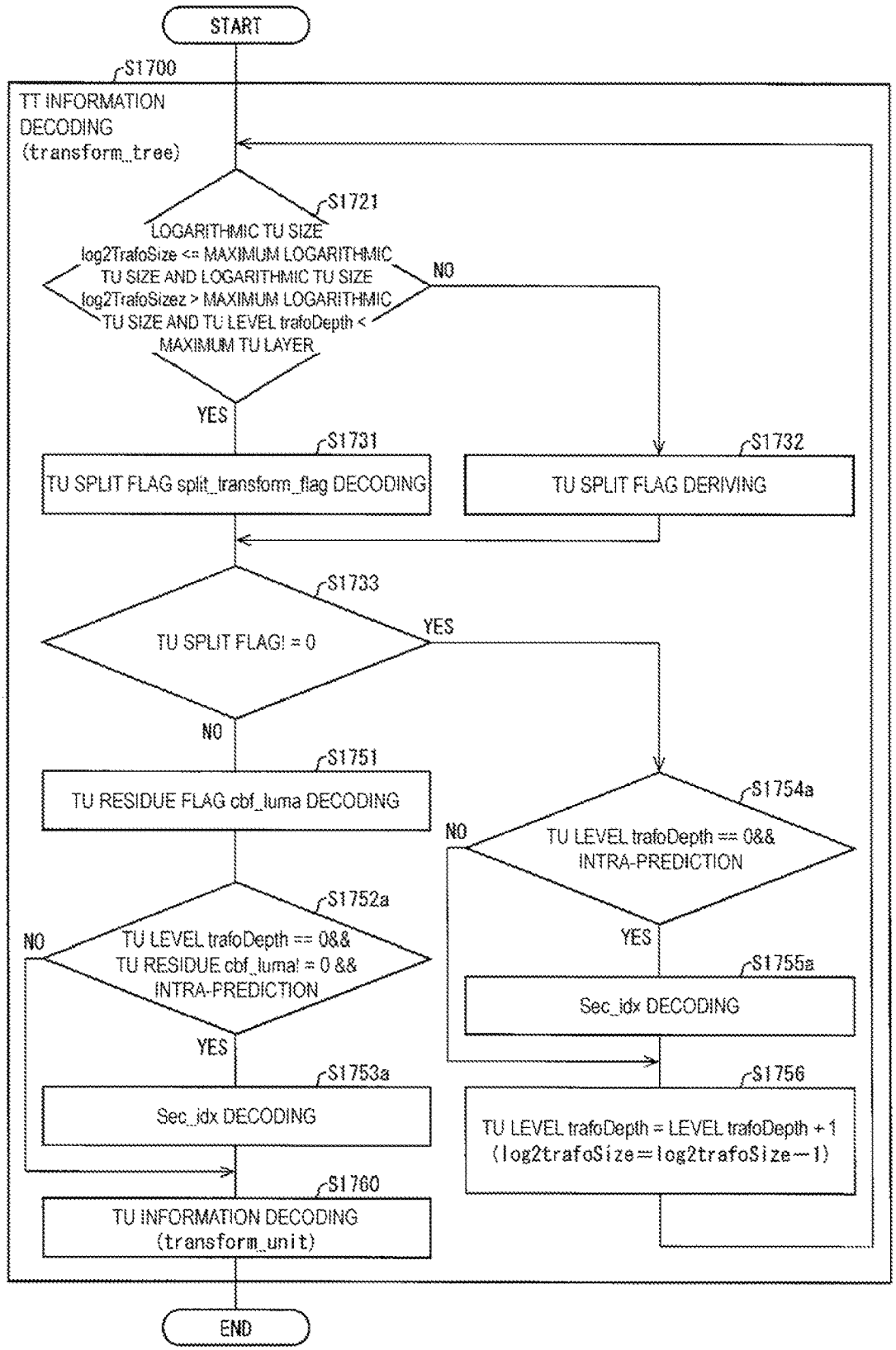
FIG. 23 is a flowchart schematically describing operations of a TT information decoder (TT information decoding at S1700) according to other embodiment of the present invention.

The TT information decoder 13 may perform the processing of a decoding to obtain the index associated with the Secondary Transform sec_idx (the last 2 lines in FIG. 21) at the TT level as in the case of FIG. 23. FIG. 23 is a flowchart schematically describing operations of the TT information decoder 13 (TT information decoding at S1700) according to an embodiment of the present invention. FIG. 24 illustrates an exemplar configuration of a syntax table of TT information TTI according to an embodiment of the present invention.

(S1755a) In a case where the TU split flag split_transform_flag is a value (e.g., 1) indicating that the splitting is to be performed (YES at S1733) and where the TU level trafoDepth is 0 and the prediction mode is the intra-prediction mode (YES at S1754a), the TT information decoder 13 performs a decoding to obtain an index associated with the Secondary Transform sec_idx (SYN1755a). Even in an opposite case (i.e., NO at S1754a), the TT information decoder 13 derives a sec_idx=0, and proceeds to S1756.

(1756) The TT information decoder 13 performs a decoding to obtain 4 lower transform trees TT at positions (x0, y0), (x1, y0), (x0, y1), (x1, y1) of the logarithmic CT size log 2CbSize−1 and the TU level trafoDepth+1.

(S1751) On the other hand, in a case where the TU split flag split_transform_flag is 0 (NO at S1733), the TT information decoder 13 performs a decoding to obtain a TU residue flag (e.g., cbf_luma). Here, a luminance residue flag cbf_luma is used as the TU residue flag, indicating whether a residue is included in the luminance component of the target TU.

(S1753a) In a case where the TU level trafoDepth is 0, and the TU residue flag (e.g., cbf_luma) is not 0, and the prediction mode is the intra-prediction mode (YES at S1752a), TT information decoder 13 performs a decoding to obtain an index associated with the Secondary Transform sec_idx (SYN1753a). Otherwise (NO at S1752a), the TT information decoder 13 does not decode the coded data into the index associated with the Secondary Transform sec_idx, but derives the sec_idx=0, and proceeds to S1760.

(S1760) In a case where the TU split flag split_transform_flag is 0, the TT information decoder 13 performs a decoding to obtain a transform unit TU indicated in SYN1760.

transform_unit(x0, y0, xBase, yBase, log 2TrafoSize, trafoDepth, blkIdx)

Figure 25:
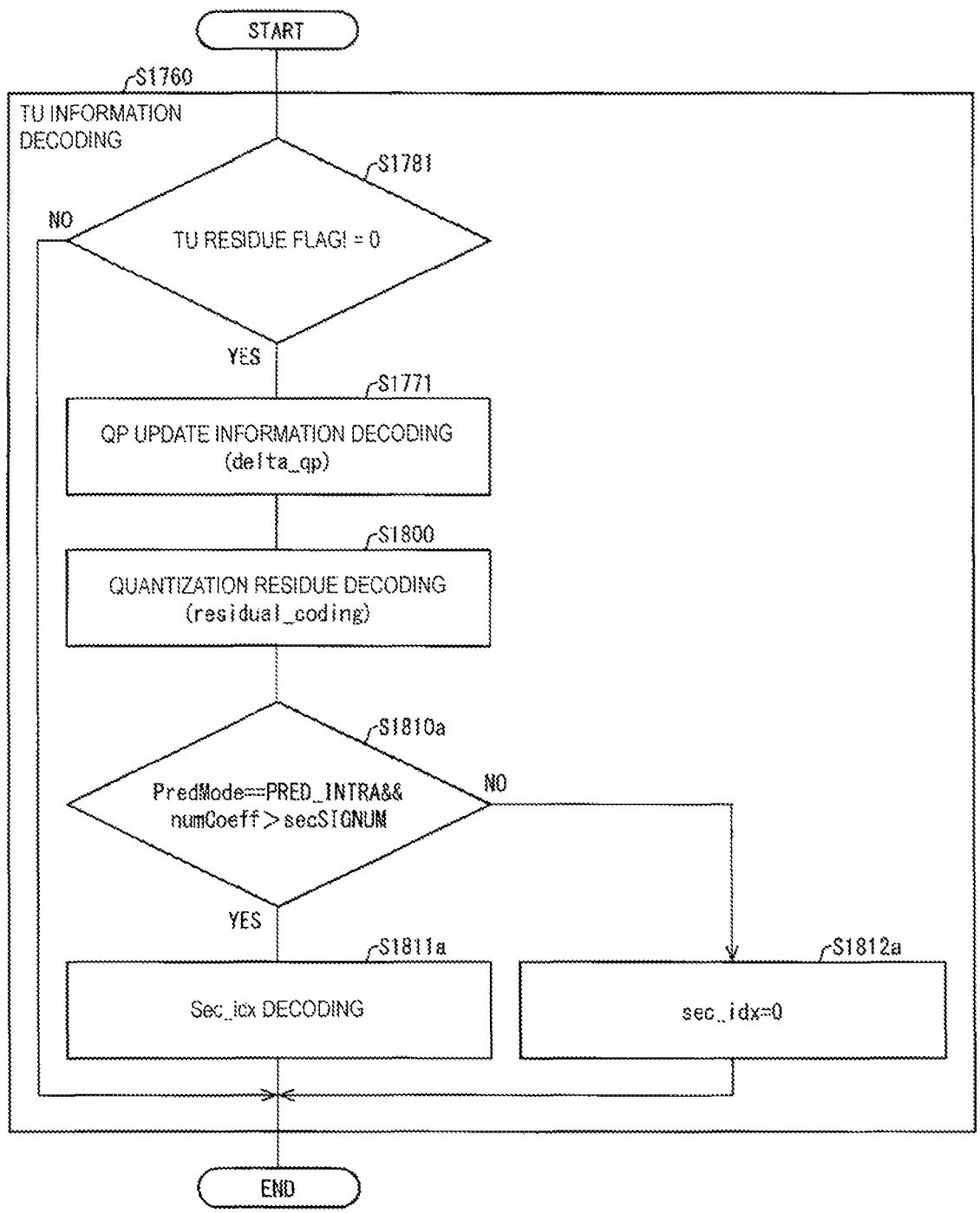
FIG. 25 is a flowchart schematically describing operations of a TU information decoder (TU information decoding at S1760) according to an embodiment of the present invention.

Next, a modification where the decoding to obtain the sec_idx is performed at the TU level will be described with reference to FIG. 25 and FIGS. 26A and 26B. FIG. 25 is a flowchart schematically describing operations of the TU decoder 22 (TU information decoding at S1760) according to an embodiment of the present invention. FIG. 26A illustrates an exemplar configuration of a syntax table of TU information according to an embodiment of the present invention, and FIG. 26B is a pseudocode description of decoded portions of an amt_idx and a sec_idx.

(S1781) The TU decoder 22 determines whether a residue is contained in the TU (whether the TU residue flag is non-zero). Note that a luminance residue flag cbf_luma indicating whether a residue is contained in the luminance component of the target TU may be used as the TU residue flag.

(S1771) In a case where a residue is contained in the TU (the TU residue flag is non-zero), the TU decoder 22 performs a decoding to obtain QP update information (quantization correction value). The QP update information is a value indicating a differential value from a quantization-parameter predictive value qPpred, which is a predicted value of the quantization parameter QP. Here, the differential value is obtained, as a syntax element of the coded data, through the decoding with an absolute value cu_qp_delta_abs and a sign cu_qp_delta_sign_flag. This, however, is not the only possible method.

(S1800) In a case where the TU residue flag (cbfLuma in this example) is non-zero, the TU decoder 22 performs a decoding to obtain a quantized predictive residue (residual_coding). The TT information decoder 13 may perform a decoding to obtain sequentially multiple color components as quantized predictive residues.

(S1811a) In a case where the prediction mode is the intra-prediction mode, and the number of non-zero coefficients numCoeff is larger than the secSIGNUM (YES at S1810a), the TT information decoder 13 performs a decoding to obtain the index associated with the Secondary Transform sec_idx (SYN1811a).

(S1812a) Otherwise (in a case where the prediction mode is not the intra-prediction mode, or where the number of non-zero coefficients numCoeff is not larger than the secSIGNUM) (NO at S1810), TT information decoder 13 does not decode the coded data into the index sec_idx to be used in the Secondary Transform, but derives the sec_idx=0.

In a case where the AMT index amt_flag is non-zero, and where the number of non-zero coefficients numCoeff is larger than the coreSIGNUM, the TU decoder 22 performs a decoding to obtain the AMT index amt_idx (SYN1812a). Otherwise (in a case where the AMT index amt_flag is 0, or where the number of non-zero coefficients numCoeff is not larger than the coreSIGNUM), the TU decoder 22 does not decode the coded data into the AMT index amt_idx, but derives the amt_idx=0.

<AMT Flag amt_flag and Index sec_idx Used in Secondary Transform>

Next, an example of deriving an AMT index amt_idx to be used in the Adaptive Multiple Core Transform will be described with reference to FIGS. 51A to 51C.

Figure 51A:
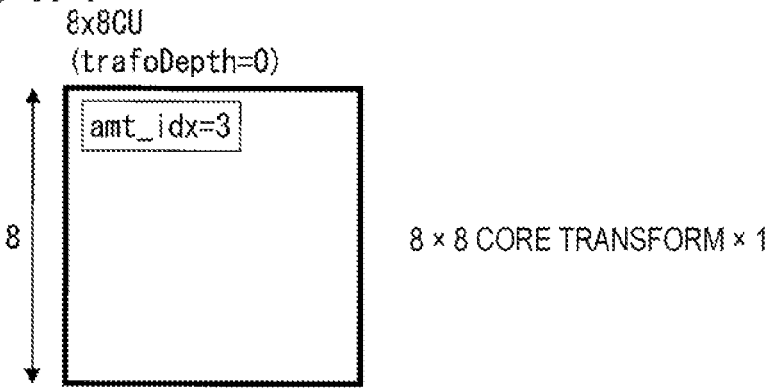
FIGS. 51A to 51C describe examples where an AMT index amt_idx is derived for each TU.
Figure 51B:
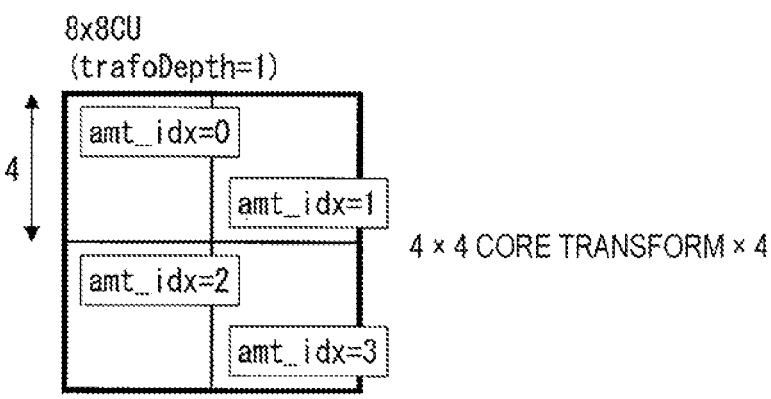
Figure 51C:
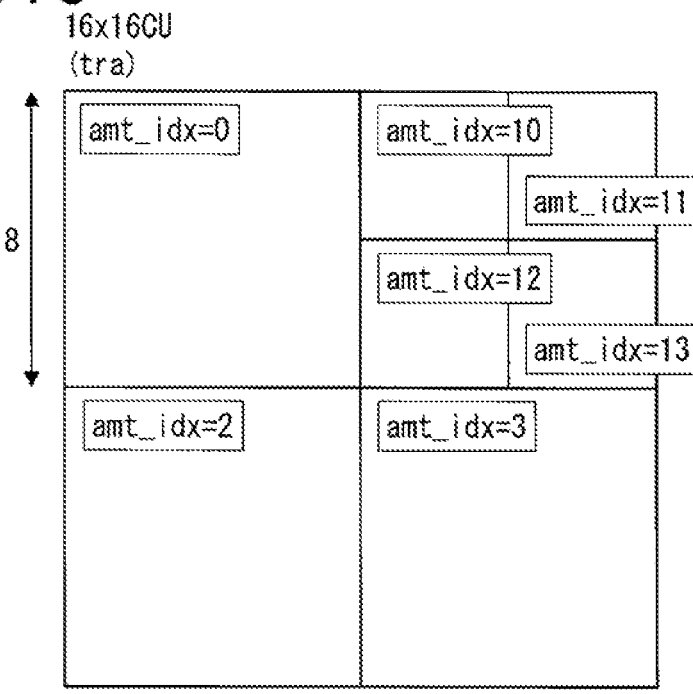

As illustrated in FIG. 51A, a single AMT index amt_idx (e.g., AMT index amt_idx=3) may be assigned to an 8×8 CU (trafoDepth=0). Alternatively, as illustrated in FIG. 51B, an AMT index amt_idx may be assigned to each 4×4 TU included in an 8×8 CU. Still alternatively, as illustrated in FIG. 51C, AMT indexes amt_idx may be assigned, on a one-to-one basis, to some (three in the illustrated example) of the four 8×8 TUs included in a 16×16 CU. In addition, an index amt_idx may be assigned to each 4×4 TU included in the rest 8×8 TU(s) (in the illustrated example, one on the upper right-hand side). As such, one AMT index amt_idx (e.g., AMT index amt_idx=0 to 3) may be assigned to each CU, or to each TU.

Figure 52A:
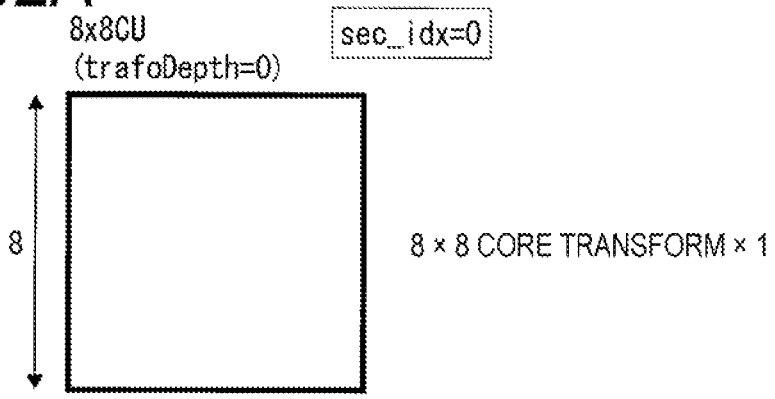
FIGS. 52A to 52C describe examples where an index associated with the Secondary Transform sec_idx is derived for each CU.
Figure 52B:
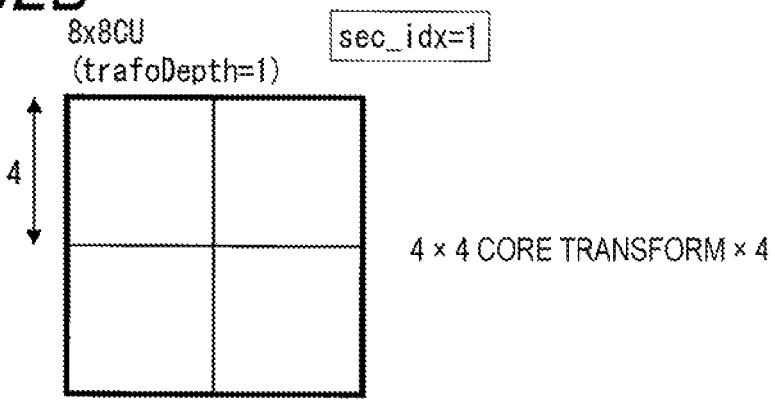
Figure 52C:
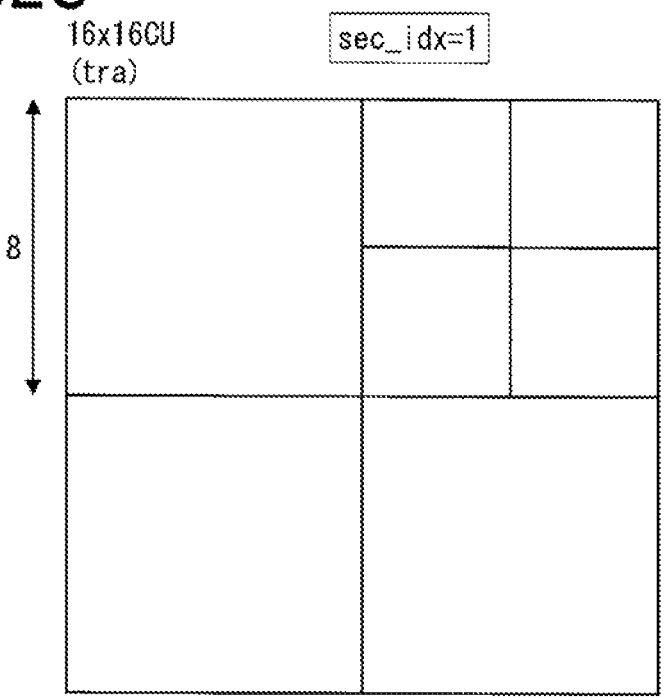
Figure 53A:
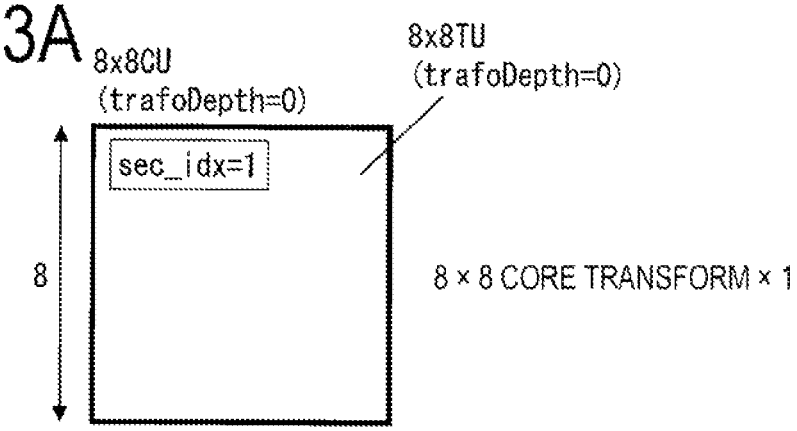
FIGS. 53A to 53C describe examples where an index associated with the Secondary Transform sec_idx is derived for each TU.
Figure 53B:
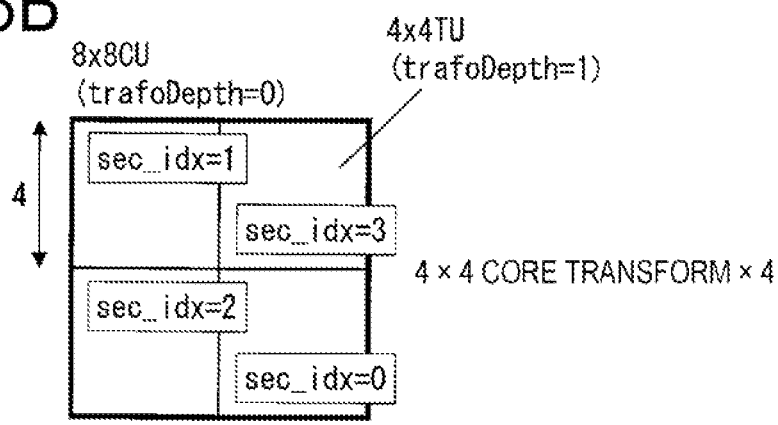
Figure 53C:
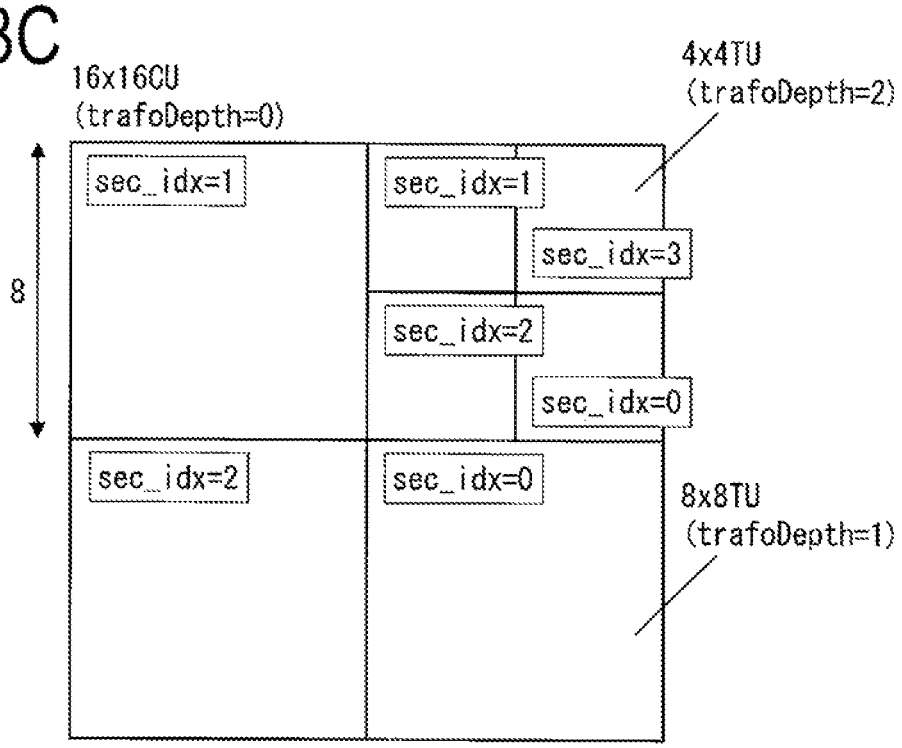

Next, an example of deriving an index associated with the Secondary Transform sec_idx will be described with reference to FIGS. 52A to 52C and FIGS. 53A to 53C. FIGS. 52A to 52C describe an example where an index associated with the Secondary Transform sec_idx is derived for each CU. FIGS. 53A to 53C describe an example where an index associated with the Secondary Transform sec_idx is derived for each TU.

At the CU level in FIGS. 52A to 52C, a single sec_idx (e.g., index associated with the Secondary Transform sec_idx=0 to 1) may be assigned to (a) the 8×8 CU (trafoDepth=0), to (b) the 4×4 TU (i.e., trafoDepth=1), and to (c) the 8×8 TUs and 4×4 TUs included in the 16×16 CU.

Alternatively, as illustrated in FIGS. 53A to 53C, a single index associated with the Secondary Transform sec_idx (e.g., index associated with the Secondary Transform sec_idx=0 to 3) at the TU level may be assigned to the 8×8 TU (trafoDepth=0), to each of the 4×4 TUs (trafoDepth=1), and to each of the 8×8 TUs (trafoDepth=1) and each of the 4×4 TUs (trafoDepth=2) included in the 16×16 CU.

(Configuration of TT Information Decoder and Configuration of Inverse Transform Unit in Video Decoding Device Capable of Performing Secondary Transform and Core Transform)

Figure 27:
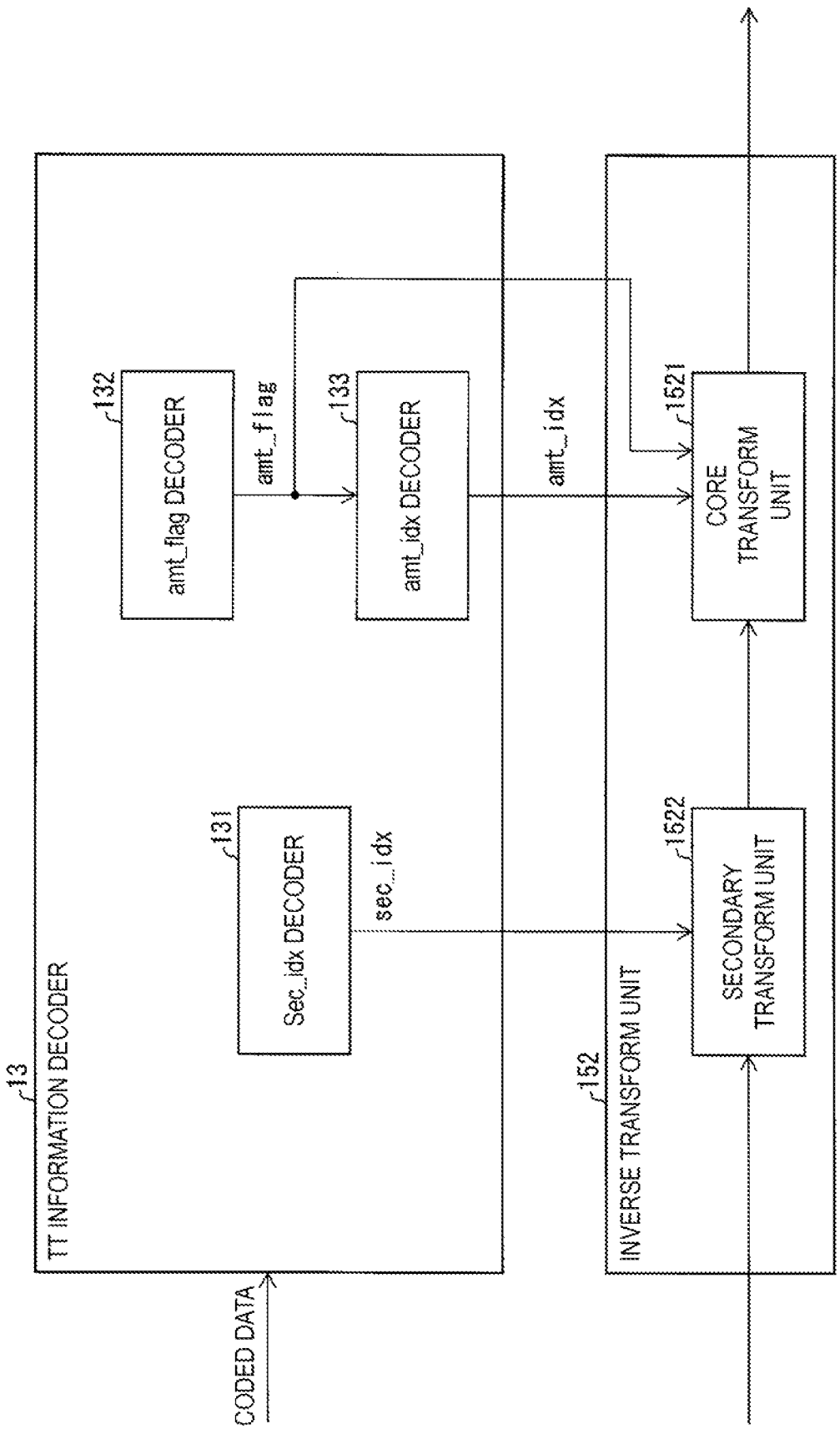
FIG. 27 is a functional block diagram illustrating an exemplar configuration describing a TT information decoder and an inverse transform unit according to an embodiment of the present invention.

A configuration of the TT information decoder 13 and a configuration of the inverse transform unit 152 will be described with reference to FIG. 27. FIG. 27 is a functional block diagram illustrating an exemplar configuration describing a TT information decoder 13 and an inverse transform unit 152. The TT information decoder 13 includes a sec_idx decoder 131, an amt_flag decoder 132, and an amt_idx decoder 133, and is that can perform a TT information decoding and a TU information decoding. The inverse transform unit 152 includes a Secondary Transform unit 1522 and a core transform unit 1521.

When the TT information decoder 13 receives coded data from the CU information decoder 21, the sec_idx decoder 131 performs a decoding to obtain a sec_idx, and sends the sec_idx thus obtained to the Secondary Transform unit 1522.

The amt_flag decoder 132 performs a decoding to obtain an AMT flag amt_flag, and sends the AMT flag amt_flag thus obtained to the AMT index amt_idx decoder 133 and to the core transform unit 1521.

The amt_idx decoder 133 decodes the received AMT flag amt_flag into an AMT index amt_idx, and sends the AMT index amt_idx thus obtained to the core transform unit 1521.

In accordance with the value of the sec_idx, the Secondary Transform unit 1522 selects to perform or not to perform a Secondary Transform on a transform coefficient d[ ][ ]. In addition, in a case where such a Second Transform is to be performed, the Secondary Transform unit 1522 selects which Secondary Transform is to be performed. Then, the Secondary Transform unit 1522 actually performs the selected Secondary Transform. The core transform unit 1521, on the other hand, receives a transform coefficient d[ ][ ] from the Secondary Transform unit 1522, and then performs a transform processing in accordance with the values of the AMT flag amt_flag and of the AMT index amt_idx.

Note that the sec_idx decoder 131 may perform a decoding on the sec_idx at the TU level or at the TT level. Hence, there may be: (1) a configuration where the sec idx decoder 131 and the amt_flag decoder 132 perform a decoding at the TT level, and the amt_idx decoder 133 performs a decoding at the TU level; and (2) a configuration where the amt_flag decoder 132 performs a decoding at the TT level, and the sec_idx decoder 131 and the amt_idx decoder 133 perform a decoding at the TU level. The TT information decoder 13 may have any of the configurations (1) and (2).

The inverse transform unit 152 that includes both the Secondary Transform unit 1522 and the core transform unit 1521 is capable of performing both the Secondary Transform and the core transform, and thus of restoring the prediction residual. In a case, however, of restoring a prediction residual having a small TU size such as a 4×4 TU level, performing both the Secondary Transform and the core transform results in a waste of the processing amount and a waste of the flags used for the purpose. This is because in a case where a transform processing is targeted to a small TU such as a 4×4 TU level, performing any one of the Secondary Transform and the core transform can achieve a sufficient energy concentration.

Description will be given below about a configuration that can effectively avoid the occurrence of waste caused by performing both the Secondary Transform and the core transform.

Embodiment 2

(Configuration not Performing any of Adaptive Multiple Core Transform and Secondary Transform in Accordance with TU Size)

An inverse quantization/inverse transform unit 15 (i.e., video decoding device 1) includes: a core transform unit 1521 configured to be capable of applying an Adaptive Multiple Core Transform (first transform) to a TU; and a Secondary Transform unit 1522 configured to be capable of applying a Secondary Transform (second transform) to at least any one of sub-blocks included in the TU before the Adaptive Multiple Core Transform. In addition, the inverse quantization/inverse transform unit 15 may omit either the transform by the core transform unit 1521 or the transform by the Secondary Transform unit in accordance with at least any one of an AMT flag amt_flag (first flag) associated with the Adaptive Multiple Core Transform and a flag sec_idx (second flag) associated with the Secondary Transform, or in accordance with the size of a CTU.

The inverse quantization/inverse transform unit 15 restores a predictive residue D by applying at least any one of the Adaptive Multiple Core Transform and the Secondary Transform. The inverse quantization/inverse transform unit 15 may be configured to: perform both the Adaptive Multiple Core Transform and the Secondary Transform in a case where the size of the TU is larger than a prescribed size (e.g., 8×8, 16×16, 32×32, 64×64, etc.); but perform only any one of the Adaptive Multiple Core Transform and the Secondary Transform in a case where the size of the TU is not larger than the prescribed size (e.g., 4×4).

(Configuration 1 where Whether to Perform Adaptive Multiple Core Transform is Determined in Accordance with Whether to Perform Secondary Transform Processing)

The inverse quantization/inverse transform unit 15 may be configured as follows. In a case where a Secondary Transform processing unit 15222 performs a Secondary Transform on a TU (sec_idx!=0), and where the size of the TU is not larger than a prescribed size (e.g., 4×4), no core transform is to be performed. Conversely, in a case where condition XS=index associated with the Secondary Transform sec_idx is 0 (i.e., Secondary Transform is not performed, sec_flag=0) or in a case where the logarithmic TU size of the TU is larger than a prescribed size (log 2Trafo Size !=2), the core transform is to be performed. This is expressed in the pseudocode as follows.

if((sec_idx==0||log 2TrafoSize!=2))

Adaptive Multiple Core Transform (Processing by core transform processing unit 15212)

In a case where the minimum size of the transform size is 4×4, the minimum value of the logarithmic transform size is 2. Hence, an equation log 2TrafoSize !=2 represents a TU size (transform size) that is not the minimum size (hence, that is larger than the minimum size).

Hereinafter, the condition Z that the transform size is larger than the prescribe size is not defined by log 2TrafoSize !=2. For instance, a relationship log 2TrafoSize>TH may be used for the purpose. For instance, TH=2 or 3.

In addition, any one of the following conditions Z1, Z2, and Z3 may be used as the condition Z that the transform size is larger than the prescribe size assuming that log 2TrafoW and log 2TrafoH are the logarithm of the width of the TU and the logarithm of the height of the TU, respectively.

log 2TrafoW+log 2TrafoH!=TH         Z1:

log 2TrafoW+log 2TrafoH>TH          Z2:

max(log 2TrafoW,log 2TrafoH)>TH     Z3:

Here, TH=3 or 4, for instance.

Assuming that TbW and TbH are the width and the height of the TU, respectively, the above-mentioned conditions Z1, Z2, and Z3 may be expressed by use of the following, their respective equivalent conditions Z1', Z2', and Z3'.

TbW+TbH!=TH         Z1':

TbW+TbH>TH          Z2':

max(TbW,TbH)>TH     Z3':

Here, TH=8, 12, or 16, for instance.

Alternatively, the TT information decoder 13 may be configured as follows. The inverse quantization/inverse transform unit 15 may have a configuration where in a case where a Secondary Transform is performed on a TU, the TT information decoder 13 is prevented from performing a decoding to obtain an AMT index amt_idx so that Adaptive Multiple Core Transform is not performed provided that the TU size is not larger than a prescribed size (e.g., 4×4).

Figure 28:
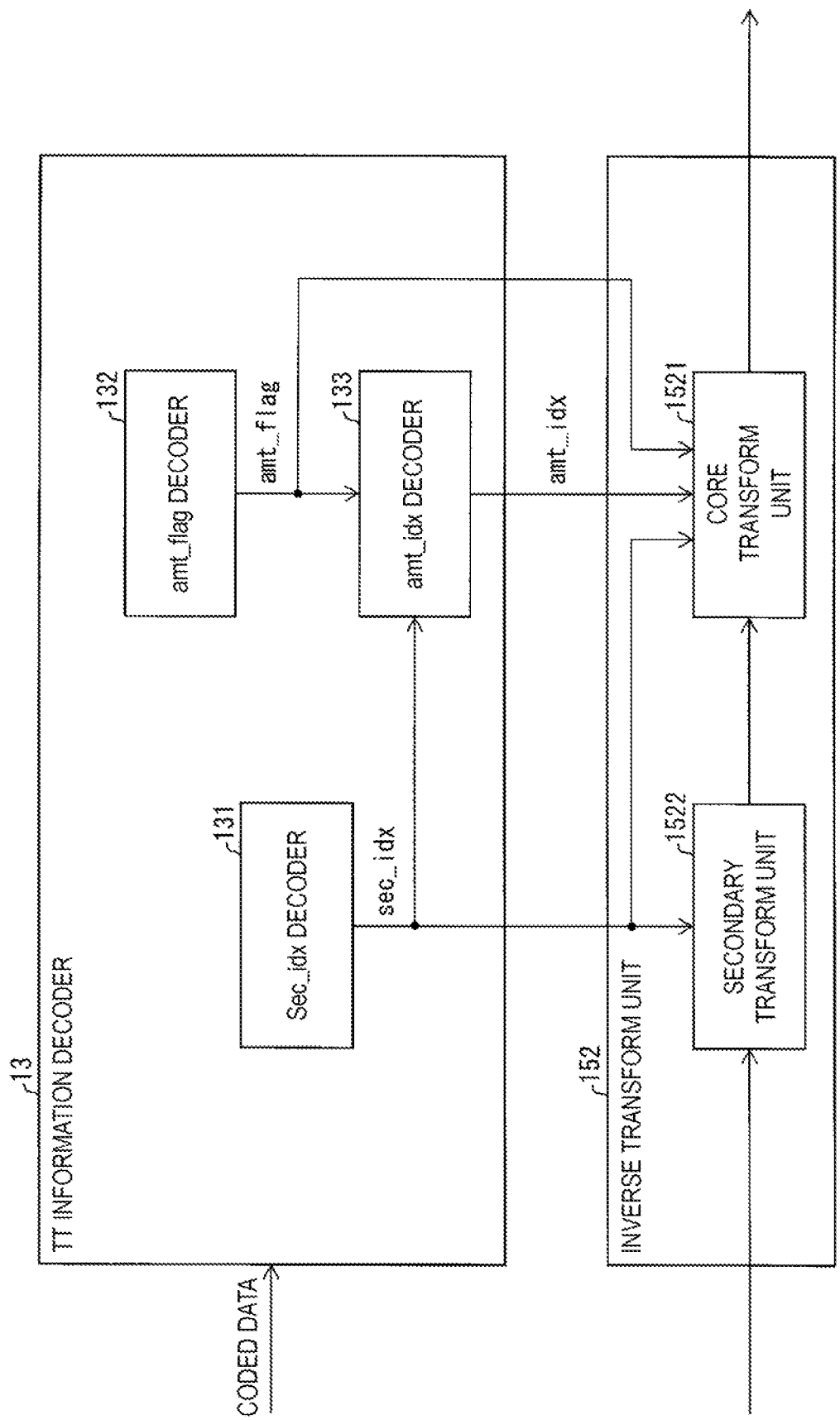
FIG. 28 is a functional block diagram illustrating an exemplar configuration describing a TT information decoder and an inverse transform unit according to an embodiment of the present invention.

The above described configurations of the TT information decoder 13 and the inverse transform unit 152 will be described with reference to FIG. 28. FIG. 28 is a functional block diagram illustrating an exemplar configuration describing the TT information decoder 13 and the inverse transform unit 152. Like the ones illustrated in FIG. 27, the TT information decoder 13 includes a sec_idx decoder 131, an amt_flag decoder 132, and an amt_idx decoder 133, whereas the inverse transform unit 152 includes a Secondary Transform unit 1522 and a core transform unit 1521.

When the TT information decoder 13 receives coded data from the CU information decoder 21, the sec_idx decoder 131 performs a decoding to obtain a sec_idx, and sends the sec_idx thus obtained to the amt_idx decoder 133, the Secondary Transform unit 1522, and the core transform unit 1521. The amt_flag decoder 132 performs a decoding to obtain an AMT flag amt_flag, and sends the AMT flag amt_flag thus obtained to the amt_idx decoder 133 and to the core transform unit 1521. The amt_idx decoder 133 determines whether to decode the received sec_idx and AMT flag amt_flag into an AMT index amt_idx.

For instance, in a case where the received sec_idx indicates that the Secondary Transform unit 1522 is to perform the Secondary Transform, and the TU size is smaller than the prescribed size TH, or in a case where the amt_flag=0, the amt_idx decoder 133 does not decode the coded data into an AMT index amt_idx but derives the amt_idx=0, and sends the amt_idx thus derived to the core transform unit 1521. In this case, the core transform unit 1521 receives the amt_idx=0, and in accordance with this parameter, the core transform unit 1521 does not perform a core transform processing.

Otherwise, the core transform unit 1521 perform a decoding to obtain an AMT index amt_idx, and sends the AMT index amt_idx to the core transform unit 1521. Note that the decoding to obtain the sec_idx by the sec_idx decoder 131 and the decoding to obtain the AMT flag amt_flag by the amt_flag decoder 132 may be performed at the TT level. Alternatively, the decoding to obtain the sec_idx by the sec_idx decoder 131 may be performed at the TU level.

FIG. 29 is an exemplar configuration of a syntax table of TT information TTI for a case where the decoding to obtain a sec_idx and an amt_flag is performed at the TT level according to an embodiment of the present invention, and FIGS. 30A and 30B illustrate an exemplar configuration of a syntax table of TU information TUI for a case where the decoding to obtain the amt_idx is performed at a TU level according to an embodiment of the present invention. Note that for the sake of a simple explanation, a syntax indicating a processing similar to an already-described one (e.g., FIG. 12 and FIG. 13) will be given the same reference numeral as that used for the already-described one without repeating the explanation.

In a case where the TU split flag split_transform_flag is a value (e.g. 1) indicating that the splitting is to be performed (corresponding to YES at S1733 in FIG. 23); and the TU level trafoDepth is 0; and the prediction mode is the intra-prediction mode (corresponding to YES at S1754a in FIG. 23), the TT information decoder 13 may perform a decoding to obtain an index associated with the Secondary Transform sec_idx (SYN1755c).

```
if(trafoDepth == 0 && PredMode == PRED_INTRA)
    sec_idx[ x0 ][ y0 ][ trafoDepth ]
```

In addition, in a case where the TU level trafoDepth is 0, the decoding to obtain the AMT flag amt_flag may be performed (SYN1753b).

```
if(trafoDepth == 0)
    amt_flag[ x0 ][ y0 ][ trafoDepth ]
```

On the other hand, in a case where the TU split flag split_transform_flag is 0, the TT information decoder 13 performs a decoding to obtain a TU residue flag (e.g., cbf_luma). Moreover, in a case where the TU flag (cbfLuma in this example) is not 0; and the TU level trafoDepth is 0; and the prediction mode is the intra-prediction mode, TT information decoder 13 may perform a decoding to obtain the index associated with the Secondary Transform sec_idx (SYN1753b).

```
if(cbf_luma[x0][y0][trafoDepth]&& trafoDepth == 0 &&
    PredMode ==
PRED_INTRA)
        sec_idx[ x0 ][ y0 ][ trafoDepth ]
```

Furthermore, in a case where the TU residue flag (cbfLuma in this example) is not 0; and the TU level trafoDepth is 0, the TT information decoder 13 performs a decoding to obtain the AMT flag amt_flag (SYN1753c), and performs a decoding to obtain the transform unit TU indicated in SYN1760.

```
if(cbf_luma[x0][y0][trafoDepth]&& trafoDepth == 0)
    amt_flag[ x0 ][ y0 ][ trafoDepth ]
transform_unit(x0, y0, xBase, yBase, log2TrafoSize, trafoDepth, blkIdx)
```

Next, a decoding processing by the TT information decoder 13 to obtain the TU information (S1760 in FIG. 29) will be described with reference to FIGS. 30A and 30B. FIG. 30A illustrates an exemplar configuration of a syntax table of TU information according to an embodiment of the present invention, and FIG. 30B is a pseudocode description of a decoded portion of the amt_idx.

TU decoder 22 determines whether a residue is contained in the TU. In a case where a residue is contained in the TU (the TU residue flag is non-zero), the TU decoder 22 performs a decoding to obtain QP update information (quantization correction value) (SYN1781).

In a case where the TU residue flag (cbfLuma in this example) is non-zero, the TU decoder 22 performs a decoding to obtain a quantized predictive residue (residual_coding). The TT information decoder 13 may perform a decoding to obtain sequentially multiple color components as quantized predictive residues.

In a case where the size of the TU is a prescribed size (log 2TrafoSize=2 in this example); and the Secondary Transform index sec_idx is non-zero (i.e., in a case where a Secondary Transform is to be performed), the TT information decoder 13 may omit the decoding to obtain the information associated with the adaptive core transform, or the AMT index amt_idx in this example.

To be more specific, with additional conditions, in a case where a condition A (=AMT flag amt_flag is non-zero) and a condition B (=the number of non-zero coefficient numCoeff is larger than the coreSIGNUM) and where a condition XS (=index associated with the Secondary Transform sec_idx is 0 (i.e., no Secondary Transform is to be performed), or in a case where the TU has a logarithmic TU size that is larger than the log 2TrafoSize=2)) are satisfied, the amt_idx decoder 133 may perform a decoding to obtain the AMT index amt_idx (SYN1811).

Otherwise (in a case where a condition A is not satisfied (=AMT flag amt_flag is 0); or where a condition B is not satisfied (=the number of non-zero coefficient numCoeff is not larger than the coreSIGNUM, or where a condition XS is not satisfied (=the transform block has a logarithmic TU size log 2TrafoSize=2); and where a condition XS is not satisfied (=index associated with the Secondary Transform sec_idx is not 0 (i.e., the Secondary Transform is to be performed))), the amt_idx decoder 133 performs no decoding to obtain the AMT index amt_idx (SYN1812).

With this configuration, the inverse quantization/inverse transform unit 15 can apply at least one of the Adaptive Multiple Core Transform or the Secondary Transform to a small transform block such as that of 4×4 TU, and thus restore the predictive residue r[ ][ ] efficiently without waste. In a case where the TU has a prescribed size (log 2TrafoSize=2 in this example) and where the Secondary Transform is to be performed, no decoding to obtain information for core transform amt_idx is to be performed. Hence, wasteful encoding of syntax is avoided.

In addition, the TT information decoder 13 may be configured not to perform a selective Adaptive Multiple Core Transform of the Adaptive Multiple Core Transforms in a case where a condition XS is not satisfied (=sec_idx is non-zero (Secondary Transform is to be performed)), or where the transform block has a logarithmic TU size that is not larger than the prescribed size (log 2TrafoSize==2). To put it differently, Adaptive Multiple Core Transform is not to be performed, but the fixed transform is to be performed. Specifically, the following configuration is allowable.

```
if((sec_idx != 0 && log2TrafoSize == 2))
    amt_flag = 0 (the fixed transform is to be performed)
```

(Configuration 2 where Whether to Perform Adaptive Multiple Core Transform is Determined in Accordance with Whether to Perform Secondary Transform Processing)

In the inverse quantization/inverse transform unit 15, the Secondary Transform unit 1522 may be configured to perform a Secondary Transform on a transform block, and in a case where the TU has a size that is not larger than the prescribed size (e.g., 4×4), the TT information decoder 13 may not be configured to perform a decoding to obtain an AMT flag amt_flag and make the amt_flag=0 to prevent Adaptive Multiple Core Transform from being performed.

Figure 31:
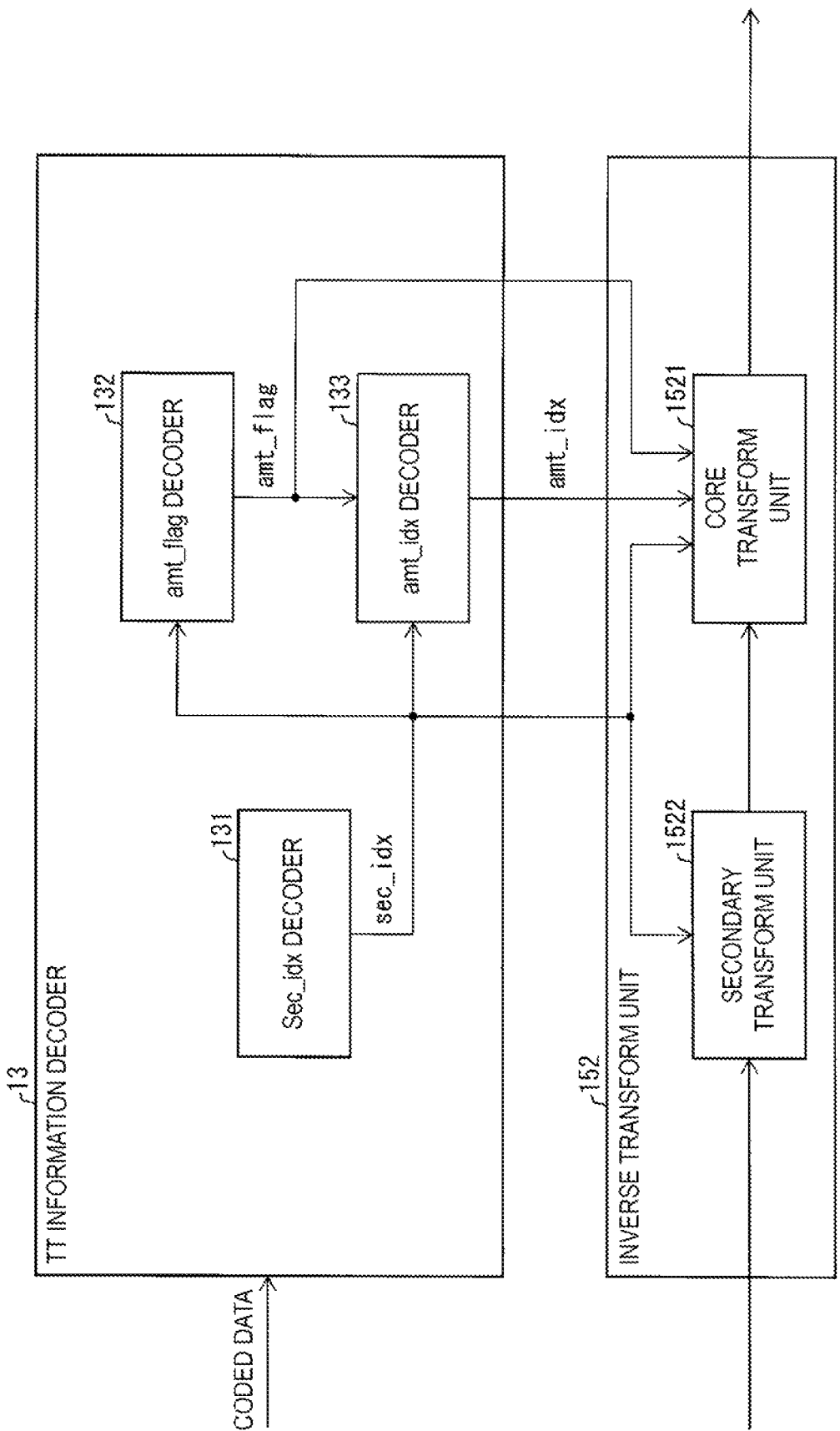
FIG. 31 is a functional block diagram illustrating an exemplar configuration describing a TT information decoder and an inverse transform unit according to other embodiment of the present invention.
Figure 35:
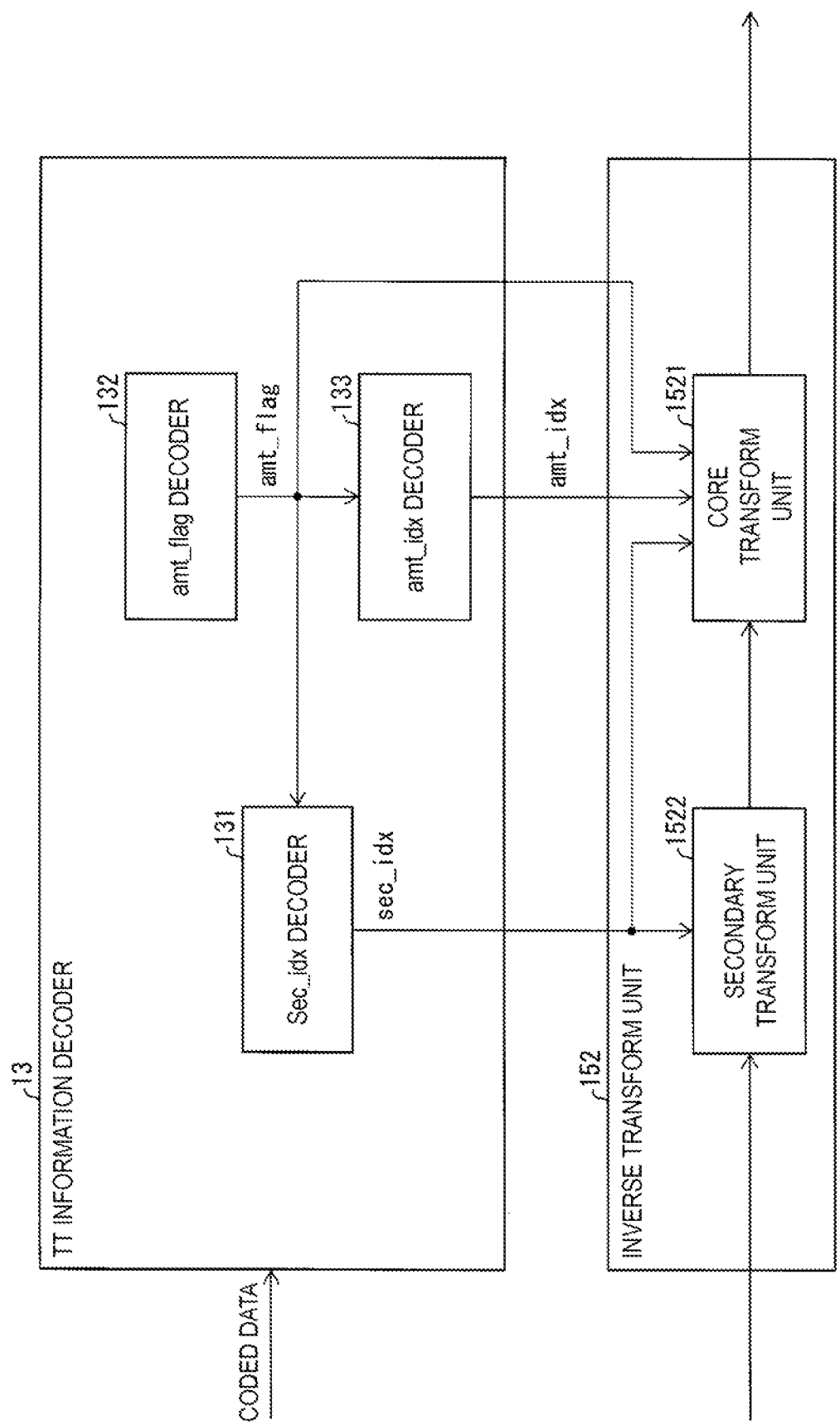
FIG. 35 is a functional block diagram illustrating an exemplar configuration describing a TT information decoder and an inverse transform unit according to an embodiment of the present invention.
Figure 36:
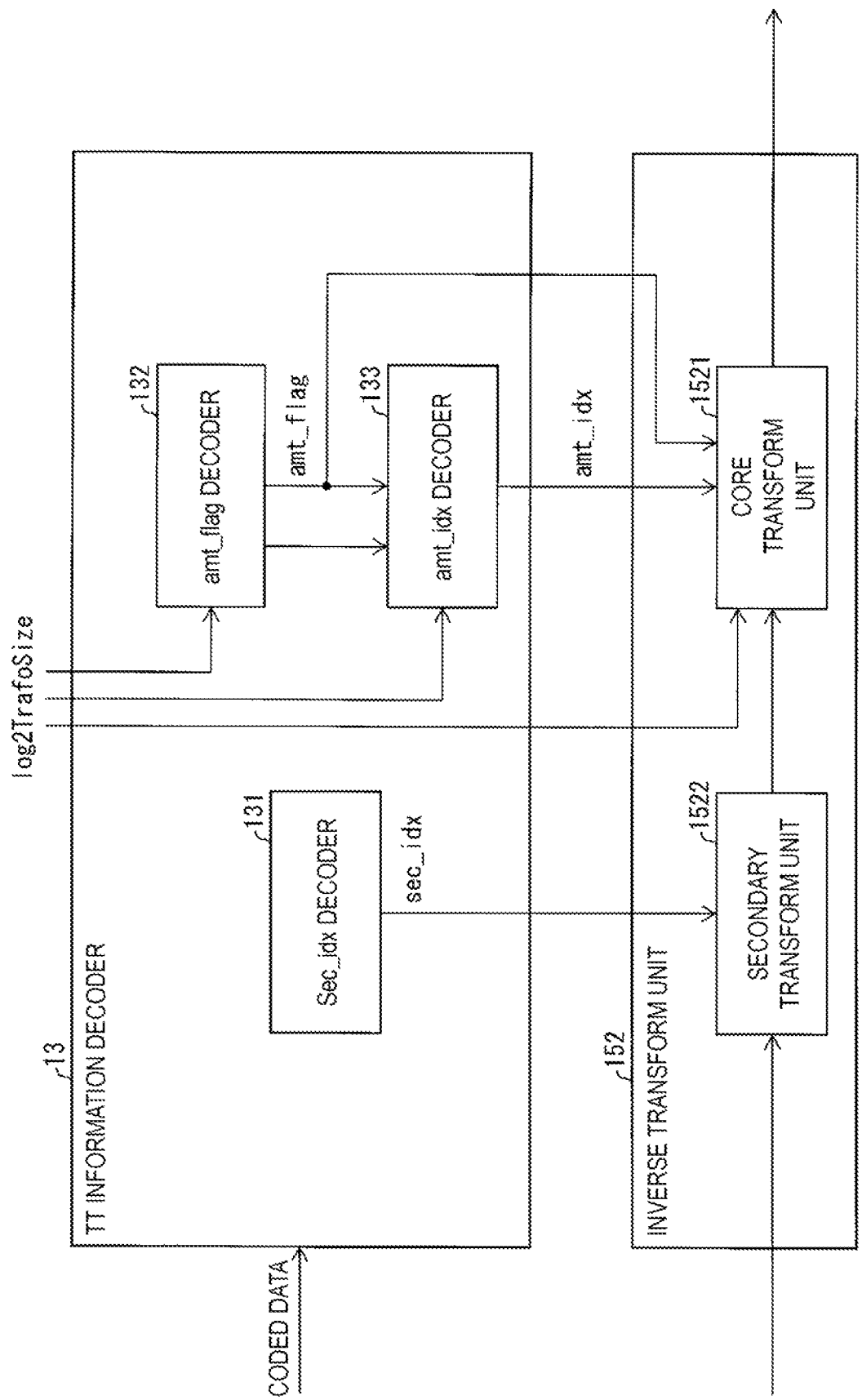
FIG. 36 is a functional block diagram illustrating an exemplar configuration describing a TT information decoder and an inverse transform unit according to an embodiment of the present invention.
Figure 37:
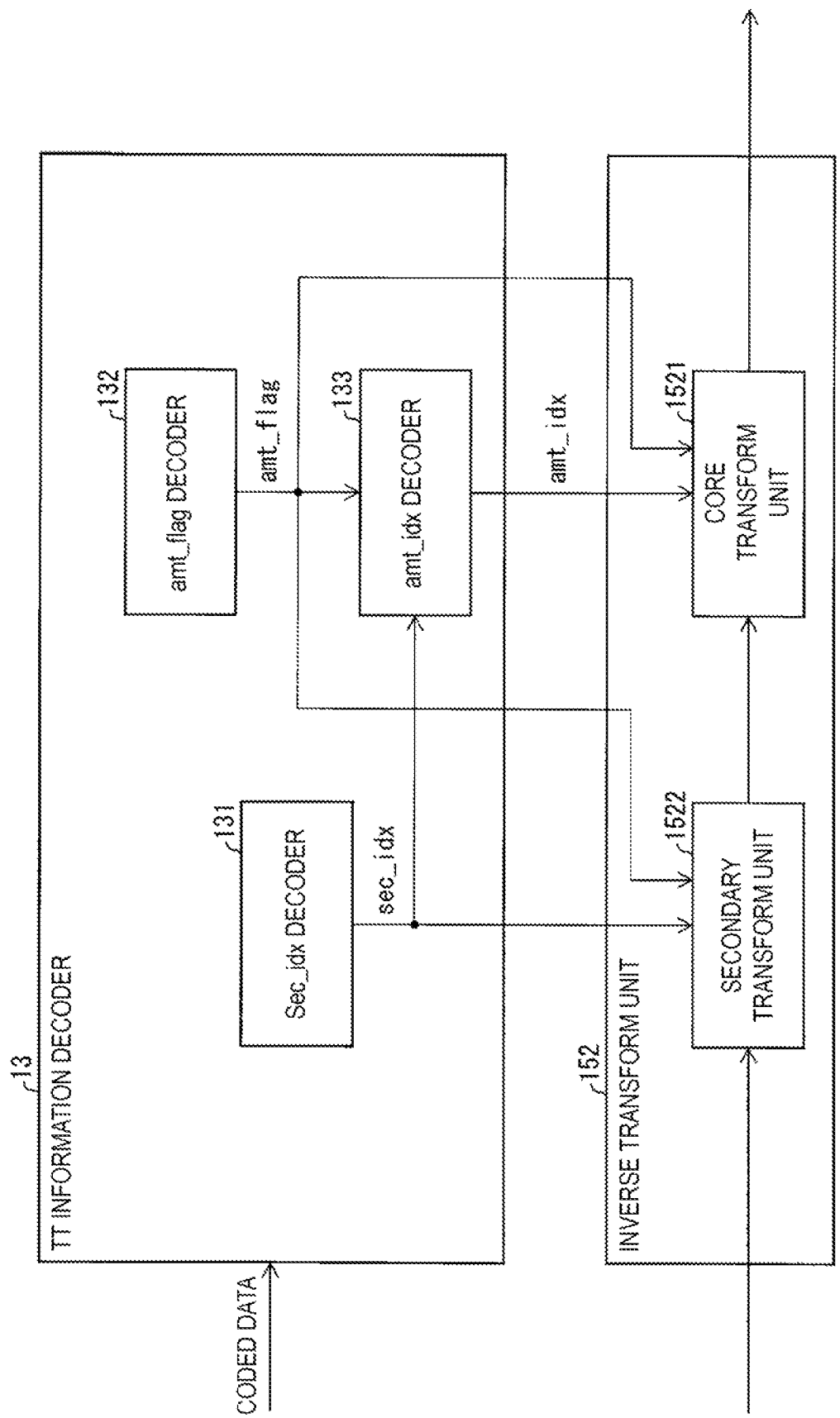
FIG. 37 is a functional block diagram illustrating an exemplar configuration describing a TT information decoder and an inverse transform unit according to an embodiment of the present invention.

The above-described configurations of the TT information decoder 13 and of the inverse transform unit 152 will be described with reference to FIG. 31. FIG. 31 is a functional block diagram illustrating an exemplar configuration describing the TT information decoder 13 and the inverse transform unit 152. The TT information decoder 13 includes a sec_idx decoder 131, an amt_flag decoder 132, and an amt_idx decoder 133, whereas the inverse transform unit 152 includes a Secondary Transform unit 1522 and a core transform unit 1521.

When the TT information decoder 13 receives coded data from the CU information decoder 21, the sec_idx decoder 131 performs a decoding to obtain a sec_idx, and sends the sec_idx thus obtained to the amt_idx decoder 133, the Secondary Transform unit 1522, the amt_flag decoder 132, and the core transform unit 1521. The amt_flag decoder 132 determines whether to perform a decoding to obtain an AMT flag amt_flag by referring to the received sec_idx, and sends the AMT flag amt_flag thus obtained to the amt_idx decoder 133 and to the core transform unit 1521. The amt_idx decoder 133 decodes the received sec_idx and AMT flag amt_flag into an AMT index amt_idx.

In a case where the received sec_idx does not satisfy the condition XS (in a case of indicating that the Secondary Transform is to be performed (sec_idx !=0) and where the transform size is not larger than a prescribed size (e.g., log 2TrafoSize==3)), the amt_flag decoder 132 does not decode the coded data into the syntax (AMT flag amt_flag) used for the core transform, but makes amt_flag=0 and sends this result to the core transform unit 1521. In this case, the core transform unit 1521 receives the amt_flag=0, and in accordance with this parameter, the core transform unit 1521 does not perform a core transform processing.

Conversely, in a case where the received sec_idx satisfies the condition XS (in a case of indicating that the Secondary Transform is not to be performed (sec_idx=0) and where the transform size is larger than a prescribed size (e.g., log 2TrafoSize !=2 or log 2TrafoSize>3)), the amt_flag decoder 132 performs a decoding to obtain the syntax (AMT flag amt_flag) used for the core transform, and sends the syntax thus obtained to the amt_idx decoder 133 and the core transform unit 1521.

FIGS. 32A and 32B illustrate an exemplar configuration of a syntax table of TT information TTI according to an embodiment of the present invention.

In a case where the TU split flag split_transform_flag has a value (e.g., 1) indicating that a splitting is to be performed, the following processing of decoding may be performed to obtain the sec_idx and the amt_flag. In a case where the TU level trafoDepth is 0, and the prediction mode is the intra-prediction mode, the sec_idx decoder 131 may perform a decoding to obtain an index associated with the Secondary Transform sec_idx (SYN1755d).

```
if(trafoDepth == 0 && PredMode == PRED_INTRA)
    sec_idx[ x0 ][ y0 ][ trafoDepth ]
```

In addition, in a case where a condition T (=TU level trafoDepth is 0) is satisfied, and where a condition XS (=transform block has a logarithmic TU size log 2TrafoSize that is larger than 3 or the sec_idx is 0) is satisfied, the amt_flag decoder 132 may perform a decoding to obtain an AMT flag amt_flag (SYN1755e).

```
if(trafoDepth == 0 && (sec_idx == 0 || log2TrafoSize > 3))
    amt_flag[ x0 ][ y0 ][ trafoDepth ]
```

Otherwise (in a case where the condition T (=the TU level trafoDepth is 0) is not satisfied, or in a case where the condition XS (=sec_idx is 0 or the TU has a size that is not larger than the prescribed size (log 2TrafoSize==3)) is not satisfied, the decoding of the coded data into the AMT flag amt_flag is not to be performed. In a case where the amt_flag is not obtained from the decoding, a value of 0 is derived for the amt_flag. In a case where the TU split flag split_transform_flag is 1, the CU is split into multiple TUs, which makes the size log 2TrafoSize==2.

Conversely, in a case where the TU split flag split_transform_flag has a value of 0 indicating that no splitting is to be performed, the following processing of decoding may be performed to obtain the sec_idx and the amt_flag.

In a case where the TU residue flag (e.g., cbf_luma) is non-zero; and the TU level trafoDepth is 0; and the prediction mode is the intra-prediction mode, the sec_idx decoder 131 may perform a decoding to obtain an index associated with the Secondary Transform sec_idx (SYN1753d).

```
if(cbf_luma[ x0 ][ y0 ][ trafoDepth ]&& trafoDepth == 0 &&
    PredMode ==
PRED_INTRA)
    sec_idx[ x0 ][ y0 ][ trafoDepth ]
```

Furthermore, in a case where the TU residue flag (cbfLuma in this example) is non-zero; and the condition T (=TU level trafoDepth is 0) is satisfied; and the condition XS (=transform block has a logarithmic TU size log 2TrafoSize is not 2 or the sec_idx is 0) is satisfied, the amt_flag decoder 132 may perform a decoding to obtain an AMT flag amt_flag (SYN1753e).

```
if(cbf_luma[ x0 ][ y0 ][ trafoDepth ]&& trafoDepth == 0 &&
    (sec_idx == 0 ||
log2TrafoSize != 2))
    amt_flag[ x0 ][ y0 ][ trafoDepth ]
```

Hence, in a case where the condition XS (=no Secondary Transform is to be performed (sec_idx=0)) is not satisfied and where the TU has a size that is equal to a prescribed size (log 2TrafoSize==2), decoding to obtain AMT flag amt_flag is not to be performed.

With this configuration and in a case where the TU has a prescribed size (log 2TrafoSize=2 in this example) and where the Secondary Transform is to be performed, decoding to obtain information for core transform amt_idx is not to be performed. Hence, wasteful encoding of syntax is avoided.

(Configuration 3 where Whether to Perform Adaptive Multiple Core Transform is Determined in Accordance with Whether to Perform Secondary Transform Processing)

In the foregoing description, a case where the decoding to obtain the sec_idx performed by the decoder 131 and the decoding to obtain the AMT flag amt_flag by the amt_flag decoder 132 are performed at the TU level is described by use of the syntax tables described in FIG. 29 and FIGS. 30A and 30B. This, however, is not the only possible case. Now, with reference to FIGS. 33A and 33B and FIGS. 34A and 34B, a description will be provided about the processing of decoding to obtain the sec_idx, the AMT flag amt_flag, and the AMT index amt_idx of a case where in the TT information decoder 13 having a configuration illustrated in FIG. 28, the decoding to obtain the sec_idx performed by the decoder 131 and the decoding to obtain AMT index amt_idx by the amt_idx decoder 133 are performed at the TU level. FIG. 33A illustrates an exemplar configuration of a syntax table of TT information TTI according to an embodiment of the present invention, and FIG. 33B is a pseudocode description of a decoded portion of an amt_flag.

As indicated in FIGS. 33A and 33B, in a case where the split_transform_flag is not 0 (splitting is to be performed), the amt_flag decoder 132 performs a decoding to obtain an AMT flag amt_flag at the TT level provided that the TU level trafoDepth is 0 (SYN1755f).

```
if(trafoDepth == 0)
    amt_flag[ x0 ][ y0 ][ trafoDepth ]
```

In addition, in a case where the split_transform_flag is 0 (no splitting is to be performed), the amt_flag decoder 132 amt_flag decoder 132 may perform a decoding to obtain an AMT flag amt_flag provided that both the TU residue flag (cbfLuma in this example) and the TU level trafoDepth are 0 (SYN1753f).

```
if(cbf_luma[ x0 ][ y0 ][ trafoDepth ]&& trafoDepth == 0)
    amt_flag[ x0 ][ y0 ][ trafoDepth ]
```

Then, in a case where the TU split flag split_transform_flag is 0, the TT information decoder 13 performs a decoding to obtain a transform unit TU indicated in SYN1760.

```
transform_unit(x0,y0,xBase,yBase,log 2TrafoSize,
    trafoDepth,blkIdx)
```

Next, a decoding processing by the TT information decoder 13 to obtain the TU information will be described with reference to FIGS. 34A and 34B. FIG. 34A illustrates an exemplar configuration of a syntax table of TU information TUI according to an embodiment of the present invention, and FIG. 34B is a pseudocode description of a decoded portion of the amt_idx.

In a case where the prediction mode is the intra-prediction mode, and the number of non-zero coefficients numCoeff is larger than the coreSIGNUM, the TU decoder 22 may perform a decoding to obtain the index associated with the Secondary Transform sec_idx (SYN1811c).

```
if(predMode == PRED_INTRA && numCoeff > coreSIGNUM)
    sec_idx[ x0 ][ y0 ][ trafoDepth ]
Otherwise, the sec_idx is set to 0.
```

In a case where a condition A (=AMT flag amt_flag is non-zero) and a condition B (=the number of non-zero coefficient numCoeff is larger than the coreSIGNUM) and a condition XS (=index associated with the Secondary Transform sec_idx is 0 or the logarithmic TU size log 2TrafoSize is not 2) are satisfied, the TT information decoder 13 may perform a decoding to obtain an AMT index amt_idx to be used for the Adaptive Multiple Core Transform (SYN1812c).

```
if(amt_flag! == 0 && numCoeff > coreSIGNUM && (sec_idx ==
0 ||
(log2TrafoSize!=2))
    amt_idx[ x0 ][ y0 ][ trafoDepth ]
```

(Configuration 4 where Whether to Perform Adaptive Multiple Core Transform is Determined in Accordance with Whether to Perform Secondary Transform Processing)

In the foregoing description, a configuration where whether to perform an Adaptive Multiple Core Transform is determined in accordance with whether to perform Adaptive Secondary Transform processing is described by use of some examples. This, however, is not the only possible configuration. Specifically, even with a configuration where whether to perform an Adaptive Multiple Core Transform is determined in accordance with whether to perform Adaptive Secondary Transform processing, the video decoding device 1 may have a configuration associated with the decoding of syntaxes where the decoding to obtain parameters for the Adaptive Multiple Core Transform processing (amt_flag and amt_idx) is performed first, and then, by referring to such parameters thus obtained, the decoding to obtain the parameter (index sec_idx) for the Secondary Transform is performed. Other exemplar configurations of the TT information decoder 13 and of the inverse transform unit 152 having the above-described configurations will be described with reference to FIG. 35 and FIGS. 40A and 40B.

The inverse quantization/inverse transform unit 15 may be configured as follows. In a case where the TU has a size that is not larger than the prescribed size (e.g., 4×4), no core transform is to be performed on the TU provided that the Secondary Transform is performed to the PU.

To put it differently, in a case where condition sec_idxis=1, and where the logarithmic TU size is larger than a prescribed size (log 2TrafoSize !=2), no core transform is to be performed. Otherwise, depending on the value of the amt_flag, the fixed transform (in a case where amt_flag=0) or the selective core transform (in a case where amt_flag=1) is performed.

```
if((sec_idx == 1 && log2TrafoSize = 2))
    nothing; // Secondary Transform only
else if (amt_flag==0)
    fixed transform
else
    selective core transform (processing by the core transform processing
    unit 15212)
```

Next, the decoding of syntaxes will be described. The TT information decoder 13 includes a sec_idx decoder 131, an amt_flag decoder 132, and an amt_idx decoder 133, whereas the inverse transform unit 152 includes a Secondary Transform unit 1522 and a core transform unit 1521.

Once the TT information decoder 13 receives coded data from the CU information decoder 21, the amt_flag decoder 132 performs a decoding to obtain an AMT flag amt_flag, and sends the AMT flag amt_flag thus obtained to the sec_idx decoder 131, the amt_idx decoder 133, and the core transform unit 1521. By referring to the amt_flag, the sec_idx decoder 131 performs a decoding to obtain an index associated with the Secondary Transform sec_idx, and sends the index associated with the Secondary Transform sec_idx thus obtained to the Secondary Transform unit 1522 and the core transform unit 1521. By referring to the received AMT flag amt_flag, the amt_idx decoder 133 performs a decoding to obtain an AMT index amt_idx.

For instance, in a case where the received AMT flag amt_flag indicates that the core transform unit 1521 performs an Adaptive Multiple Core Transform (amt_flag !=0) and where the transform size is the prescribed size (log 2TrafoSize==2), the sec_idx decoder 131 does not decode the coded data into an index associated with the Secondary Transform sec_idx, but makes sec_idx=0 and sends the result to the Secondary Transform unit 1522 and the core transform unit 1521. In such a case, the Secondary Transform unit 1522 receives sec_idx=0, and in accordance with this parameter, the Secondary Transform unit 1522 does not perform a Secondary Transform processing.

Conversely, in a case where the received AMT flag amt_flag indicates that the core transform unit 1521 performs no Adaptive Multiple Core Transform (amt_flag=0) the sec_idx decoder 131 performs a decoding to obtain an index associated with the Secondary Transform sec_idx. Note that the decoding to obtain the sec_idx by the sec_idx decoder 131 and the decoding to obtain the AMT flag amt_flag by the amt_flag decoder 132 may be performed at the TT level.

In such a case, the Secondary Transform unit 1522 derives sec_idx=0, and the Secondary Transform unit 1522 does not perform a Secondary Transform processing. In a case where the TU has a size that is not larger than the prescribed size (e.g., 4×4) with a configuration where no core transform is performed, only the Secondary Transform is to be performed; but with a configuration where the core transform is performed, Secondary Transform is not to be performed. Hence, in a case where a selective transform is performed in the Adaptive Multiple Core Transform (amt_flag !=0), wasteful decoding can be avoided by omitting the decoding to obtain a syntax associated with the Secondary Transform sec_idx.

In addition, a configuration illustrated in FIGS. 40A and 40B may also be employed. Specifically, in a case where the prediction mode is the intra-prediction mode, and the number of non-zero coefficients numCoeff is larger than the coreSIGNUM, the TU decoder 22 may perform a decoding to obtain a parameter associated with the core transform (amt_idx in this example) (SYN1811e).

```
if(predMode == PRED_INTRA && numCoeff > coreSIGNUM)
    amt_idx[ x0 ][ y0 ][ trafoDepth ]
```

In a case where the transform size is the prescribed size (e.g., log 2TrafoSize==2), or in a case where the flag of adaptive core transform amt_flag is 1 indicating that a selective core transform is employed, the decoding to obtain a syntax used for the Secondary Transform (sec_idx in this example) may be omitted. Conversely, in a case where the condition XC (=the transform size is not the prescribed size (log 2TrafoSize !=2), or the AMT flag amt_flag is 0) is satisfied, the decoding to obtain a syntax used for the Secondary Transform (index sec_idx) may be decoded.

To be more specific, with additional conditions, in a case where a condition I (=prediction mode is the intra-prediction) and the condition B (=the number of non-zero coefficient numCoeff is larger than the secSIGNUM) and the condition XC (=the AMT flag amt_flag is 0 or the logarithmic TU size log 2TrafoSize is not 2) are satisfied, the TU decoder 22 may perform a decoding to obtain an index sec_idx to be used for the Secondary Transform (SYN1811e).

```
if(predMode == PRED_INTRA && numCoeff > secSIGNUM &&
    (amt_flag == 0
|| (log2TrafoSize!=2))
        sec_idx[ x0 ][ y0 ][ trafoDepth ]
```

Otherwise (in a case where the condition I (=prediction mode is intra-prediction) is not satisfied, or where the condition B (the number of non-zero coefficient numCoeff is larger than the secSIGNUM) is not satisfied, or where the condition XC (=the AMT flag amt_flag is 0 or the logarithmic TU size log 2TrafoSize is not 2) is not satisfied), the TU decoder 22 may omit the decoding to obtain the index sec_idx to be used for the Secondary Transform.

Note that in a case where sec_idx=1 (no core transform is to be performed), the decoding to obtain the amt_idx may be omitted by referring to the sec_idx when the decoding to obtain the amt_idx is performed.

(Configuration where Whether to Perform Adaptive Multiple Core Transform is Determined in Accordance with TU Size)

In the foregoing description, a configuration where whether to perform one of the Secondary Transform processing and Adaptive Multiple Core Transform is determined in accordance with whether to perform the other of the Secondary Transform processing and Adaptive Multiple Core Transform is described. This, however, is not the only possible configuration. Specifically, the video decoding device 1 may be configured to perform the Secondary Transform only (omitting the Adaptive Multiple Core Transform) in a case where the size of the TU (e.g., logarithmic TU size log 2TrafoSize) targeted for the transform processing is not larger than a prescribed size. Other exemplar configurations of the TT information decoder 13 and of the inverse transform unit 152 having the above-described configurations will be described with reference to FIG. 36.

Once the TT information decoder 13 receives the coded data and the corresponding TU size (logarithmic TU size log 2TrafoSize in the illustrated example) from the CU information decoder 21, the amt_flag decoder 132 does not perform any decoding to obtain the AMT flag amt_flag and configures that amt_flag=0 provided that the size of the TU indicated by the logarithmic TU size log 2TrafoSize is not larger than a prescribed size (e.g., 4×4, that is, the logarithmic TU size log 2TrafoSize=2). Then, the amt_flag decoder 132 sends, to the amt_idx decoder 133 and the core transform unit 1521, the amt_flag=0. Conversely, in a case where the size of the TU indicated by the logarithmic TU size log 2TrafoSize is larger than a predetermined size (e.g., 4×4), the amt_flag decoder 132 performs a decoding to obtain the AMT flag amt_flag. Note that the decoding to obtain the sec_idx by the sec_idx decoder 131 and the decoding to obtain the AMT flag amt_flag by the amt_flag decoder 132 may be performed at the TT level. Alternatively, the decoding to obtain the sec_idx by the sec_idx decoder 131 and the decoding to obtain the AMT index amt_idx by the amt_idx decoder 133 may be performed at the TU level.

Then, by referring to the received AMT flag amt_flag, the amt_idx decoder 133 performs a decoding to obtain an AMT index amt_idx. Here, irrespective of the value of the AMT flag, the sec_idx decoder 131 performs a decoding to obtain an index associated with the Secondary Transform sec_idx, and sends the index associated with the Secondary Transform sec_idx thus obtained to the Secondary Transform unit 1522.

The pseudocode description corresponding such a configuration is any one of the following pseudocode descriptions (1) to (4), for instance.

```
(1)
if (sec_idx)
    Secondary Transform processing
    if(log2TrafoSize!= 2)
        Adaptive Multiple Core Transform
```

In this case, with log 2TrafoSize=2, only the Secondary Transform is to be performed.

```
(2)
if (sec_idx)
    Secondary Transform processing
    if (amt_flag && log2TrafoSize!= 2)
        Adaptive Multiple Core Transform
    else
        fixed transform
```

Note that the fixed transform is a transform processing performed by the inverse transform unit 152 on the TU by use of a predefined transform rule. The fixed transform is not a selective transform, which is defined in accordance with the amd_idx. The fixed transform is a transform that is not variable (e.g., DCT2 and DST1).

```
(3)
transform_tree (x0, y0, log2TrafoSize, trafoDepth, blkIdx)
{
split_transform_flag decoding
if (split_transform_flag) {
    if (trafoDepth == 0 && log2TrafoSize > 3)
        amt_flag decoding
    else {
        if (cbf_luma && trafoDepth == 0 && log2TrafoSize != 2)
            amt_flag decoding
            transform_unit (x0, y0, log2TrafoSize - 1, trafoDepth)
        }
    }
}
(4)
transform_unit (x0, y0, log2TrafoSize, trafoDepth, blkIdx)
{
if (numCoeff > coreSIGNUM && log2TrafoSize != 2)
    amt_idx decoding
residual (x0, y0, log2TrafoSize - 1)
}
```

(Configuration 1 where Secondary Transform Processing is Omitted Provided that Adaptive Multiple Core Transform Processing is Performed)

The video decoding device 1 may be configured to make the Secondary Transform unit 1522 omit the Secondary Transform in a case where the core transform unit 1521 performs an Adaptive Multiple Core Transform processing. Other exemplar configurations of the TT information decoder 13 and of the inverse transform unit 152 having the above-described configurations will be described with reference to FIG. 37.

The inverse quantization/inverse transform unit 15 may be configured as follows. In a case where the core transform processing unit 15212 performs a core transform on a TU, and where the size of the TU is not larger than a prescribed size (e.g., 4×4), Secondary Transform is not to be performed. Conversely, in a case where the condition XC (=AMT flag amt_flag is 0, or the TU has a logarithmic TU size that is larger than a prescribed size (log 2TrafoSize !=2)) is satisfied, the core transform is to be performed.

```
if((amt_flag == 0 || log2TrafoSize != 2))
    Secondary Transform (Processing by Secondary Transform
        Processing Unit
15222)
```

Alternatively, the TT information decoder 13 may be configured as follows. The inverse quantization/inverse transform unit 15 may have a configuration where the TT information decoder 13 does not perform a decoding to obtain a syntax associated with the Secondary Transform (sec_idx) and makes sec_idx=0 so that Secondary Transform is not to be performed in a case where an Adaptive Multiple Core Transform is performed on a TU (amt_flag !=0), and where and the TU size is not larger than a prescribed size (e.g., 4×4).

Once the TT information decoder 13 receives the coded data from the CU information decoder 21, the amt_flag decoder 132 performs a decoding to obtain an AMT flag amt_flag, and sends the obtained AMT flag amt_flag to the amt_idx decoder 133, the Secondary Transform unit 1522, and the core transform unit 1521. The AMT flag sec_idx decoder 131 performs a decoding to obtain an index associated with the Secondary Transform sec_idx, and sends the index associated with the Secondary Transform sec_idx thus obtained to the Secondary Transform unit 1522 and the amt_idx decoder 133. Then, by referring to the received AMT flag amt_flag, the received index associated with the Secondary Transform sec_idx, and the received AMT flag amt_flag, the amt_idx decoder 133 performs a decoding to obtain an AMT index amt_idx, and sends the result to the core transform unit 1521. Note that the decoding to obtain the sec_idx by the sec_idx decoder 131 and the decoding to obtain the AMT flag amt_flag by the amt_flag decoder 132 may be performed at the TT level. Alternatively, the decoding to obtain the sec_idx by the sec_idx decoder 131 may be performed at the TU level.

By referring to the received AMT flag amt_flag and the received index associated with the Secondary Transform sec_idx, the Secondary Transform unit 1522 determines whether to perform a Secondary Transform. Note that with no Secondary Transform performed, the transform coefficient d[ ][ ] with no modification is sent to the core transform unit 1521 in place of the modified transform coefficient d[ ][ ] in FIG. 18.

Next, a decoding processing by the TU information decoder 22 to obtain the TU information will be described with reference to FIGS. 38A and 38B. FIG. 38A illustrates an exemplar configuration of a syntax table of TU information TUI according to an embodiment of the present invention, and FIG. 38B is a pseudocode description of decoded portions of the sec_idx and the amt_idx.

In a case where the prediction mode is the intra-prediction mode, and the number of non-zero coefficients numCoeff is larger than the coreSIGNUM, the TU decoder 22 may perform a decoding to obtain the index associated with the Secondary Transform sec_idx (SYN1811d).

```
if(predMode == PRED_INTRA && numCoeff > coreSIGNUM)
    sec_idx[ x0 ][ y0 ][ trafoDepth ]
```

In a case where a condition A (=AMT flag amt_flag is non-zero) and a condition B (=the number of non-zero coefficient numCoeff is larger than the coreSIGNUM) and a condition XS (=index associated with the Secondary Transform sec_idx is 0 or the logarithmic TU size log 2TrafoSize is not 2) is satisfied, the TU decoder 13 may perform a decoding to obtain an AMT index amt_idx to be used for the Adaptive Multiple Core Transform (SYN1812d).

```
if(amt_flag! == 0 && numCoeff > coreSIGNUM && (sec_idx ==
0 ||
(log2TrafoSize!=2))
    amt_flag[ x0 ][ y0 ][ trafoDepth ]
```

Otherwise (in a case where the condition A (=AMT flag amt_flag is non-zero) is not satisfied, or where the condition B (=the number of non-zero coefficient numCoeff is larger than the coreSIGNUM) is not satisfied, or the condition XS (=index associated with the Secondary Transform sec_idx is 0, or the logarithmic TU size log 2TrafoSize is not 2) is not satisfied), the TU decoder 22 may omit the decoding to obtain the index sec_idx to be used for the Adaptive Multiple Core Transform.

(Configuration 2 where Secondary Transform Processing is Omitted Provided that Adaptive Multiple Core Transform Processing is Performed)

Figure 39:
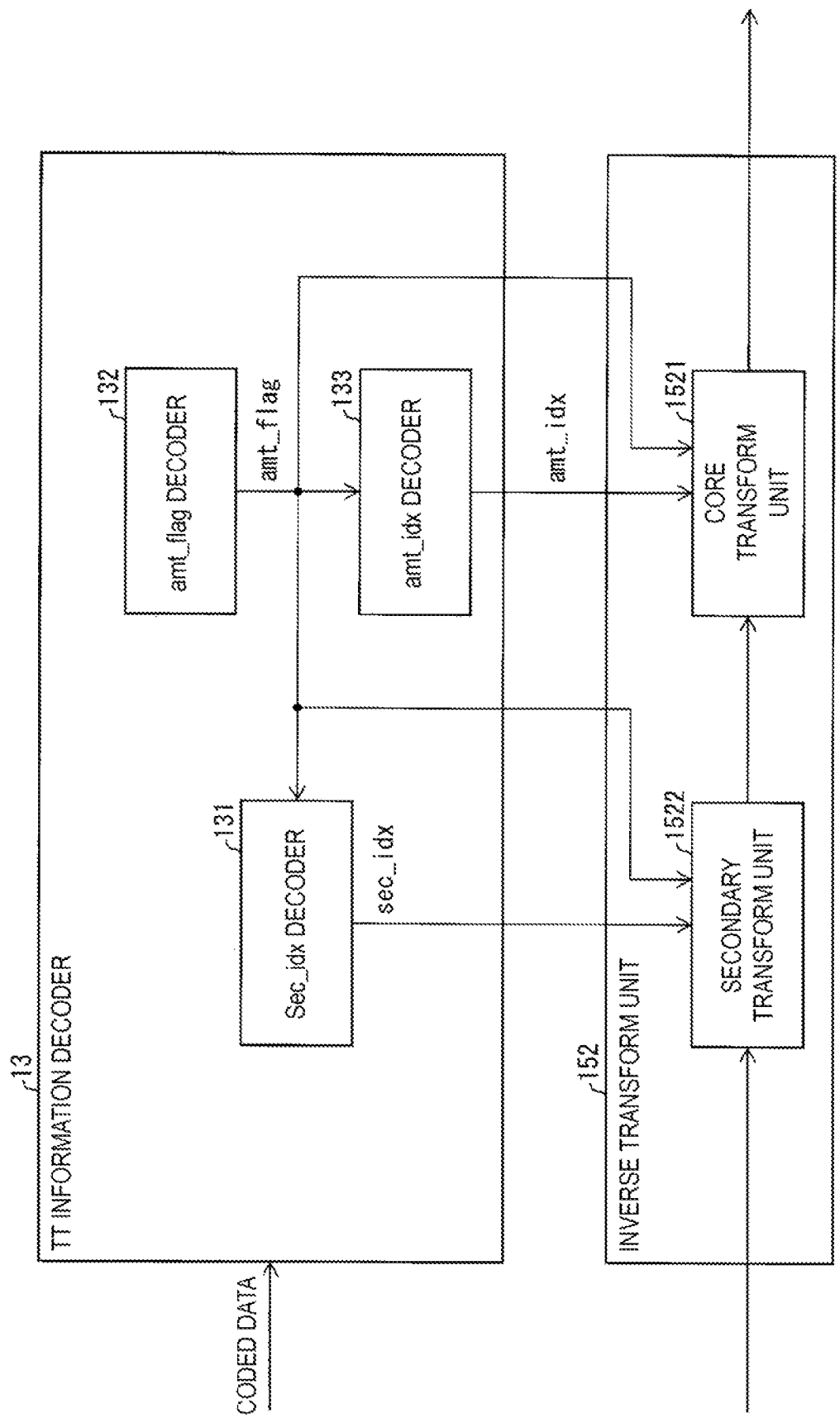
FIG. 39 is a functional block diagram illustrating an exemplar configuration describing a TT information decoder and an inverse transform unit according to an embodiment of the present invention.
Figure 41:
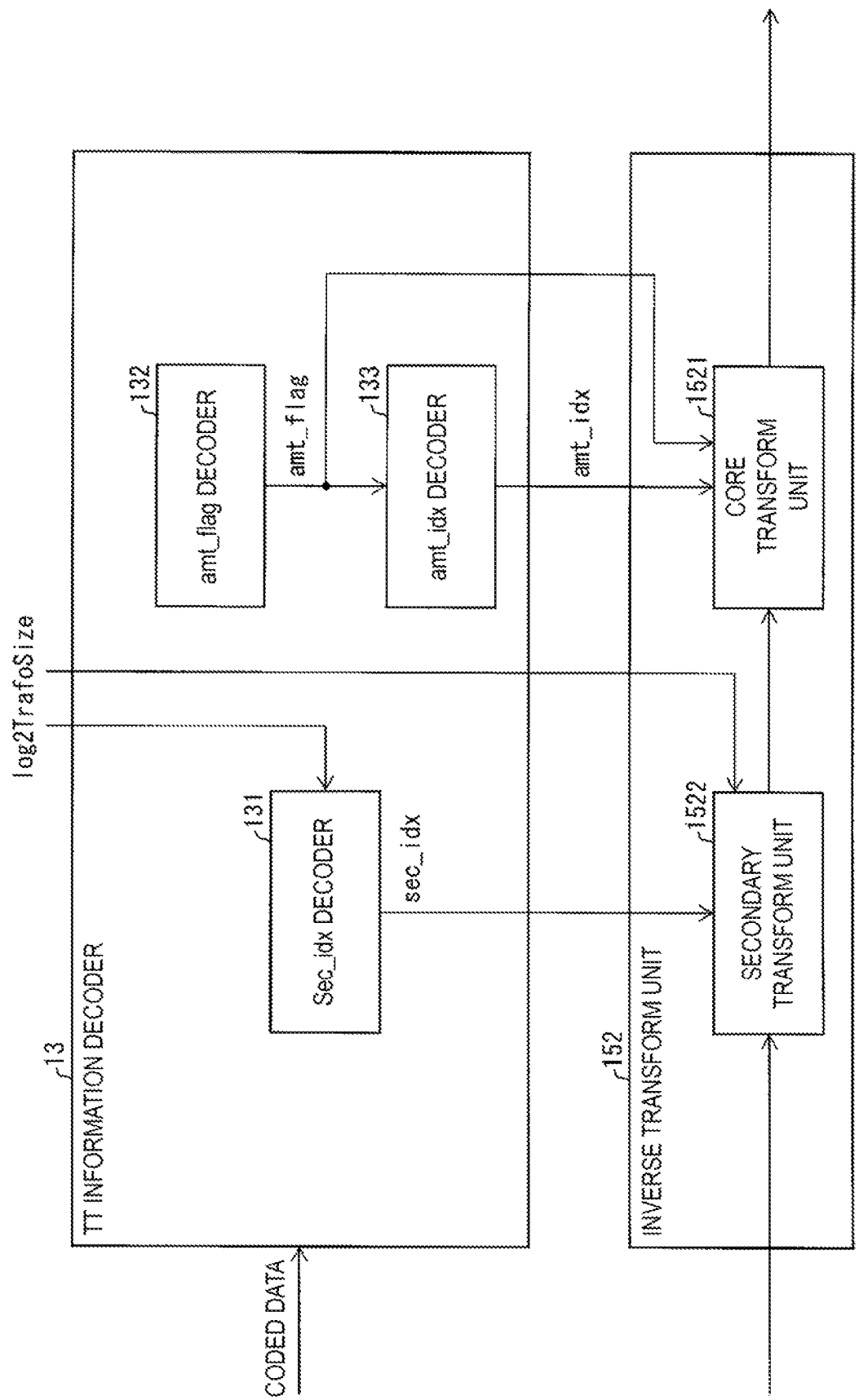
FIG. 41 is a functional block diagram illustrating an exemplar configuration describing a TT information decoder and an inverse transform unit according to an embodiment of the present invention.

Alternatively, the video decoding device 1 may have a configuration illustrated in FIG. 39.

Once the TT information decoder 13 receives the coded data from the CU information decoder 21, the amt_flag decoder 132 performs a decoding to obtain an AMT flag amt_flag, and sends the AMT flag amt_flag thus obtained to the sec_idx decoder 131, the amt_idx decoder 133, the Secondary Transform unit 1522, and the core transform unit 1521. Here, in accordance with the value of the AMT flag, the sec_idx decoder 131 performs a decoding to obtain an index associated with the Secondary Transform sec_idx, and sends the index associated with the Secondary Transform sec_idx thus obtained to the Secondary Transform unit 1522. Then, by referring to the received AMT flag amt_flag, the amt_idx decoder 133 performs a decoding to obtain an AMT index amt_idx, and sends the AMT index amt_idx thus obtained to the core transform unit 1521. Note that the decoding to obtain the sec_idx by the sec_idx decoder 131 and the decoding to obtain the AMT flag amt_flag by the amt_flag decoder 132 may be performed at the TT level. Alternatively, the decoding to obtain the sec_idx by the sec_idx decoder 131 may be performed at the TU level.

By referring to the received AMT flag amt_flag and the received index associated with the Secondary Transform sec_idx, the Secondary Transform unit 1522 determines whether to perform a Secondary Transform. Note that with no Secondary Transform performed, the transform coefficient d[ ][ ] with no modification is sent to the core transform unit 1521 in place of the modified transform coefficient d[ ][ ] in FIG. 18.

By referring to the received AMT flag amt_flag and AMT index amt_idx, the core transform unit 1521 determines whether to perform an Adaptive Multiple Core Transform.

Next, a decoding processing by the TU information decoder 22 to obtain the TU information will be described with reference to FIGS. 40A and 40B. FIG. 40A illustrates an exemplar configuration of a syntax table of TU information TUI according to an embodiment of the present invention, and FIG. 40B is a pseudocode description of decoded portions of an amt_idx and an sec_idx.

In a case where the amt_flag is not 0, and the number of non-zero coefficients numCoeff is larger than the coreSIG-NUM, the TU decoder 22 may perform a decoding to obtain a parameter associated with the core transform (amt_idx in this example) (SYN1812e).

```
if(amt_flag!= 0 && numCoeff > coreSIGNUM)
    amt_idx[ x0 ][ y0 ][ trafoDepth ]
```

In a case where the condition I (=the prediction mode is the intra-prediction) and the condition B (the number of non-zero coefficient numCoeff is larger than the secSIG-NUM) and the condition XC (=the flag amt_flag of the adaptive core transform is 0 or the logarithmic TU size log 2TrafoSize is not 2) are satisfied, the TU decoder 22 may perform a decoding to obtain an index sec_idx to be used for the Secondary Transform (SYN1811e).

```
if(predMode == PRED_INTRA && numCoeff > secSIGNUM &&
    (amt_flag == 0
|| (log2TrafoSize!=2))
        sec_idx[ x0 ][ y0 ][ trafoDepth ]
```

Otherwise (in a case where the condition I (=prediction mode is intra-prediction) is not satisfied, or where the condition B (the number of non-zero coefficient numCoeff is larger than the secSIGNUM) is not satisfied, or where the condition XC (=the AMT flag amt_flag is 0 or the logarithmic TU size log 2TrafoSize is not 2) is satisfied), the TU decoder 22 may omit the decoding to obtain the index sec_idx to be used for the Secondary Transform.

(Configuration where Whether to Perform Secondary Transform is Determined in Accordance with Block Size)

The video decoding device 1 may be configured to determine whether to perform a Secondary Transform processing in accordance with the size of the TU. Other exemplar configurations of the TU decoder 22 and of the inverse transform unit 152 having the above-described configurations will be described with reference to FIG. 41.

The inverse quantization/inverse transform unit 15 may be configured as follows. In a case where the size of the TU is not larger than a prescribed size (e.g., 4×4), the core transform processing unit 15212 performs no Secondary Transform. Conversely, in a case where the condition Z (=the size of the TU is not larger than the prescribed size) is satisfied (log 2TrafoSize!=2 in this example), the Secondary Transform is to be performed.

```
if(log2TrafoSize != 2))
    Secondary Transform (Processing by Secondary Transform
    Processing Unit
15222)
```

Alternatively, once the TU decoder 22 receives the coded data and the corresponding TU size (logarithmic TU size log 2TrafoSize in the illustrated example) from the CU information decoder 21, the sec_idx decoder 131 performs no decoding to obtain index associated with the Secondary Transform sec_idx irrespective of the value of the AMT flag provided that the TU size is not larger than the prescribed size (e.g., 4×4, that is, the logarithmic TU size log 2Trafo-Size=2), The sec_idx decoder 131 makes the sec_idx=0, and sends the sec_idx=0 to the Secondary Transform unit 1522.

Conversely, in a case where the TU size is larger than a prescribed size (e.g., 4×4), the sec_idx decoder 131 performs a decoding to obtain an index associated with the Secondary Transform sec_idx.

The amt_flag decoder 132 performs a decoding to obtain an AMT flag amt_flag, and sends the AMT flag amt_flag thus obtained to the amt_idx decoder 133 and to the core transform unit 1521. Then, by referring to the received AMT flag amt_flag, the amt_idx decoder 133 performs a decoding to obtain an AMT index amt_idx, and sends the AMT index amt_idx thus obtained to the core transform unit 1521.

FIG. 42A illustrates an exemplar configuration of a syntax table of TT information TTI according to an embodiment of the present invention, and FIG. 42B is a pseudocode description of a decoded portion of the sec_idx. As illustrated in FIGS. 42A and 42B, in a case where the TU residue flag (cbfLuma in this example) is not 0, and where the TU level trafoDepth is 0, the amt_flag decoder 132 may perform a decoding to obtain an AMT flag amt_flag (SYN1753g).

```
if(cbf_luma[ x0 ][ y0 ][ trafoDepth ]&& trafoDepth == 0)
    amt_flag[ x0 ][ y0 ][ trafoDepth ]
```

Then, in a case where the TU split flag split_transform_flag is 0, the TT information decoder 13 performs a decoding to obtain a transform unit TU.

```
transform_unit(x0,y0,xBase,yBase,log 2TrafoSize,
    trafoDepth,blkIdx)
```

Next, a decoding processing by the TU information decoder 22 to obtain the TU information will be described with reference to FIGS. 43A and 43B. FIG. 43A illustrates an exemplar configuration of a syntax table of TU information TUI according to an embodiment of the present invention, and FIG. 43B is a pseudocode description of a decoded portion of the sec_idx.

In a case where the TU size is a prescribed size (e.g., log 2TrafoSize==2), the decoding to obtain the index sec_idx to be used for Secondary Transform may be omitted. To put it differently, in a case where the TU size is not the prescribed size (log 2TrafoSize !=2), the decoding to obtain an index sec_id used for the Secondary Transform may be performed.

To be more specific, in a case where the prediction mode is the intra-prediction mode, and the number of non-zero coefficient numCoeff is larger than the coreSIGNUM, and the logarithmic TU size log 2TrafoSize is not 2, the TU decoder 22 may perform a decoding to obtain an index associated with the Secondary Transform sec_idx (SYN1811f).

```
if(predMode == PRED_INTRA && numCoeff > coreSIGNUM &&
log2TrafoSize!= 2)
    sec_idx[ x0 ][ y0 ][ trafoDepth ]
```

Otherwise (in a case where the prediction mode is not the intra-prediction mode, or in a case where the number of non-zero coefficient numCoeff is not larger than coreSIGNUM, or in a case where the logarithmic TU size log 2TrafoSize is 2, the TU decoder 22 may perform no decoding to obtain an index sec_idx to be used for Secondary Transform.

[Modifications]

Note that as described above, with a configuration where in a case where the TU size is not larger than a prescribed size (e.g., 4×4), only the core transform is to be performed with no Secondary Transform performed, a Non-separable transform (Non-separable core transform) may be used in the Adaptive Multiple Core Transform. As described below, the Non-separable core transform may have a configuration that is basically identical to the configuration of the Non-separable secondary transform described in FIG. 19.

A core transform unit 1521 with this configuration (expressed as the core transform unit 1521') includes a core transform processing deriving unit 15211' and a core transform processing unit 15212'. The core transform processing deriving unit 15211' further includes a core transform set deriving unit 152111' and a core transform processing setting unit 152112'. On the other hand, the core transform processing unit 15212' includes a core transform matrix deriving unit 152121', a sub-set deriving unit 152122', a sub-set transform processing unit 152123', and a sub-set storage 152124'.

Due to the relationship with the Non-separable secondary transform described with reference to FIG. 19, the core transform processing deriving unit 15211', the core transform set deriving unit 152111', the core transform processing setting unit 152112', the core transform matrix deriving unit 152121', the sub-set deriving unit 152122', the sub-set transform processing unit 152123', and the sub-set storage 152124' correspond, respectively, to the Secondary Transform processing deriving unit 15221, the Secondary Transform set deriving unit 152212, the Secondary Transform processing setting unit 152211, the Secondary Transform matrix deriving unit 152221, the sub-set deriving unit 152222, the sub-set transform processing unit 152223, and the sub-set storage 152224.

By referring to a core transform set table, the core transform set deriving unit 152111' derives a core transform set coreTrSetIdx corresponding to the prediction mode PredMode received from the TT information decoder 13.

coreTrSetIdx=(PredMode==PRED_INTER)?TrSetInter:coreTrSetIdxTbl
[IntraPredMode]

The core transform set deriving unit 152111' sends the derived core transform set index coreTrSetIdx to the core transform processing setting unit 152112'.

The core transform processing setting unit 152112' receives a flag (amt_idx) from the TT information decoder 13. In addition, the core transform processing setting unit 152112' sends, to the core transform matrix deriving unit 152121, an index coreTrIdx indicating a method of core transform based on the core transform set coreTrSet.

coreTrIdx=(amt_flag==0)?fixedTr:coreTrSet[coreTrSetIdx][amt_trans_idx]

Note that the fixedTr above represents a fixed transform.

The core transform matrix deriving unit 152121' derives, from the received parameter coreTrIdx indicating a core transform processing, a matrix transMatrix[ ][ ] needed for an actual transform (sub-set transform processing).

transMatrix[ ][ ]=coreTransMatrixTbl[coreTrIdx]
[ ][ ]

The core transform matrix deriving unit 152121' sends the derived matrix to the sub-set transform processing unit 152123.

The sub-set transform processing unit 152123' performs a sub-set transform by use of a 4×4 sub-block included in the TU as a unit. Specifically, the processing includes 3 processings: a processing for derive a sub-block from the TU; a processing of transform the sub-block; and a processing of storing a sub-block in a TU.

A loop associated with the sub-block coordinates (xS, yS) is as follows. xS=0 . . . nTbs/4−1, yS=0 . . . nTbs/4−1

The sub-set deriving unit 152122' derives a sub-block e[j] from the transform coefficient d[ ][ ] received from the inverse transform unit 151.

The sub-block e[j] is configured by: e[j]=d[xx][yy], xx=(xS<<2)+j %4, yy=(yS<<2)+j/4 (j=0 . . . 15).

Due to the need for a non-separable transform here, a sub-set transform is performed on a 16×1 vector e[j] to derive g[i].

g[i]=Σ(transMatrix[i][j]×x[j])(j=0 to 15)

The sub-set storage 152124' stores the g[i] as a prediction error r[xx][yy].

r[xx][yy]=y[i],xx=(xS<<2)+i%4,yy=(yS<<2)+i/4(i=0 . . . 15)

Embodiment 3

Of the Tbs×Tbs transform coefficients d[ ][ ], only the M×M sub-block on the upper left-hand side may be subjected to the Secondary Transform. For instance, assuming that the sub-block coordinate (the coordinates of the upper left-hand side sub-block) are expressed as (xS, yS), the Secondary Transform unit 1522 may perform the Secondary Transform on a sub-block as long as the sub-block's coordinates (xS, yS) satisfy the following conditions: the maximum X coordinate and the maximum Y coordinate of the sub-block's coordinates (max(xS, yS)) are smaller than a prescribed threshold TH.

if(max(xS,yS)<TH)

Secondary Transform Processing for (xS, yS) Sub-Block

Note that an appropriate threshold TH=log 2(M). For instance, in a case where M=8, TH=2.

Assuming that the transform coefficient coordinates are (xC, yC), the sub-block coordinates can be derived as follows.

$$xS=(xC>>TH)$$

$$yS=(yC>>TH)$$

The sub-block(s) satisfying the conditions above are located in: the gray area in FIG. 44A in a case of a 4×4 TU (block); the gray area in FIG. 44B in a case of a 8×8 TU (block); and the gray area in FIG. 44C in a case of a 16×16 block. Note that the Adaptive Multiple Core Transform performed by the core transform unit 1521 does not use the sub-block but uses the TU as the unit of processing.

The Secondary Transform may be performed on any other sub-block than the sub-block on the upper left-hand side in accordance with the intra-prediction direction. In this way, an effect is expected to concentrate the energy on fewer components. Hence, the target sub-block for the Secondary Transform may be changed in accordance with the intra-prediction direction.

Specifically, the video decoding device 1 includes: a core transform unit 1521 that can apply an Adaptive Multiple Core Transform to a TU; and a Secondary Transform unit 1522 that can apply, before the Adaptive Multiple Core Transform, the Secondary Transform to at least any one of the sub-blocks included in the TU. In addition, the Secondary Transform unit 1522 may be configured to apply the Secondary Transform to: a first region including a sub-blocks located on the lower frequency side of the TU; and a second region including a sub-block adjacent to the first region and adjacent to the boundary of the TU (boundary-adjacent sub-block) but not including any sub-block adjacent to the boundary-adjacent sub-block from the opposite side of the boundary.

(Configuration 1 where Target Sub-Block for Secondary Transform is Changed in Accordance with Intra-Prediction Direction)

Figure 45A:
FIGS. 45A to 45C are charts describing a sub-block to which the Secondary Transform unit applies the Secondary Transform according to an embodiment of the present invention.
Figure 45B:
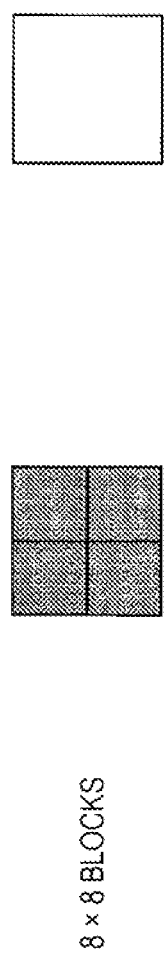
Figure 45C:
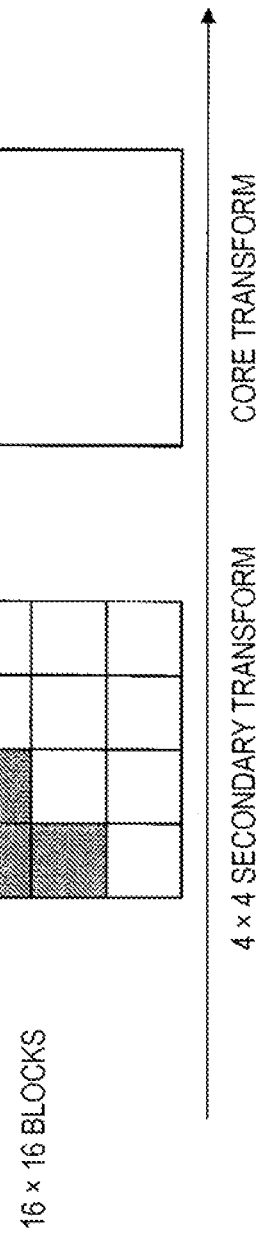

For instance, as illustrated in FIGS. 45A to 45C, in a case where a particular sub-block's coordinates (xS, yS) satisfy the following conditions, the Secondary Transform unit 1322 may perform a Secondary Transform on the particular sub-block.

$$if(xS+yS<=TH)$$

Secondary Transform Processing for (xS, yS) Sub-Block

The sub-block(s) satisfying the conditions above are located in: the gray area in FIG. 45A in a case of a 4×4 TU (block); the gray area in FIG. 45B in a case of a 8×8 TU (block); and the gray area in FIG. 45C in a case of a 16×16 TU(block). For instance, in a case where M=4, an appropriate threshold TH=3.

(Configuration 2 where Target Sub-Block for Secondary Transform is Changed in Accordance with Intra-Prediction Direction)

Figure 46A:
FIGS. 46A to 46C are charts describing a sub-block to which the Secondary Transform unit applies the Secondary Transform according to an embodiment of the present invention.
Figure 46B:
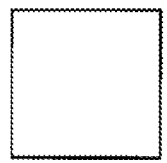
Figure 46C:
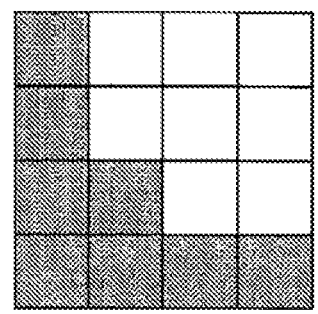

For instance, as illustrated in FIGS. 46A to 46C, the Secondary Transform unit 1322 may perform a Secondary Transform on a particular sub-block (xS, yS) as long as the particular sub-block's X coordinate and Y coordinate have their respective maximum values max(xS, yS) that are smaller than a prescribed threshold TH, or either the X coordinate or the Y coordinate is 0.

$$if(max(xS,yS)<TH\|xS==0\|yS==0)$$

Secondary Transform Processing for (xS, yS) Sub-Block

Note that an appropriate threshold TH is 2, or the like.

The sub-block(s) satisfying the conditions above are located in: the gray area in FIG. 46A in a case of a 4×4 TU (block); the gray area in FIG. 46B in a case of a 8×8 TU (block); and the gray area in FIG. 46C in a case of a 16×16 TU(block).

(Configuration 3 where Target Sub-Block for Secondary Transform is Changed in Accordance with Intra-Prediction Direction)

Figure 47A:
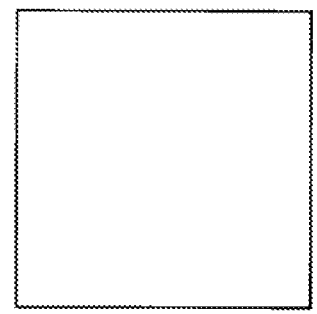
FIGS. 47A to 47C are charts describing a sub-block to which the Secondary Transform unit applies the Secondary Transform according to an embodiment of the present invention.
Figure 47B:
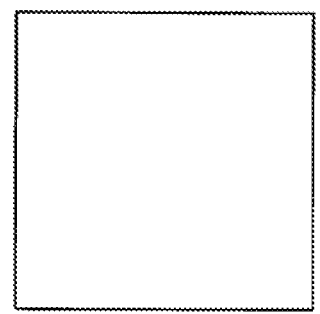
Figure 47C:
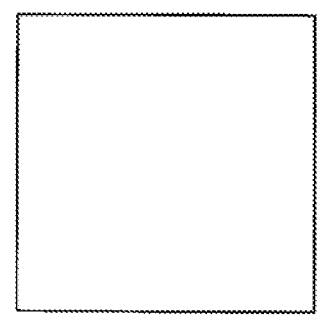

For instance, as illustrated in FIGS. 47A to 47C, in a case where a particular sub-block's coordinates (xS, yS) satisfy the following conditions (1) to (3), the Secondary Transform unit 1322 may perform a Secondary Transform on the particular sub-block.

(1) In a case where the intra-prediction direction is within a horizontal prediction boundary (secSubBlockMode=1), the Secondary Transform unit 1322 may perform a Secondary Transform on a particular sub-block (xS, yS) as long as the particular sub-block's X coordinate and Y coordinate have their respective maximum values max(xS, yS) that are smaller than a prescribed threshold TH, or the Y coordinate is 0.

$$if(max(xS,yS)<TH\|yS==0)$$

Secondary Transform Processing for (xS, yS) Sub-Block (2) In a case where the intra-prediction direction is within a vertical prediction boundary (secSubBlockMode=2), the Secondary Transform unit 1322 may perform a Secondary Transform on a particular sub-block (xS, yS) as long as the particular sub-block's X coordinate and Y coordinate have their respective maximum values max(xS, yS) that are smaller than a prescribed threshold TH, or the X coordinate is 0.

$$if(max(xS,yS)<TH\|xS==0)$$

Secondary Transform Processing for (xS, yS) Sub-Block (3) In a case where the intra-prediction direction is other than the ones mentioned in (1) and (2) (secSubBlockMode=0), the Secondary Transform unit 1322 may perform a Secondary Transform on a particular sub-block (xS, yS) as long as the sum of the value of the particular sub-block's X coordinate and Y coordinate is smaller than a prescribed threshold TH.

$$if(xS+yS<TH)$$

Secondary Transform Processing for (xS, yS) Sub-Block

Note that an appropriate threshold TH is 2, or the like.

Assuming that: a case where the intra-prediction direction is within the horizontal prediction boundary is secSubBlockMode=1; a case where the intra-prediction direction is within the vertical prediction boundary is secSubBlockMode=2; and a case that is neither (1) nor (2) is secSubBlockMode=0, the determination may be based whether the range of the intra-prediction mode IntraPredMode is within a prescribed range, as described below.

```
if (IntraPredMode is from 6 to 14)
  secSubBlockMode = 2 (vertical prediction boundary)
else if (IntraPredMode is from 22 to 30)
  secSubBlockMode = 1 (horizontal prediction boundary)
else
  secSubBlockMode = 0 (neither vertical nor horizontal prediction
  boundary)
```

In more general terms, assuming that the mode number of the vertical prediction is expressed as predModeVer, the mode number of the horizontal prediction is expressed as predModeHor, and the range is expressed as predModeTH, the following equations are used for deriving the determination result.

```
if (abs(IntraPredMode − predModeVer) < predModeTH)
   secSubBlockMode = 2 (vertical prediction boundary)
else (abs(IntraPredMode − predModeHor) < predModeTH)
   secSubBlockMode = 1 (horizontal prediction boundary)
else
   secSubBlockMode = 0 (neither vertical nor horizontal prediction
   boundary)
```

In the equations above, it is assumed that predModeVer=10, predModeHor=26, and predModeTH=4.

In addition, the secSubBlockMode may be determined in accordance with the order of scanning the transform coefficients.

For instance,

```
if (scanIdx is a vertical scanning)
   secSubBlockMode = 2 (vertical prediction boundary)
else if (scanIdx is a horizontal scanning)
   secSubBlockMode = 1 (horizontal prediction boundary)
else
   secSubBlockMode = 0 (neither vertical nor horizontal prediction
   boundary)
```

The sub-block(s) satisfying the conditions above is/are indicated by a gray area in FIGS. 47A to 47C.

Video Encoding Device

Figure 48:
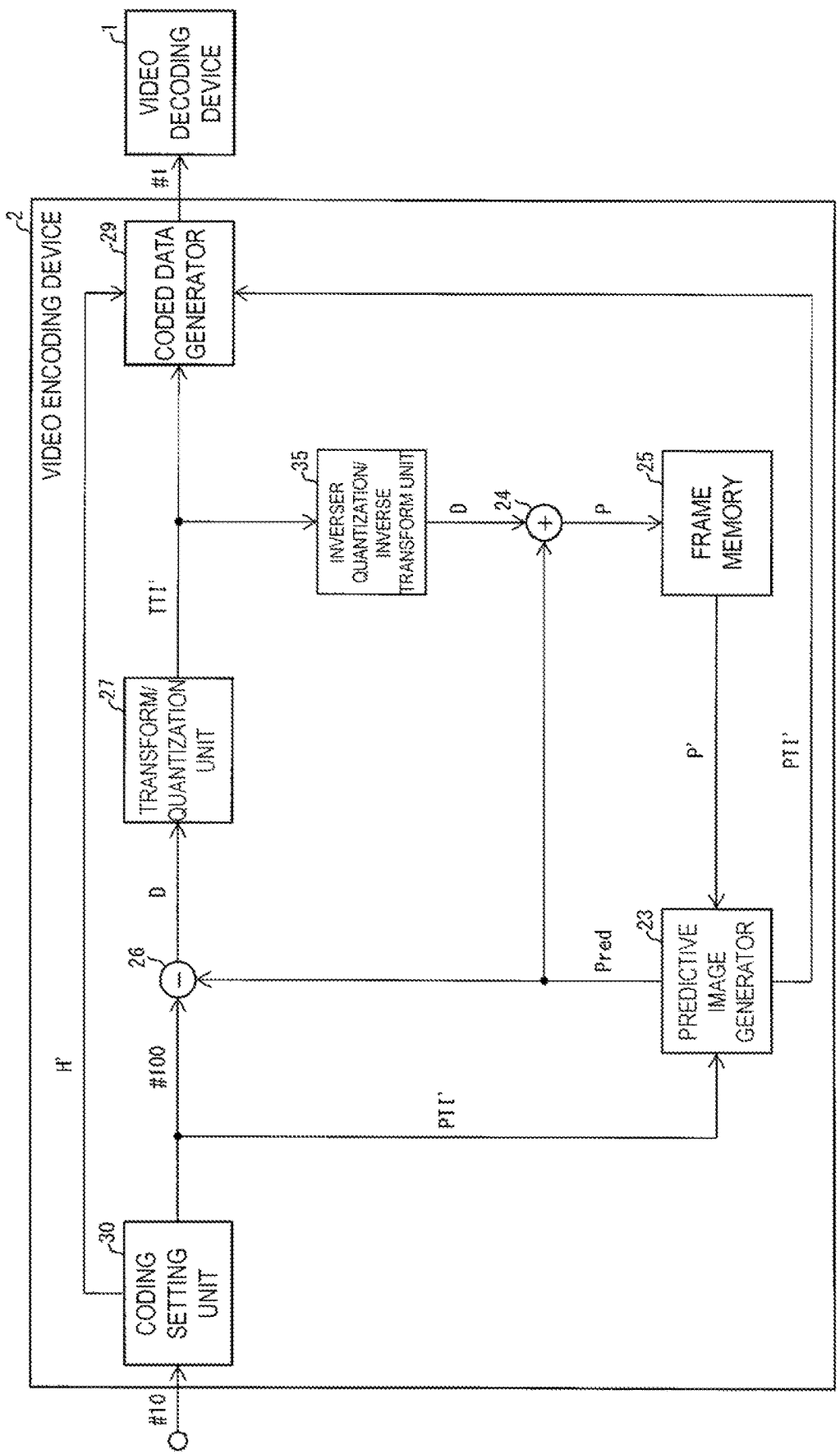
FIG. 48 is a functional block diagram illustrating a schematic configuration of a video encoding device according to an embodiment of the present invention.

The video encoding device 2 (image encoding device) according to the present invention will be described below with reference to FIG. 48.

(Overview of Video Encoding Device)

In schematic terms, the video encoding device 2 is a device that can generate coded data #1 by encoding an input image #10 and output the coded data #1 to the video decoding device 1.

(Configuration of Video Encoding Device)

First, an exemplar configuration of the video encoding device 2 will be described with reference to FIG. 48. FIG. 48 is a functional block diagram illustrating a configuration of the video encoding device 2. As illustrated in FIG. 48, the video encoding device 2 includes: a coding setting unit 30, an inverse quantization/inverse transform unit 35, a predictive image generator 23, an adder 24, a frame memory 25, a subtracter 26, a transform/quantization unit 27, and a coded data generator (adaptative processor) 29.

The coding setting unit 30 generates, based on the input image #10, image data for coding and various configuration information.

Specifically, the coding setting unit 30 generates the following image data and configuration information.

First, the coding setting unit 30 generates a CU image #100 associated with a target CU by sequentially splitting the input image #10 into slices and each slice into Coding Tree Units.

In addition, the coding setting unit 30 generates header information H' based on the result of the splitting processing. The header information H' contains: (1) information on the size, the shape, and the position within the target slice of the Coding Tree Unit belonging to the target slice; and (2) CU information CU' containing the size, the shape, and the position within the target Coding Tree Unit of the CU belonging to each Coding Tree Unit.

In addition, the coding setting unit 30 generates a CU image #100, and also generates PT configuration information PTI' by referring to the CU information CU'. The PT configuration information PTI' contains information on: (1) possible splitting patterns for splitting the target CU into PU(s); and (2) all the possible combinations of prediction modes that are applicable to each and every PU.

The coding setting unit 30 supplies the CU image #100 to the subtracter 26. In addition, the coding setting unit 30 supplies header information H' to the coded data generator 29. In addition, the coding setting unit 30 supplies PT configuration information PTI' to the predictive image generator 23.

The inverse quantization/inverse transform unit 35 restores a prediction residual D for each TU by inversely quantizing and inversely orthogonal-transforming a quantized prediction residual for each TU supplied from the transform/quantization unit 27. The inverse orthogonal transform here is identical to the one described earlier in relation to the inverse quantization/inverse transform unit 15 illustrated in FIG. 2 and FIG. 14. Hence, no further description of the inverse orthogonal transform will be provided.

In addition, the inverse quantization/inverse transform unit 35 integrates the prediction residuals for individual blocks in accordance with the splitting pattern specified by TT split information (to be described later), and thus generates a prediction residual D for the target CU. The inverse quantization/inverse transform unit 35 supplies the generated prediction residual D for the target CU to the adder 24.

The predictive image generator 23 generates a predictive image Pred for the target CU by referring to a locally decoded image P' recorded in the frame memory 25 and PT configuration information PTI'. The predictive image generator 23 configures, in the PT configuration information PTI', predictive parameters obtained by a predictive image generation processing, and sends the configured PT configuration information PTI' to the coded data generator 29. Note that the predictive image generation processing by the predictive image generator 23 is identical to the corresponding processing by the predictive image generator 14 included in the video decoding device 1. Hence, no further description will be provided.

The adder 24 generates a decoded image P for the target CU by adding together the predictive image Pred supplied from the predictive image generator 23 and the prediction residual D supplied from the inverse quantization/inverse transform unit 35.

In the frame memory 25, the decoded images P are recorded sequentially. Decoded images corresponding to all the Coding Tree Units decoded before a target Coding Tree Unit (e.g., all the preceding Coding Tree Unit in the raster scan order) at the time of decoding that target Coding Tree Unit are recorded in the frame memory 25 together with the parameters used for the decoding of the decoded image P.

The subtracter 26 generates a prediction residual D for the target CU by subtracting the predictive image Pred from the CU image #100. The subtracter 26 supplies the generated prediction residual D to the transform/quantization unit 27.

The transform/quantization unit 27 generates a quantized prediction residual by performing an orthogonal transform and quantization on the prediction residual D. Note that the orthogonal transform mentioned above refers to, an orthogonal transform from the pixel domain to the frequency domain. Some exemplar inverse orthogonal transforms are a Discrete Cosine Transform (DCT transform) and a Discrete Sine Transform (DST transform).

Specifically, the transform/quantization unit 27 determines the splitting pattern for one or more blocks of the target CU by referring to the CU image #100 and CU information CU'. In addition, in accordance with the determined splitting pattern, the transform/quantization unit 27 splits the prediction residual D into prediction residuals for individual blocks.

In addition, the transform/quantization unit 27 generates prediction residuals in the frequency domain by orthogonally transforming the prediction residuals for individual blocks, and then generates quantized prediction residuals for individual blocks by quantizing the prediction residuals in the frequency domain.

In addition, the transform/quantization unit 27 generates TT configuration information TTI', which includes: information on the generated quantized prediction residuals for individual blocks; TT split information specifying the splitting pattern for the target CU; information on all the splitting patterns applicable to individual blocks of the target CU. The transform/quantization unit 27 supplies the generated TT configuration information TTI' to the inverse quantization/inverse transform unit 35 and the coded data generator 29.

The coded data generator 29 encodes the header information H', the TT configuration information TTI', and the PT configuration information PTI'. The coded data generator 29 then multiplexes the coded header information H, the coded TT configuration information TTI, and the coded PT configuration information PTI to generate coded data #1, which is outputted.

Application Example

The video encoding device 2 and the video decoding device 1 described thus far can be used by being mounted in various apparatuses that can transmit, receive, record, play back videos. The videos may be natural videos taken with cameras or the like. In addition, the videos may be artificial videos (including CGs and GUIs) generated with computers or the like.

Figure 49A:
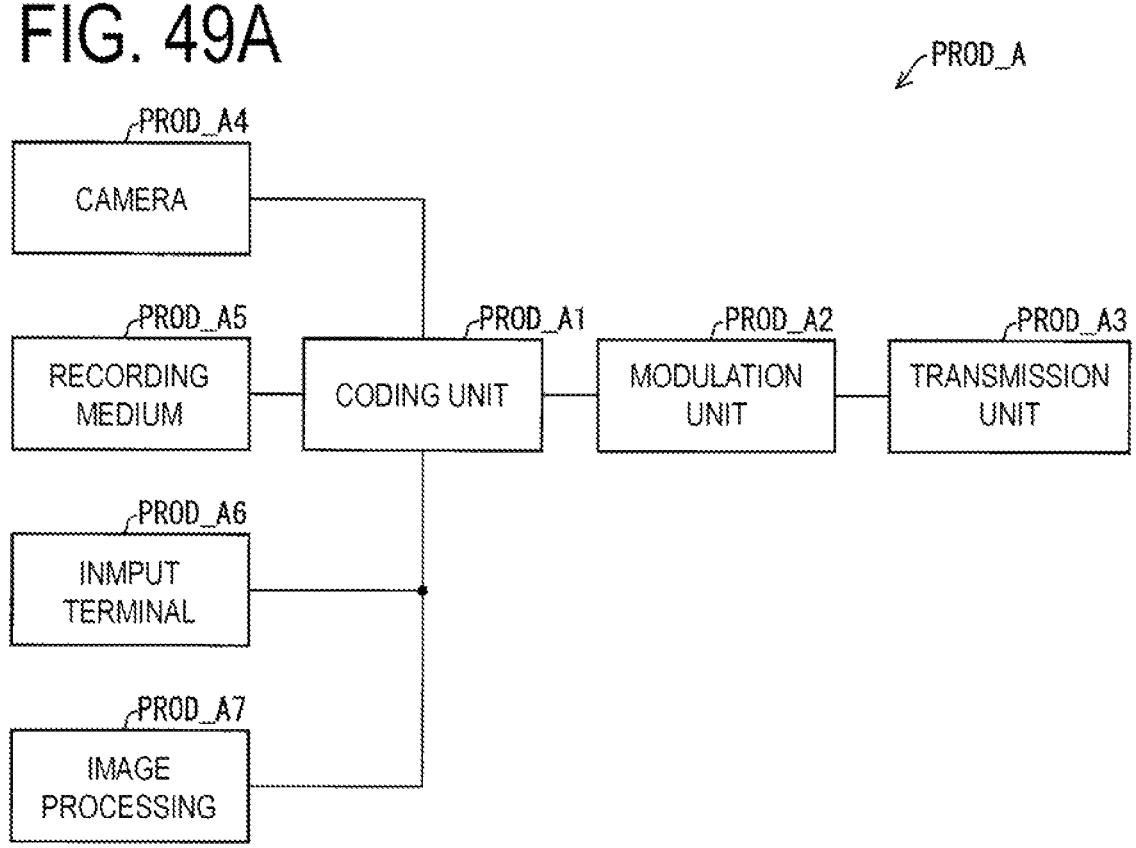
FIGS. 49A and 49B are diagrams illustrating a configuration of a transmission device equipped with the video encoding device, and illustrating a configuration of a reception device equipped with the video decoding device.
Figure 49B:
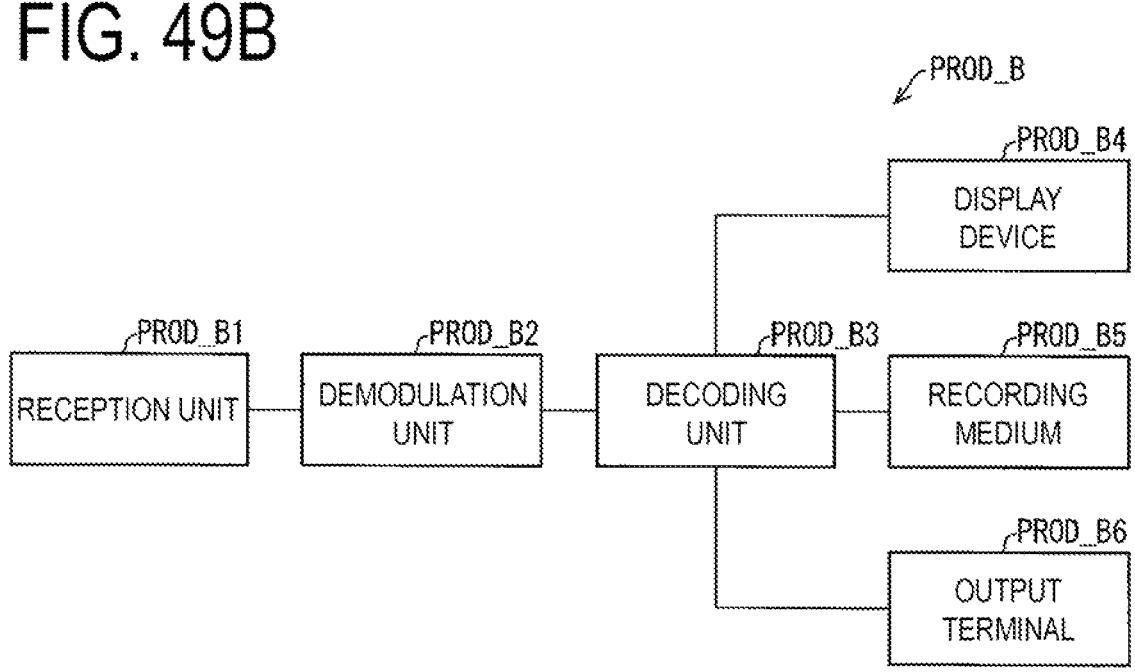

Now, with reference to FIGS. 49A and 49B, a description will be provided about the fact that the above-described video encoding device 2 and the above-described video decoding device 1 can be used for transmitting and receiving videos.

FIG. 49A is a block diagram illustrating a configuration of a transmission device PROD_A equipped with the video encoding device 2. As illustrated in FIG. 49A, the transmission device PROD_A includes: a coding unit PROD_A1 that can encode a video to obtain coded data; a modulating unit PROD_A2 that can obtain modulated signals by modulating the carrier wave by use of the coded data acquired by the coding unit PROD_A1; and a transmitter PROD_A3 that can transmit the modulated signal acquired by modulating unit PROD_A2. The above-described video encoding device 2 is used as the coding unit PROD_A1.

The transmission device PROD_A may further include, as a supply source of the videos to be input into the coding unit PROD_A1: a camera PROD_A4 that can take videos; a recording medium PROD A5 that can record videos; and an input terminal PROD_A6 that can receive the input of videos from outside; and an image processing unit A7 that can generate or process images. FIG. 49A illustrates an exemplar configuration where all the elements mentioned above are included in the transmission device PROD_A, but some of them may be omitted.

Note that the recording medium PROD_A5 may record videos that have not been encoded or may record videos encoded by a coding scheme for recording that is different from the coding scheme for transmission. In the latter case, between the recording medium PROD_A5 and the coding unit PROD_A1, a decoder (not illustrated) may be inserted. The decoder can decode, in accordance with the coding scheme for recording, the coded data read out from the recording medium PROD_A5.

FIG. 49B is a block diagram illustrating a configuration of a reception device PROD_B equipped with the video decoding device 1. As illustrated in FIG. 49B, the reception device PROD_B includes: a receiver PROD_B1 that can receive modulated signals; a demodulation unit PROD_B2 that can obtain coded data by demodulating the modulated signal received by the receiver PROD_B1; and a decoder PROD_B3 that can obtain videos by decoding the coded data obtained by the demodulation unit PROD_B2. The above-described video decoding device 1 is used as the decoder PROD_B3.

The reception device PROD_B may further include, as a destination of the videos outputted and supplied from the decoder PROD_B3: a display device PROD_B4 that can display videos; a recording medium PROD_B5 that can record videos; and an output terminal PROD_B6 that can output videos to the outside. FIG. 49B illustrates an exemplar configuration where all the elements mentioned above are included in the reception device PROD_B, but some of them may be omitted.

Note that the recording medium PROD_B5 may record videos that have not been encoded or may record videos encoded by a coding scheme for recording that is different from the coding scheme for transmission. In the latter case, between the decoder PROD_B3 and the recording medium PROD_B5, a coding unit (not illustrated) may be inserted. The coding unit can encode, in accordance with the coding scheme for recording, videos acquired from the decoder PROD_B3.

Note that the transmission medium for transmitting modulated signals may be wireless (radio) or wired (cabled). In addition, the transmission mode for the transmission of the modulated signals may be broadcasting (a transmission mode where the signal to be sent has no destination specified in advance) or may be communications (a transmission mode where the signal to be sent has a destination specified in advance). Hence, the transmission of modulated signals may be performed by any of radio broadcast, cabled broadcasting, radio communications, and wired communications.

For instance, a broadcasting station (broadcasting equipment, etc.) of digital terrestrial television broadcasting and a receiving station (a television receiver, etc.) are examples of the transmission device PROD_A and the reception device PROD_B capable of transmitting and receiving modulated signals over radio broadcasting. In addition, a broadcasting station (broadcasting equipment, etc.) of cable television broadcasting and a receiving station (a television receiver, etc.) are examples of the transmission device PROD_A and the reception device PROD_B capable of transmitting and receiving modulated signals over cable broadcasting.

In addition, a server (workstation, etc.) of VOD (Video On Demand) services and video hosting services using the Internet/a client (television receiver, personal computer, smart phones, etc.) are examples of transmission device PROD_A/reception device PROD_B capable of transmitting and receiving modulated signals over communications (commonly, a LAN uses any of the radio and cable as the transmission medium while WAN uses cable as the transmission medium). The personal computer includes a desktop PC, a laptop PC, and a tablet PC. In addition, a smartphone includes a multi-functional mobile phone terminal.

Note that the client of the video hosting service has a function of decoding the coded data downloaded from a server and of displaying the decoded data on a display device and a function of encoding and uploading a video image taken with a camera to the server. Hence, a client of the video hosting service functions as both the transmission device PROD_A and the reception device PROD_B.

Figure 50A:
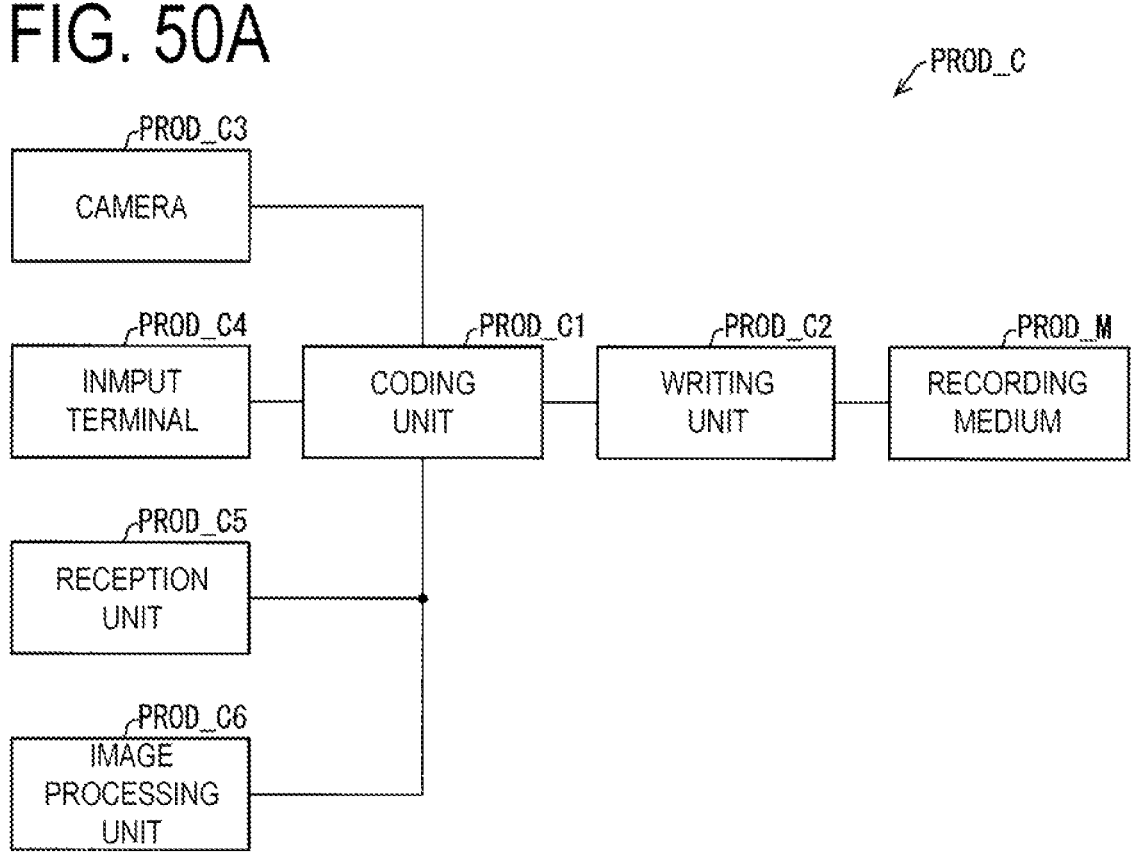
FIGS. 50A and 50B are diagrams illustrating a configuration of a recording device equipped with the video encoding device, and illustrating a configuration of a playback device equipped with the video decoding device.
Figure 50B:
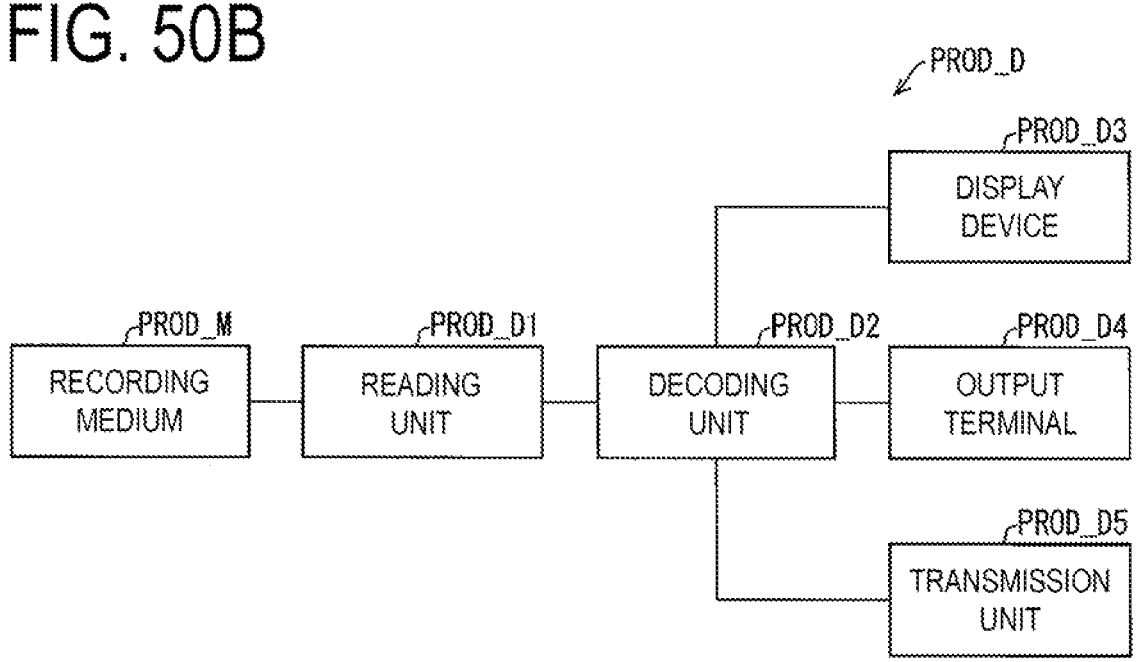

Next, with reference to FIGS. 50A and 50B, a description will be provided about the fact that the above-described video encoding device 2 and the above-described video decoding device 1 can be used for recording and playing back videos.

FIG. 50A is a block diagram illustrating a configuration of a recording device PROD_C equipped with the video encoding device 2. As illustrated in FIG. 50A, the recording device PROD_C includes: a coding unit PROD_C1 that can obtain coded data by encoding a video; and a writing unit PROD_C2 capable of writing, in the recording medium PROD M, the coded data obtained by the coding unit PROD_C1. The above-described video encoding device 2 is used as the coding unit PROD_C1.

The recording medium PROD_M may be: (1) a built-in type one configured to be built in the recording device PROD_C, such as an HDD (Hard Disk Drive) and an SSD (Solid State Drive); (2) a connected type one configured to be connected to the recording device PROD_C, such as an SD memory card and a USB (Universal Serial Bus) flash memory; and (3) a loaded type one configured to be loaded in a drive apparatus (not illustrated) built in the recording device PROD_C, such as a DVD (Digital Versatile Disc) and a BD (Blu-ray Disc: registered trademark).

The recording device PROD_C may further include, as a supply source of the videos to be input into the coding unit PROD_C1: a camera PROD_C3 that can take videos; an input terminal PROD_C4 that can receive the input of videos from outside; a receiver PROD_C5 that can receive videos; and an image processing unit C6 that can generate or process images. FIG. 50A illustrates an exemplar configuration where all the elements mentioned above are included in the recording device PROD_C, but some of them may be omitted.

Note that the receiver PROD_C5 may receive videos that have not been encoded or may receive videos encoded by a coding scheme for transmission that is different from the coding scheme for recording. In the latter case, between the receiver PROD_C5 and the coding unit PROD_C1, a decoder for transmission (not illustrated) may be inserted. The decoder can decode the coded data encoded by the coding scheme for transmission.

Some examples of the recording device PROD_C include, for instance, a DVD recorder, a BD recorder, an HDD (Hard Disk Drive) recorder, and the like (in which case, the input terminal PROD_C4 or the receiver PROD_C5 is the main supply source of videos). In addition, a camcorder (in which case, the camera PROD_C3 is the main supply source of videos), a personal computer (in which case, the receiver PROD_C5 or the image processing unit C6 is the main supply source of videos), a smartphone (in which case, the camera PROD_C3 or the receiver PROD_C5 is the main supply source of videos), and the like are also some examples of the recording device PROD_C.

FIG. 50B is a block diagram illustrating a configuration of the playback device PROD_D equipped with the above-described video decoding device 1. As illustrated in FIG. 50B, the playback device PROD_D includes: a reading unit PROD_D1 that can read out coded data recorded in the recording medium PROD M; and a decoder PROD_D2 that can obtain videos by decoding the coded data having been read out by the reading unit PROD_D1. The above-described video decoding device 1 is used as the decoder PROD_D2.

The recording medium PROD_M may be: (1) a built-in type one configured to be built in the playback device PROD_D, such as an HDD and an SSD; (2) a connected type one configured to be connected to the playback device PROD_D, such as an SD memory card and a USB flash memory; and (3) a loaded type one configured to be loaded in a drive apparatus (not illustrated) built in the playback device PROD_D, such as a DVD and a BD.

The playback device PROD_D may further include, as a destination of the videos outputted and supplied from the decoder PROD_D2: a display device PROD_D3 that can display videos; an output terminal PROD_D4 that can output videos to the outside; and a transmitter PROD_D5 that can transmit videos. FIG. 50B illustrates an exemplar configuration where all the elements mentioned above are included in the playback device PROD_D, but some of them may be omitted.

The transmitter PROD_D5 may transmit videos that have not been encoded, or may transmit videos encoded by a coding scheme for transmission that is different from the coding scheme for recording. In the latter case, between the decoder PROD_D2 and the transmitter PROD_D5, a coding unit (not illustrated) may be inserted to encode videos by a coding scheme for transmission.

Some examples of the playback device PROD_D include, for instance, a DVD player, a BD player, am HDD player (in which case, the output terminal PROD_D4 to which a television receiver or the like is connected is the main destination of the supplied videos). In addition, a television receiver (in which case, the display device PROD_D3 is the main destination of the supplied videos), a digital signage display (called also an electronic signboard, an electronic billboard, etc.; the display device PROD_D3 or the transmitter PROD_D5 are the main destinations of the supplied videos), a desktop PC (in which case, the output terminal PROD_D4 or the transmitter PROD_D5 is the main destination of the supplied videos), laptop or tablet PC (in which case, the display device PROD_D3 or the transmitter PROD_D5 is the main destination of the supplied videos), a smartphone (in which case, the display device PROD_D3 or the transmitter PROD_D5 is the main destination of the supplied videos), and the like are also some examples of the playback device PROD_D.

Implementation by Software and Implementation by Software

In addition, the blocks of the above-described video decoding device 1 and of the video encoding device 2 may be implemented, as hardware, as logic circuit on an integrated circuit (IC chip), or may be implemented as software by use of a CPU (Central Processing Unit).

In the latter case, each of the two devices includes: a CPU that can perform the commands of the program to achieve each function; a ROM (Read Only Memory) that can store the program; a RAM (Random Access Memory) that can develop the program; a recording medium such as a memory that can store the program and various data. The objective of the present invention can also be achieved by: supplying, to each of the devices, a recording medium where program codes (executable programs, intermediate code programs, source programs) of the control program (representing the software to achieve the above-described functions) for each of the devices are recorded in a computer-readable manner; and making the computer (or the CPU and/or the MPU) read out and execute the program codes recorded in the recording medium.

Some examples of the recording medium are, for instance, tapes such as a magnetic tape and a cassette tape; magnetic discs such as a floppy (registered trademark) disc and a hard disc; other discs including optical discs such as a CD-ROM (Compact Disc Read-Only Memory), an MO disc (Magneto-Optical disc), an MD (Mini Disc), a DVD (Digital Versatile Disc), a CD-R (CD Recordable), and a Blu-ray Disc (registered trademark); Cards such as an IC card (including a memory card) and an optical card; semiconductor memories such as a mask ROM, an EPROM (Erasable Programmable Read-Only Memory), an EEPROM (Electrically Erasable and Programmable Read-Only Memory), and a flash ROM; or logic circuits such as a PLD (Programmable logic device) and an FPGA (Field Programmable Gate Array).

In addition, each of the devices may be configured to be connectable to a communication network, and the program codes may be supplied to the devices via the communication network. The communication network is not limited to a particular one as long as the network can transmit program codes. For instance, Internet, intranet, extranet, LAN (Local Area Network), ISDN (Integrated Services Digital Network), VAN (Value-Added Network), CATV (Community Antenna television/Cable Television) communication network, Virtual Private Network, telephone circuit network, mobile communication network, satellite communication network, and the like are available. The transmission medium included in the communication network is not limited to one with a particular configuration or of a particular kind as long as the medium can transmit the program codes. For instance, wired media such as IEEE (Institute of Electrical and Electronic Engineers) 1394, USB, power-line carrier, cable TV circuit, telephone line, ADSL (Asymmetric Digital Subscriber Line) circuit are available. In addition, wireless media such as infrared e.g.: IrDA (Infrared Data Association) and remote control; Bluetooth (registered trademark); IEEE802.11 wireless; HDR (High Data Rate); NFC (Near Field Communication); DLNA (Digital Living Network Alliance) (registered trademark); cellular phone network; satellite channel; and ground wave digital network are also available. The present invention may be embodied in computer data signals implementing the program codes through the electronic transmission and buried in a carrier wave.

The present invention is not limited to the embodiment described above. Furthermore, various modifications are possible within the scope of claims. Embodiments that are made by suitably combining technical means disclosed according to the different embodiments are also included in the technical scope of the present invention.

The present invention is not limited to each of the above-described embodiments. It is possible to make various modifications within the scope of the claims. An embodiment obtained by appropriately combining technical elements each disclosed in different embodiments falls also within the technical scope of the present invention. Further, when technical elements disclosed in the respective embodiments are combined, it is possible to form a new technical feature.

REFERENCE SIGNS LIST

1 video decoding device (image decoding device)
10 decoding module
11 CT information decoder (decoder)
12 PU information decoder (decoder)
13 TT information decoder (decoder)
15, 35 inverse quantization/inverse transform unit
16, 25 frame memory
2 video encoding device (image encoding device)
131 sec_idx decoder
132 amt_flag decoder
133 amt_idx decoder
21 CU information decoder
25 frame memory
27 transform/quantization unit

The invention claimed is:

1. An image decoding device configured to decode a picture by using a coding unit into which the picture is split, the device comprising:
   a first decoding circuit configured to decode a secondary index specifying whether or not a secondary transform is used;
   a second decoding circuit configured to decode a first index;
   a first deriving circuit configured to derive a secondary transform matrix based on the secondary index;
   a first transform circuit configured to apply the secondary transform to a transform unit included in the coding unit based on the secondary transform matrix;
   a second deriving circuit configured to derive vertical and horizontal transform selection indexes based on the first index; and
   a second transform circuit configured to apply a core transform to the transform unit based on the vertical and horizontal transform selection indexes,
   wherein the second decoding circuit derives the first index equal to 0 in a case where the secondary index specifies that the secondary transform is used.

2. An image decoding method for decoding a picture by using a coding unit into which the picture is split, the method comprising:
   decoding a secondary index specifying whether or not a secondary transform is used;
   decoding a first index;
   deriving a secondary transform matrix based on the secondary index;
   applying the secondary transform to a transform unit included in the coding unit based on the secondary transform matrix;
   deriving vertical and horizontal transform selection indexes based on the first index; and
   applying a core transform to the transform unit based on the vertical and horizontal transform selection indexes,
   wherein the first index is derived equal to 0 in a case where the secondary index specifies that the secondary transform is used.

* * * * *